United States Patent
Wu et al.

(10) Patent No.: US 8,694,662 B2
(45) Date of Patent: Apr. 8, 2014

(54) METHOD AND APPARATUS FOR COMMUNICATING TRANSMISSION REQUESTS TO MEMBERS OF A GROUP AND/OR MAKING GROUP RELATED TRANSMISSION DECISIONS

(75) Inventors: Xinzhou Wu, Monmouth Junction, NJ (US); Saurabh Tavildar, Jersey City, NJ (US); Junyi Li, Bedminster, NJ (US); Rajiv Laroia, Far Hills, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 271 days.

(21) Appl. No.: 12/166,594

(22) Filed: Jul. 2, 2008

(65) Prior Publication Data

US 2009/0019113 A1    Jan. 15, 2009

Related U.S. Application Data

(60) Provisional application No. 60/948,968, filed on Jul. 10, 2007.

(51) Int. Cl.
*G06F 15/16* (2006.01)
*H04L 1/00* (2006.01)

(52) U.S. Cl.
USPC .......... 709/230; 709/204; 709/228; 709/238; 370/230; 370/235; 370/245

(58) Field of Classification Search
USPC .......... 709/204, 228, 230, 238; 370/230, 235, 370/245
See application file for complete search history.

(56) References Cited

U.S. PATENT DOCUMENTS 5,805,822 A * 9/1998 Long et al. .................. 709/232
5,943,322 A * 8/1999 Mayor et al. ................ 370/280

(Continued)

FOREIGN PATENT DOCUMENTS

CN    1346579 A    4/2002
CN    1369158 A    9/2002

(Continued)

OTHER PUBLICATIONS

Young C D: "USAP multiple access: dynamic resource allocation for mobile multihop multichannel wireless networking" Military Communications Conference Proceedings, 1999, MILCOM 1999, IEEE 1999, Piscataway, NJ, USA, IEEE, US, vol. 1. Oct. 31, 1999, pp. 271-275, XP010369668.

(Continued)

*Primary Examiner* — Alina N. Boutah
(74) *Attorney, Agent, or Firm* — James K. O'Hare

(57) ABSTRACT

Methods and apparatus supporting group communications in a peer to peer wireless network are described. Methods and apparatus are directed to implementations with closed groups, e.g., where the number of group members are fixed at a given time and known to one or more members of the group. Various embodiments are well suited to decentralized peer to peer wireless networks including a plurality of individual traffic resources, e.g., traffic slots and/or traffic segments, which may be independently scheduled. Approaches for implementing distributed scheduling for traffic air link resources which may carry group traffic signals and/or peer to peer traffic signals are described. Various aspects are directed to the transmitter side including: group traffic transmission request transmissions, reception of request response signaling, transmitter yielding decisions, group rate determination and/or group traffic data signaling. Other aspects are directed to the receiver side including: reception of group traffic transmission request signals, receiver yielding decisions, transmitting group request responses signals, and/or receiving group traffic signaling.

21 Claims, 25 Drawing Sheets

(56) References Cited

U.S. PATENT DOCUMENTS

| | | |
|---|---|---|
| 6,275,500 B1 | 8/2001 | Callaway |
| 6,295,284 B1 | 9/2001 | Maggenti |
| 6,363,258 B1 | 3/2002 | Schmidt |
| 6,574,206 B2 | 6/2003 | Young |
| 6,606,341 B1 | 8/2003 | Kanterakis et al. |
| 6,665,311 B2 | 12/2003 | Kondylis et al. |
| 6,683,865 B1 | 1/2004 | Garcia-Luna-Aceves et al. |
| 6,829,486 B2 | 12/2004 | McKenna et al. |
| 6,912,212 B1 | 6/2005 | Young |
| 6,954,641 B2 | 10/2005 | McKenna et al. |
| 7,047,009 B2* | 5/2006 | Laroia et al. ............... 455/437 |
| 7,075,890 B2 | 7/2006 | Ozer et al. |
| 7,110,366 B2 | 9/2006 | Hulyalkar et al. |
| 7,197,016 B2* | 3/2007 | Belcea ........................ 370/321 |
| 7,263,377 B1 | 8/2007 | Wahlstrom et al. |
| 7,392,299 B2 | 6/2008 | Maekawa |
| 7,463,886 B2 | 12/2008 | Salokannel et al. |
| 7,478,120 B1* | 1/2009 | Zhang ........................ 709/201 |
| 7,532,627 B2* | 5/2009 | Chapman et al. ........ 370/395.41 |
| 7,539,507 B2* | 5/2009 | Grob et al. .................. 455/522 |
| 7,639,709 B1 | 12/2009 | Amis et al. |
| 7,778,170 B2 | 8/2010 | Aboba et al. |
| 7,818,023 B2* | 10/2010 | Li et al. ....................... 455/522 |
| 7,826,863 B2* | 11/2010 | Wu et al. ..................... 455/522 |
| 7,961,698 B2 | 6/2011 | Wu et al. |
| 8,005,061 B2* | 8/2011 | Abdel-Kader et al. ....... 370/345 |
| 8,126,001 B2* | 2/2012 | Hwang et al. ............... 370/401 |
| 2001/0031634 A1 | 10/2001 | Mizutani et al. |
| 2002/0010937 A1 | 1/2002 | Hirai et al. |
| 2002/0083203 A1* | 6/2002 | Lim ............................. 709/246 |
| 2002/0183064 A1 | 12/2002 | Gopalakrishnan et al. |
| 2003/0012149 A1 | 1/2003 | Maggenti et al. |
| 2003/0081576 A1 | 5/2003 | Kim et al. |
| 2003/0145093 A1 | 7/2003 | Oren et al. |
| 2003/0147108 A1* | 8/2003 | Gonzalez et al. ............. 358/504 |
| 2003/0227934 A1 | 12/2003 | White et al. |
| 2004/0038707 A1* | 2/2004 | Kim ........................... 455/554.1 |
| 2004/0073933 A1 | 4/2004 | Gollnick et al. |
| 2004/0141525 A1* | 7/2004 | Bhushan et al. ............. 370/473 |
| 2004/0153511 A1* | 8/2004 | Maynard et al. ............. 709/206 |
| 2004/0166869 A1* | 8/2004 | Laroia et al. .................. 455/450 |
| 2004/0166887 A1* | 8/2004 | Laroia et al. .................. 455/522 |
| 2004/0228320 A1* | 11/2004 | Laroia et al. .................. 370/349 |
| 2005/0021617 A1 | 1/2005 | Rusitschka ................... 709/204 |
| 2005/0036441 A1* | 2/2005 | Laroia et al. .................. 370/203 |
| 2005/0058137 A1 | 3/2005 | Carlson et al. |
| 2005/0111383 A1* | 5/2005 | Grob et al. .................... 370/254 |
| 2005/0118946 A1 | 6/2005 | Colban et al. |
| 2005/0149841 A1 | 7/2005 | Kyung et al. |
| 2005/0190784 A1* | 9/2005 | Stine ............................ 370/445 |
| 2005/0220052 A1 | 10/2005 | Uehara et al. |
| 2005/0220131 A1 | 10/2005 | Ginzburg et al. |
| 2005/0243751 A1 | 11/2005 | Yoon et al. |
| 2005/0254419 A1 | 11/2005 | Barker et al. |
| 2005/0259617 A1 | 11/2005 | Wason et al. |
| 2006/0067206 A1 | 3/2006 | Mantravadi et al. |
| 2006/0072457 A1 | 4/2006 | Noble |
| 2006/0092288 A1 | 5/2006 | Hara et al. |
| 2006/0092881 A1 | 5/2006 | Laroia et al. |
| 2006/0098569 A1 | 5/2006 | Han et al. |
| 2006/0107166 A1* | 5/2006 | Nanda ........................... 714/748 |
| 2006/0159041 A1 | 7/2006 | Zhun |
| 2006/0159079 A1* | 7/2006 | Sachs et al. .................. 370/389 |
| 2006/0203713 A1* | 9/2006 | Laroia et al. .................. 370/209 |
| 2006/0215611 A1 | 9/2006 | Nakagawa et al. |
| 2006/0218222 A1* | 9/2006 | Brahmbhatt et al. ......... 709/201 |
| 2006/0223520 A1 | 10/2006 | Laroia et al. |
| 2006/0230111 A1* | 10/2006 | Andersen et al. ............. 709/205 |
| 2006/0240766 A1 | 10/2006 | Wilde |
| 2006/0251016 A1 | 11/2006 | Lee et al. |
| 2006/0256761 A1* | 11/2006 | Meylan et al. ................ 370/338 |
| 2006/0269005 A1* | 11/2006 | Laroia et al. .................. 375/260 |
| 2006/0291410 A1 | 12/2006 | Herrmann |
| 2007/0002859 A1 | 1/2007 | Corson et al. |
| 2007/0009015 A1 | 1/2007 | Kunii et al. |
| 2007/0019717 A1* | 1/2007 | Laroia et al. .................. 375/222 |
| 2007/0054625 A1 | 3/2007 | Beale |
| 2007/0073842 A1 | 3/2007 | Uehara |
| 2007/0076807 A1* | 4/2007 | Jin et al. ...................... 375/260 |
| 2007/0143458 A1 | 6/2007 | Milligan et al. |
| 2007/0149126 A1* | 6/2007 | Rangan et al. ................ 455/63.1 |
| 2007/0160046 A1 | 7/2007 | Matta |
| 2007/0177584 A1* | 8/2007 | Kubler et al. ................. 370/352 |
| 2007/0204321 A1 | 8/2007 | Shen et al. |
| 2007/0211686 A1 | 9/2007 | Belcea et al. |
| 2008/0005114 A1* | 1/2008 | Li .................................... 707/9 |
| 2008/0013500 A1* | 1/2008 | Laroia et al. .................. 370/338 |
| 2008/0043634 A1 | 2/2008 | Wang et al. |
| 2008/0043879 A1* | 2/2008 | Gorokhov et al. ............ 375/296 |
| 2008/0069071 A1 | 3/2008 | Tang |
| 2008/0080530 A1* | 4/2008 | Kaler ............................ 370/401 |
| 2008/0112334 A1* | 5/2008 | Laroia et al. .................. 370/254 |
| 2008/0214196 A1* | 9/2008 | Sambhwani et al. .......... 455/446 |
| 2008/0260073 A1* | 10/2008 | Jin et al. ....................... 375/340 |
| 2008/0268855 A1 | 10/2008 | Hanuni et al. |
| 2008/0301246 A1* | 12/2008 | Gkantsidis et al. ........... 709/206 |
| 2008/0311855 A1* | 12/2008 | Manousakis et al. ......... 455/67.11 |
| 2008/0316966 A1 | 12/2008 | Joshi et al. |
| 2009/0003342 A1* | 1/2009 | Dickens et al. ............... 370/390 |
| 2009/0011785 A1* | 1/2009 | Celebi et al. .................. 455/522 |
| 2009/0013232 A1 | 1/2009 | Wan et al. |
| 2009/0016311 A1 | 1/2009 | Wu et al. |
| 2009/0016317 A1 | 1/2009 | Wu et al. |
| 2009/0019169 A1* | 1/2009 | Li et al. ........................ 709/228 |
| 2009/0019173 A1 | 1/2009 | Wu et al. |
| 2009/0028258 A1 | 1/2009 | Ma et al. |
| 2009/0122810 A9* | 5/2009 | Jin et al. ....................... 370/468 |
| 2009/0198825 A1* | 8/2009 | Miller et al. .................. 709/230 |
| 2009/0240833 A1* | 9/2009 | Zhang .......................... 709/236 |
| 2009/0296591 A1 | 12/2009 | Urabe et al. |
| 2010/0020816 A1* | 1/2010 | Gulati et al. .................. 370/412 |
| 2010/0050001 A1* | 2/2010 | Grob et al. .................... 713/310 |
| 2011/0026404 A1 | 2/2011 | Rappaport |
| 2011/0228691 A1 | 9/2011 | Wu et al. |

FOREIGN PATENT DOCUMENTS

| | | |
|---|---|---|
| EP | 1257140 | 11/2002 |
| EP | 1619832 | 1/2006 |
| JP | 2002534869 A | 10/2002 |
| JP | 2003046482 A | 2/2003 |
| JP | 2003511925 A | 3/2003 |
| JP | 2003524941 A | 8/2003 |
| JP | 2004260422 | 9/2004 |
| JP | 2005318634 A | 11/2005 |
| JP | 2006101400 A | 4/2006 |
| JP | 2006238505 | 9/2006 |
| JP | 2006304294 A | 11/2006 |
| JP | 2006528869 A | 12/2006 |
| JP | 2007013649 | 1/2007 |
| JP | 2007520968 A | 7/2007 |
| KR | 20010093219 | 10/2001 |
| KR | 20010112410 | 12/2001 |
| KR | 20040065284 | 7/2004 |
| KR | 20050100358 A | 10/2005 |
| TW | 533706 | 5/2003 |
| TW | 200625855 | 7/2006 |
| WO | 0030374 | 5/2000 |
| WO | 0040045 | 7/2000 |
| WO | 0041543 | 7/2000 |
| WO | WO0126397 A1 | 4/2001 |
| WO | 02087204 | 10/2002 |
| WO | 03105353 | 12/2003 |
| WO | 2004053940 | 6/2004 |
| WO | 05011211 | 2/2005 |
| WO | 2005013590 A1 | 2/2005 |
| WO | 2005025148 | 3/2005 |
| WO | WO2005076544 | 8/2005 |
| WO | 2006034819 A1 | 4/2006 |

(56) References Cited

FOREIGN PATENT DOCUMENTS

| WO | 2006075277 | | 7/2006 |
|---|---|---|---|
| WO | 2006088301 | A1 | 8/2006 |
| WO | WO2006102746 | A1 | 10/2006 |
| WO | WO2006132328 | A1 | 12/2006 |
| WO | WO2006134472 | A2 | 12/2006 |
| WO | WO2007061014 | A1 | 5/2007 |

OTHER PUBLICATIONS

"International Search Report—PCT/US08/69444, International Search Authority—European Patent Office—Nov. 28, 2008".
"Written Opinion—PCT/US08/69444, International Search Authority—European Patent Office—Nov. 28, 2008".
Taiwan Search Report—TW097126112—TIPO—Feb. 16, 2012.

\* cited by examiner

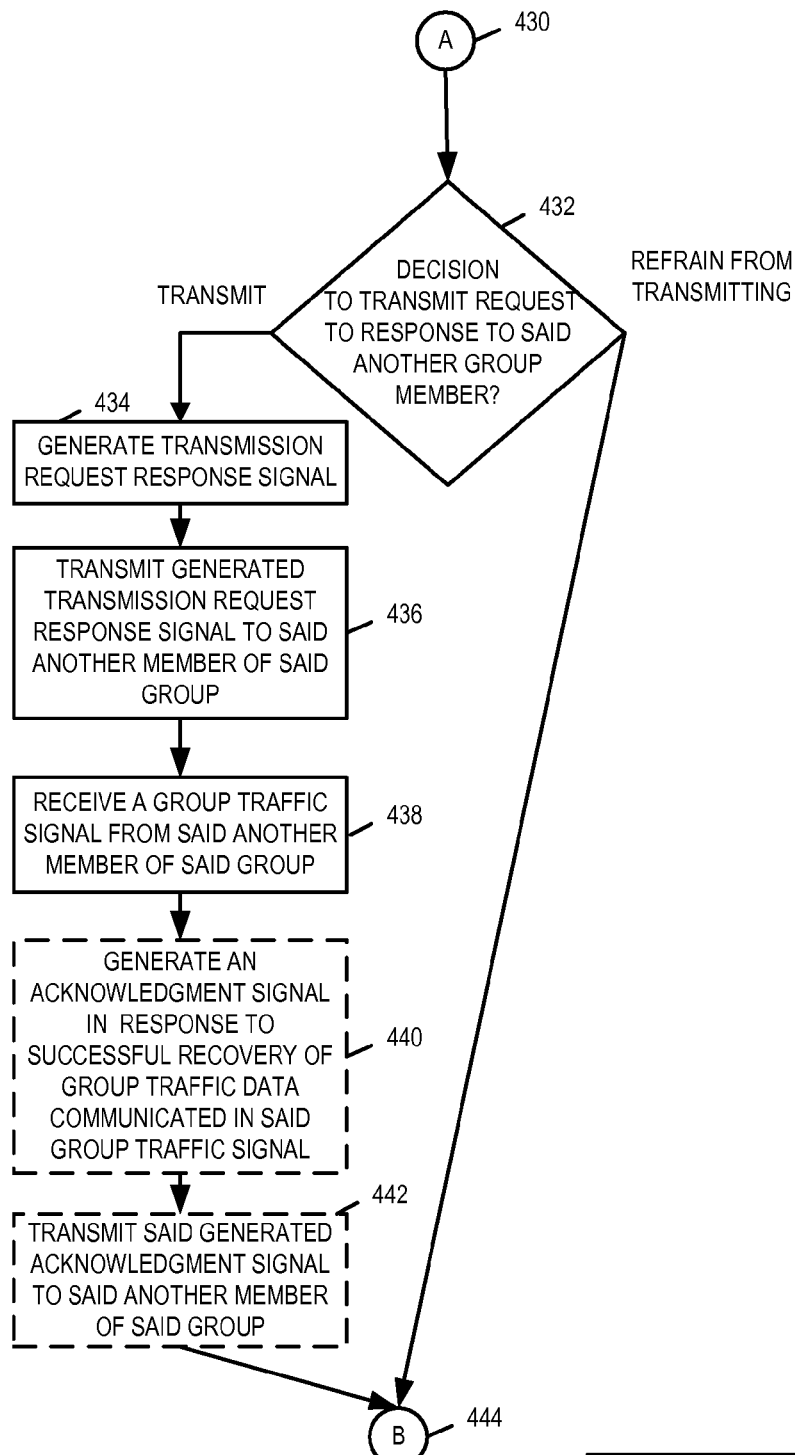

METHOD AND APPARATUS FOR COMMUNICATING TRANSMISSION REQUESTS TO MEMBERS OF A GROUP AND/OR MAKING GROUP RELATED TRANSMISSION DECISIONS

RELATED APPLICATIONS

The present application claims the benefit of U.S. Provisional Patent Application Ser. No. 60/948,968 filed on Jul. 10, 2007, titled "METHODS AND APPARATUS FOR SENDING BROADCAST/MULTICAST MESSAGES IN A PEER-TO-PEER NETWORK", and assigned to the assignee hereof and which is hereby expressly incorporated by reference in its entirety.

FIELD

Various embodiments relate to wireless communications, and more particularly, to methods and apparatus related to supporting group communications.

BACKGROUND

In a wireless communications system there is typically a fixed amount of air link resources available for utilization by wireless communications devices for combined control signaling and traffic signaling. In a wireless communications system lacking centralized control, e.g., an ad hoc peer to peer network, the scheduling of traffic air link resources is a challenging task.

At times a single device in a peer to peer network may desire to transmit the same data to a plurality of other devices in the network. One can simply transmit multiple copies of the same data to the plurality of intended recipients. However, this tends to waste the valuable traffic air link resources. It would be beneficial if new methods and apparatus were developed which supported group communications, thus allowing the same traffic signal to be communicated efficiently to multiple other group members.

SUMMARY

Methods and apparatus related to group communications in a wireless communications system, e.g., a peer to peer wireless communications system, are described. Methods and apparatus directed to closed groups, e.g., where the number of group members are fixed at a given time and known to one or more members of the group, are described. Various embodiments are well suited to decentralized peer to peer wireless networks including a plurality of individual traffic resources, e.g., traffic slots and/or traffic segments, which may be independently scheduled in a decentralized manner. Approaches for implementing distributed scheduling for traffic air link resources which may carry group traffic signals and/or peer to peer traffic signals are described.

Various aspects are directed to the transmitter side including: group traffic transmission request transmissions, reception of request response signaling, transmitter yielding decisions, group rate determination and/or group traffic data signaling. Other aspects are directed to the receiver side including: reception of group traffic transmission request signals, receiver yielding decisions, transmitting group request responses signals, and/or receiving group traffic signaling.

An exemplary method of operating a first peer-to-peer communications device to implement group communications, in accordance with some embodiments, includes transmitting a first plurality of transmission requests corresponding to multiple connections, said first plurality of transmission requests corresponding to a first data transmission block, individual ones of said multiple connections being between said first peer to peer communications device and other peer-to-peer communications devices in a communications group. The exemplary method further comprises transmitting data to said other peer-to-peer communications devices in said first data transmission block.

An exemplary communications device, e.g., an exemplary peer-to-peer communications device, supporting group communications, in accordance with some embodiments, includes: a wireless transmitter; and a transmission request control module configured to control said wireless transmitter to transmit a plurality of transmission requests corresponding to multiple connections, said plurality of transmission requests corresponding to a data transmission block, individual ones of said multiple connections being between said peer to peer communications device and other peer-to-peer communications devices in a communications group. In some such embodiments, the exemplary communication device further comprises a data transmission control module configured to control said wireless transmitter to transmit data to said other peer-to-peer communications devices in said data transmission block.

Another exemplary method of operating a peer-to-peer communications device to implement group communications, in accordance with some embodiments, includes: receiving a first plurality of transmission requests corresponding to connections corresponding to a communications group and at least one transmission request corresponding to a non-group connection, said first plurality of transmission requests and said at least one transmission request corresponding to a non-group connection corresponding to a first data transmission block. The exemplary method further comprises making a decision whether or not to transmit a transmission request response to another member of said group from which a transmission request was received as a function of a priority of a connection between the second communications device and said another member of said group and a priority corresponding to said non-group connection without taking into consideration transmission requests received from other members of said group.

An exemplary communications device, e.g., a peer-to-peer communications device, supporting group communications, in accordance with some embodiments includes: a wireless receiver module configured to receive a first plurality of transmission requests corresponding to connections corresponding to a communications group and at least one transmission request corresponding to a non-group connection, said first plurality of transmission requests and said at least one transmission request corresponding to a non-group connection corresponding to a first data transmission block. The exemplary communications device further includes a group request response decision module configured to make a decision whether or not to transmit a transmission request response to another member of said group from which a transmission request was received as a function of a priority of a connection between the communications device and said another member of said group and a priority corresponding to said non-group connection without taking into consideration transmission requests received from other members of said group.

While various embodiments have been discussed in the summary above, it should be appreciated that not necessarily all embodiments include the same features and some of the features described above are not necessary but can be desir-

DETAILED DESCRIPTION

Figure 1:
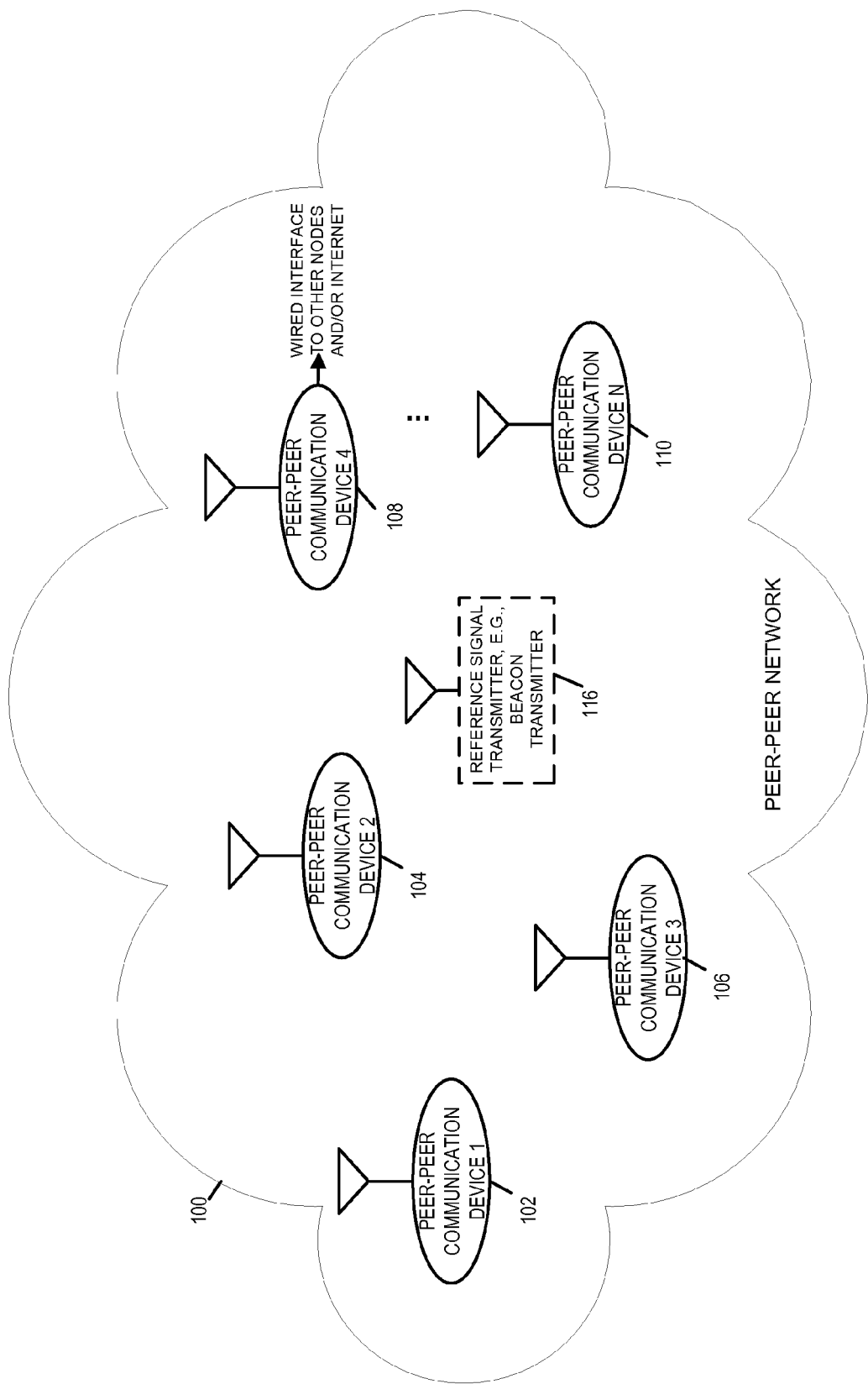
FIG. 1 is a drawing of an exemplary peer to peer network, e.g., an ad-hoc communications network, in accordance with an exemplary embodiment.

FIG. 1 is a drawing of an exemplary peer to peer network 100, e.g., an ad-hoc communications network, in accordance with an exemplary embodiment. The exemplary network supports the establishment of groups and the transmission of group traffic signaling. Exemplary peer to peer network 100 includes a plurality of wireless devices (peer to peer communications device 1 102, peer to peer communications device 2 104, peer to peer communications device 3 106, peer to peer communications device 4 108, . . . , peer to peer communications device N 110) supporting peer to peer traffic signaling and group traffic signaling. In some embodiments, the network 100 includes a reference signal transmitter 116, e.g., a beacon transmitter.

The wireless devices (102, 104, 106, 108, . . . , 110) in the communications network 100 can establish connections with one another and form groups. There is a recurring timing structure used in the network 100. In some embodiments a reference signal, e.g., an OFDM beacon signal from reference signal transmitter 116, is used by a wireless device to synchronize with respect to the timing structure. Alternatively, a signal used to synchronize with the timing structure may be sourced from another device, e.g., a GPS transmitter, a base station or another peer to peer device. The timing structure used in the network includes a plurality of individual traffic slots.

Figure 2:
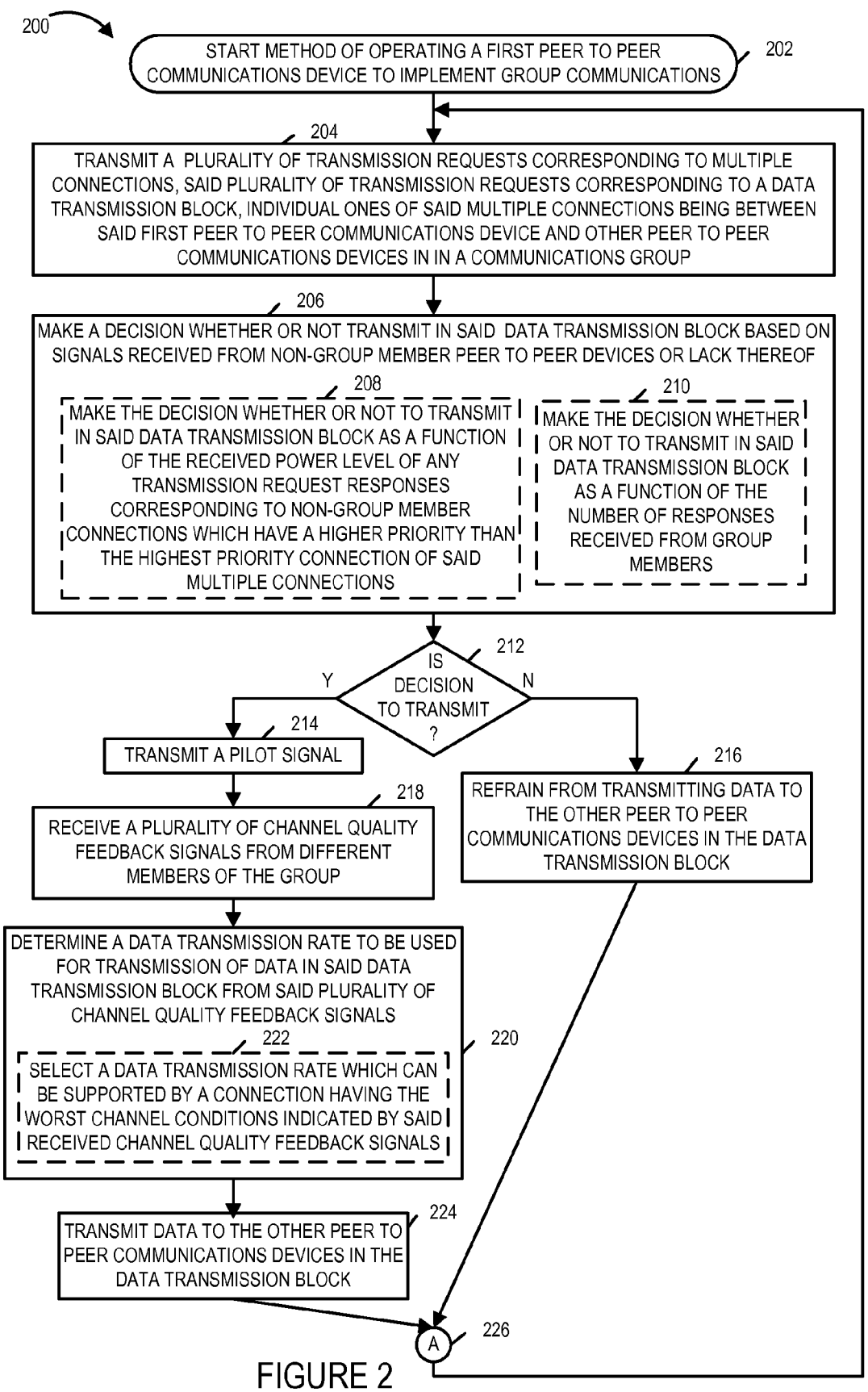
FIG. 2 is a drawing of a flowchart of an exemplary method of operating a first peer to peer communications device to implement group communications.

FIG. 2 is a drawing of a flowchart 200 of an exemplary method of operating a first peer to peer communications device to implement group communications. Operation of the exemplary method starts in step 202, where the first device is powered on and initialized and proceeds to step 204.

In step 204 the first device transmits a plurality of transmission requests corresponding to multiple connections, said plurality of transmission requests corresponding to a data transmission block, individual ones of said multiple connections being between said first peer to peer communications device and other peer to peer communications devices in a communications group. In some embodiments, the plurality of transmission requests are transmitted in a transmission request block. Operation proceeds from step 204 to step 206

In step 206 the first device makes a decision whether or not transmit in said data transmission block based on signal received from non-group member peer to peer devices or lack thereof. In various embodiments, step 206 includes one or more of sub-steps 208 and 210. In sub-step 208, the first device makes the decision whether or not to transmit in said data transmission block as a function of the received power level of any transmission request responses corresponding to non-group member connections which have a higher priority than the highest priority connection of said multiple connections. In sub-step 210 the first device makes the decision whether or not to transmit in the data transmission block as a function of the number of responses received from group members.

Operation proceeds from step 206 to step 212. In step 212 the first device proceeds differently as a function of the decision of step 206. If the decision is to transmit in the data transmission block, then operation proceeds from step 212 to step 214. However, if the decision is not to transmit, then operation proceeds from step 212 to step 216.

Returning to step 214, in step 214, the first device transmits a pilot signal. Then in step 218 the first device receives a plurality of channel quality feedback signals from different members of the group. Operation proceeds from step 218 to step 220.

In step 220 the first device determines a data rate to be used for transmission of data in said data transmission block from said plurality of channel quality feedback signals. In some embodiments, step 220 includes sub-step 222. In sub-step 222 the first device selects a data transmission rate which can be supported by a connection having the worst channel conditions indicated by said received channel quality feedback signals.

Operation proceeds from step 220 to step 224. In step 224 the first device transmits data to the other peer to peer communications devices in the data transmission block. Operation proceeds from step 224 to connecting node A 226.

Returning to step 216, in step 216 the first device refrains from transmitting data to the other peer to peer communications devices in the data transmission block. Operation proceeds from step 216 to connecting node A 226.

Operation proceeds from connecting node A 226 to step 204, where the first device transmits a plurality of transmission requests corresponding to multiple connections corresponding to another transmission block.

Consider several exemplary passes through the flowchart. For the first pass, consider that the data transmission block, referred to in step 204, is a first data transmission block. Consider that the first communications device has received transmission request responses corresponding to at least some non-group members which correspond to connections having higher priority than the highest priority connection of the multiple connections between the first device and the other devices in its group. Further consider that the received power level of the received transmission request responses corresponding to the non-group member of higher priority connections are below a threshold; the first device decides, in step 206, that it is ok to transmit in the first transmission block since it anticipates that interference caused by its data transmission is acceptable from the perspective of the higher priority non-group member connections. Operations proceed along the path of steps 214, 218, 220 and 224 resulting in the transmission of data to the other peer to peer communications devices in the group in the first data transmission block.

Now consider an exemplary second pass through the flowchart. For the second pass, consider that the data transmission block, referred to in step 204, is a second data transmission block. Consider that the first communications device has received transmission request responses corresponding to at least some non-group members which correspond to connections having higher priority than the highest priority connection of the multiple connections between the first device and the other devices in its group. Further consider that a received power level of a received transmission request response corresponding to a non-group member of a higher priority connection is above a threshold; the first device decides, in step 206, to perform transmitter yielding and not to transmit in the second transmission block since it anticipates that interference that would be caused by its data transmission is unacceptable from the perspective of the higher priority non-group member connection. Operation proceeds to step 216 in which the first device is controlled to refrain from transmitting data to the other peer to peer device in the group in the second data transmission block.

Now consider an exemplary third pass through the flowchart. For the third pass, consider that the data transmission block, referred to in step 204, is a third data transmission block. Consider that the first communications device has not received transmission request responses corresponding to any non-group members which correspond to connections having higher priority than the highest priority connection of the multiple connections between the first device and the other devices in its group. Further consider that the first device has transmitted transmission requests to a first number of group member in step 204, e.g., 10 member, and consider that the first device has detected request responses, e.g., positive acknowledgments from a second number of the group member, e.g., 8 members. In this case the first device decides to proceeds with the transmission since a high number and/or high percentage of group member requested devices have positively responded. Operation proceeds along the path including steps 214, 218, 220 and 224 resulting in transmission of data by the first device in the third data transmission block.

Now consider an exemplary fourth pass through the flowchart. For the fourth pass, consider that the data transmission block, referred to in step 204, is a fourth data transmission block. Consider that the first communications device has not received transmission request responses corresponding to any non-group members which correspond to connections having higher priority than the highest priority connection of the multiple connections between the first device and the other devices in its group. However the first communications device has detected one or more request response corresponding to lower priority connections. Further consider that the first device has transmitted transmission requests to a third number of group member in step 204, e.g., 9 members, and consider that the first device has detected request responses, e.g., positive acknowledgments from a fourth number of the group member, e.g., 2 members. In this case the first device decides to not to proceed with the transmission since a low number and/or low percentage of group member requested devices have positively responded. Operation proceeds along the path including step 216 resulting in the first device refraining from transmitting data in the fourth data transmission block.

Figure 3:
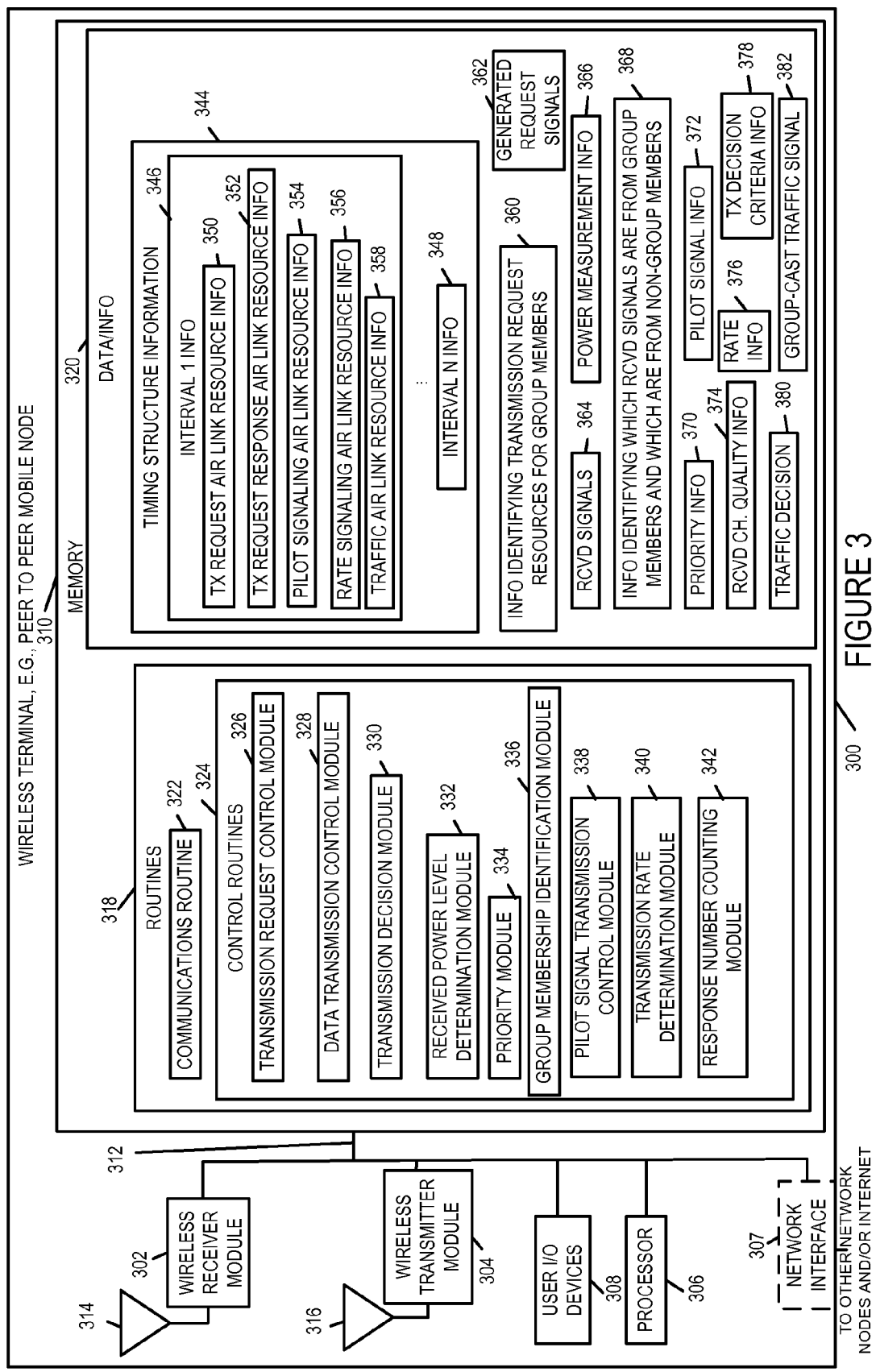
FIG. 3 is a drawing of an exemplary wireless terminal, e.g., a peer to peer mobile node supporting group communications in accordance with an exemplary embodiment.

FIG. 3 is a drawing of an exemplary wireless terminal, e.g., a peer to peer mobile node supporting group communications in accordance with an exemplary embodiment. Wireless terminal 300 includes a wireless receiver module 302, a wireless transmitter module 304, user I/O devices 308, a processor 306, and memory 310 coupled together via a bus 312 over which the various elements may interchange data and information. In some embodiments, the wireless terminal 300 also includes a network interface 307 which couples the wireless terminal, e.g., via a backhaul network, to network nodes and/or the Internet.

Memory 310 includes routines 318 and data/information 320. The processor 306, e.g., a CPU, executes the routines 318 and uses the data/information 320 in memory 310 to control the operation of the wireless terminal 300 and implement methods, e.g., the method of flowchart 200 of FIG. 2.

Wireless receiver module 302, e.g., an OFDM and/or CDMA receiver, is coupled to receive antenna 314 via which the wireless terminal 300 receives signals from other wireless terminals. Received signals include, e.g., request response signals from group member peer to peer wireless terminals to which wireless terminal 300 has sent a request and request response signals from non-group member peer to peer wireless terminals, and channel quality feedback signals from group member peer to peer devices in response to a transmitted pilot signal.

Wireless transmitter module 304, e.g., an OFDM and/or CDMA transmitter, is coupled to transmit antenna 316 via which the wireless terminal 300 transmits signals to other peer to peer devices, e.g., to members of its group. Transmitted signals include individual request signals directed to individual members of its group, a pilot signal transmitted as a broadcast signal intended to be received and measured by members of its group, and a traffic signal directed to members of its group. In some embodiments, the same antenna is used for transmitter and receiver.

User I/O devices 308 include, e.g., a microphone, a speaker, a keyboard, a keypad, a camera, switches, a display, etc. User I/O devices 308 allow an operator of wireless terminal 300 to input data/information, access output data/information, and control at least some functions of the wireless terminal 300.

Routines 318 include a communications routine 322 and wireless terminal control routines 324. The communications routine 322 implements the various communications protocols used by the wireless terminal 300. Control routines 324 include a transmission request control module 326, a data transmission control module 328, a transmission decision module 330, a received power level determination module 332, a priority module 334, a group member identification module 336, a pilot signal transmission control module 338, a transmission rate determination module 340 and a response number counting module 342. Data/information 320 includes timing structure information 344, information identifying transmission request resources for group members 360, generated request signals 362, received signals 364, power measurement information 366, information identifying which received signals are from group members and which are from non-group members 368, priority information 370, pilot signal information 372, received channel quality information 374, rate information 376, transmission decision criteria information 378, traffic decision 380, and a group-cast traffic signal 382.

Timing structure information 344 includes information corresponding to a plurality of intervals (interval 1 information 346, . . . , interval N information 348) in a recurring peer to peer timing structure. Interval 1 information 346 includes transmission request air link resource information 350, transmission request response air link resource information 352, pilot signaling air link resource information 354, rate signaling air link resource information 356, and traffic air link resource information 358. Transmission request air link resource information 350 includes information identifying a first traffic transmission request block including a plurality of individual transmission units associated with different connection identifiers and associated with different priority levels in the block. Transmission request response air link resource information 352 includes information identifying a first traffic transmission request response block including a plurality of individual transmission units associated with different connection identifiers and associated with different priority levels in the block. Pilot signaling air link resource information 354 includes information identifying resources to be used to carry pilot signals including a plurality of individual resources associated with different connection identifiers. Rate signaling air link resource information 356 includes information identifying individual resources associated with connection identifiers to be used to carry channel feedback information in response to a received pilot signal. Traffic air link resource information 358 includes information identifying a data transmission block, e.g. a traffic segment, to be used to carry traffic signals including a group-cast traffic signal.

Transmission request control module 326 controls the wireless transmitter module 304 to transmit a plurality of transmission requests corresponding to multiple connections, said plurality of transmission requests corresponding to a data transmission block, individual ones of the multiple connections being between the peer to peer communications device 300 and other peer to peer communications devices in a communications group. The plurality of transmission requests are transmitted in a transmission request block, e.g., the transmission request block identified by information 350 corresponding to interval 1. For example, consider that the requests are to be for using the traffic transmission block identified by information 358. The transmission request control module 326 controls the wireless transmitter module 304 to transmit generated request signal 362 to its group members using transmission units identified by information 360 which are a subset of the transmission units identified by information 350.

Data transmission control module 328 controls the wireless transmitter module 304 to transmit data to other peer to peer communications devices in a data transmission block. For example, data transmission control module 328 controls the wireless transmitter module 304 to transmit group-cast traffic signal 382 using the traffic transmission block identified by information 358 in response to a positive decision to transmit in interval 1. Data transmission control module 328, which is responsive to the transmission decision module 330 controls the wireless transmitter module 304 to refrain from transmitting data in a data transmission block when the transmission decision module 330 decides not to transmit in the data transmission block.

Transmission decision module 330 makes a decision whether or not to transmit in a data transmission block based on signals received from non-group member peer to peer devices or lack thereof. For example, detected request response signals above a threshold level from non-group member signals corresponding to a higher priority connection than the highest group member connection, in some embodiments, results in a decision not to transmit. Traffic decision 380 is an output of transmission decision module 330 and is used as an input by data transmission control module 328.

Received power level determination module 332 determines the received power level of request response signals from other peer to peer wireless terminals. Received signals 364 include request response signals, e.g., RX echo signals, signifying that the wireless terminal which received a transmission request agrees to proceed with the transmission. The received request response signals may be sourced from group member wireless terminals to which wireless terminal 300 sent a request and from other wireless terminals corresponding to connections of which wireless terminal 300 is not a member. Power measurement information 366 includes information output from received power level determination module 332 and used as input by transmission decision module 330.

Priority module 353 determines the transmission priority associated with the connections of the group to which requests have been transmitted by wireless terminal 300 and the transmission priority associated with other connection which are not associated with the group. Priority information 370 is an output of priority module 334 and is used as an input by transmission decision module 330, e.g., in making transmission yielding decisions.

Group membership identification module 336 identifies which of the received request response signals in received signals 364 are from a group member and which of the received signals are from non-group members. Information 368 is an output of group membership identification module 336 and is used by transmission decision module 330. In some embodiments, individual transmission units within a transmission request response air link resource, e.g., the transmission request response block identified by information 352, are associated with different connection identifiers, and such information is used by group membership identification module 336.

At times, the transmission decision module 330 determines whether or not to transmit in a data transmission block as a function of the received power level of transmission request responses corresponding to non-group member connections which have been received and which have a higher priority than the highest priority connection of multiple connections of the group to which wireless terminal 300 belongs.

Pilot signal transmission control module 338 controller the transmitter module 304 to transmit, subsequent to the transmission of a plurality of transmission requests, a pilot signal. Pilot signal information 372 includes information specifying the characteristics of the pilot signal, e.g., transmission power level, signature and/or information of the pilot signal. In some embodiments, the pilot signal is a CDMA signal while the request signals are OFDM signals. In this embodiment, a single pilot signal is controlled to be broadcast intended to be detected by multiple group members, wherein individual transmission request signals are transmitted to individual group members. Pilot signal information 372 also includes information identifying the air link resource to be used to convey the pilot signal, e.g., the transmission unit or units within pilot signaling air link resource information 356 corresponding to one of the connections of the group.

Receiver module 302 receives, prior to transmission by the transmitter module 304 of data in a data transmission block, a plurality of channel quality feedback signals from different members of the group to which the wireless terminal 300 sent transmission requests. Received channel quality information 374 includes information conveyed by those signals, e.g., a channel quality estimate, a received power level, and/or information identifying a data rate supported by the channel. Channel quality information communicated to the wireless terminal 300 is in response to and based upon the pilot signal previously transmitted by wireless terminal 300.

Transmission rate determination module 340 determines a data transmission rate to be used for transmission of data in a data transmission block based on a plurality of received channel quality feedback signals. In some embodiments, transmission rate determination module 340 determines a data transmission rate by selecting a data transmission rate which can be supported by a connection having the worst channel conditions indicated by the received channel quality feedback signals. In other embodiments, a different criteria is utilized for selecting a data transmission rate. For example, in one embodiment, the data transmission rate is chosen which satisfies a determined number or a determined percentage of the wireless terminals which have responded. In another embodiment, one or more outlier rate points, which deviate from a mean or median value are omitted in the consideration of the rate determination.

Response number counting module 342 counts a number of responses received in response to the plurality of transmission requests which were transmitted by wireless terminal 300 in a request transmission block as part of a group request. In some embodiments, the transmission decision module 330 makes a decision whether or not to transmit data in a data transmission block based on the number of responses received from group members. In some embodiments, if a minimum number or minimum percentage of wireless terminals to which a request was transmitted have not positively responded, the transmission decision module 330 decides not to transmit in the data transmission block based on the count from the response number counting module 342. For example, consider that wireless terminal has transmitted transmission request signals to 8 group members, but has only received one request response signal, in such a case, in some embodiments, the transmission decision module 330 may decide to refrain from transmitting in the data transmission block.

Figure 4A:
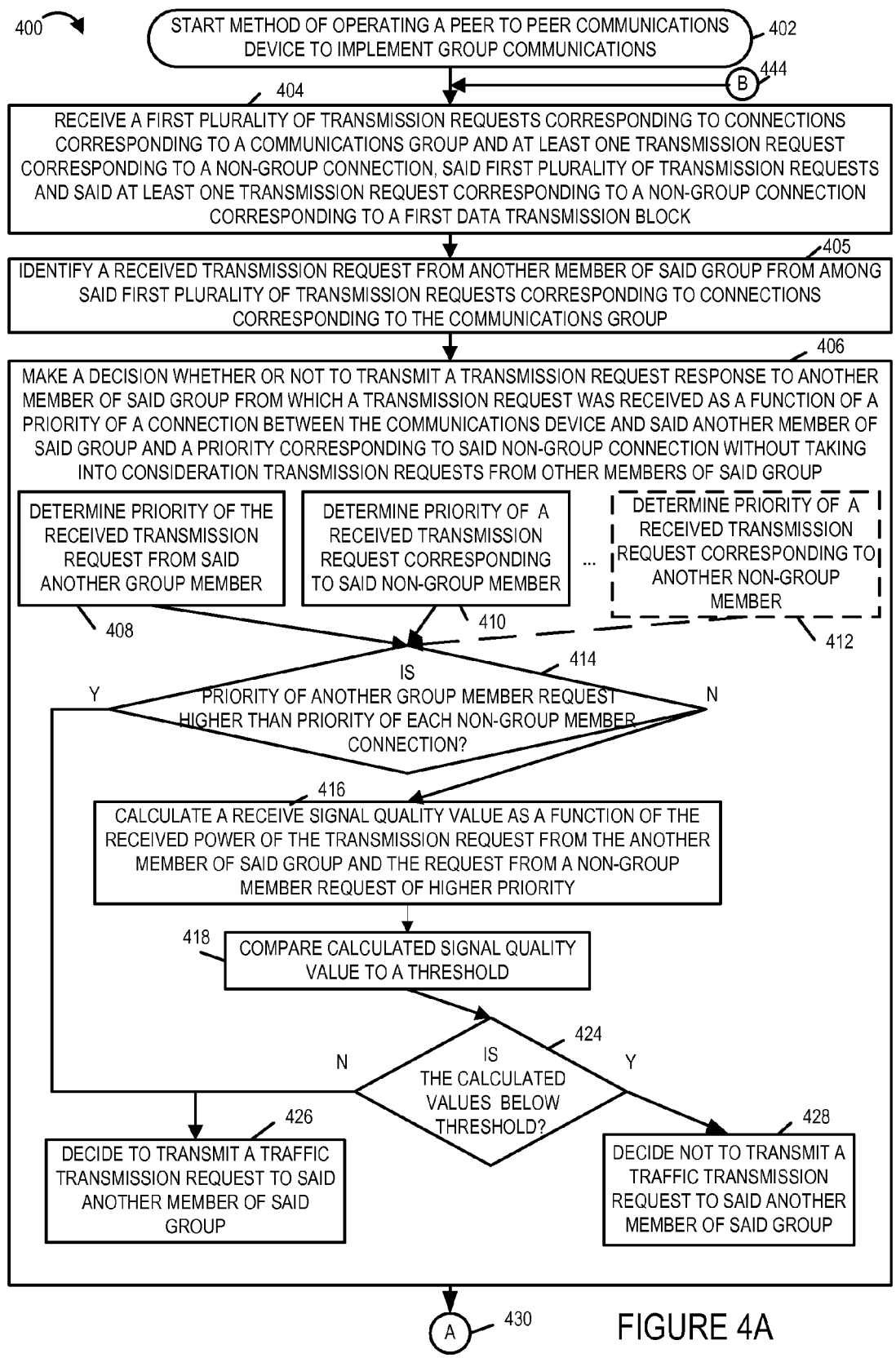
FIG. 4, which comprises the combination of FIGS. 4A and 4B, is a flowchart of an exemplary method of operating a peer to peer communications device to implement group communications.

FIG. 4 is a flowchart 400 of an exemplary method of operating a peer to peer communications device to implement group communications. Operation of the exemplary method starts in step 402, where the communications device receives a first plurality of transmission requests corresponding to a communications group and at least one transmission request corresponding to a non-group connection, said first plurality of transmission requests and said at least one transmission request corresponding to a non-group connection corresponding to a first data transmission block. In some embodiments, the first plurality of the transmission requests corresponding to connections corresponding to a communications group are received from a first transmission request block. In some such embodiments, the first plurality of transmission requests corresponding to connections corresponding to a communications group and the at least one transmission request corresponding to a non-group connection are received from the first transmission request block. In some embodiments, priority is conveyed by position of a request in the first transmission request block. Operation proceeds from step 404 to step 405.

In step 405, the communications device identifies a received transmission request from another member of said group from among said first plurality of transmission requests corresponding to connections corresponding to the communications group. In some embodiments, identifying the received transmission request from said another member of the group includes identifying the received transmission request from among said first plurality of transmission requests having the highest priority. In some embodiments, identifying the received transmission request from said another member of the group includes selecting the received transmission request from among said first plurality of transmission requests which has the highest priority as the identified received transmission request from said another member of the group.

In step 406 the communications device makes a decision whether or not to transmit a transmission request response to another member of said group from which a transmission request was received as a function of a priority of a connection between the communications device and said another member of said group and a priority corresponding to said non-group connection without taking into consideration transmission requests from other members of said group. Step 406 includes sub-steps 408, 410, 414, 416, 418, 424, 426 and 428. Step 406 may, and sometimes does, include sub-step 412.

In sub-step 408, the communications device determines the priority of the received transmission request from said another group member. In sub-step 410 the communications device determines a priority of a received transmission request corresponding to said non-group member. In sub-step 412, the communications device determines priority of a received transmission request corresponding to another non-group member. Sub-step 412 may be, and sometimes is, repeated multiple times corresponding to different received requests from non-group members, e.g., depending upon the number of received transmission requests from non-group members.

Operation proceeds from sub-steps 408 and 410, and 412 when performed, to sub-step 414. In sub-step 414 the communications device determines whether or not the priority of the received transmission request from the another group member of sub-step 408 is higher than the priority of each of the received transmission requests corresponding to non-group members. If the priority of the received transmission request from said another group member is higher than the priority of the received transmission requests from non-group members, then operation proceeds from sub-step 414 to sub-step 426; otherwise, operation proceeds from sub-step 414 to sub-step 416.

In sub-step 414 the communications device calculates a receive signal quality value as a function of the received power of the transmission request from the another member of said group and the request from a non-group member request of higher priority. If there are multiple received transmission requests corresponding to non-group members of higher priority, then the calculation of the receive signal quality value in step 416 is, in some embodiments, also calculated as a function of the received power of the other non-group member requests of higher priority. Operation proceeds from sub-step 416 to sub-step 418. In sub-step 418 the communication device compares the calculated signal quality value of sub-step 416 to a threshold. Operation proceeds from sub-step 418 to sub-step 424.

There may be, and sometimes are, a plurality of received requests corresponding to non-group member connections which have a higher priority than the request from the another group member. For example, consider that there are five received transmission requests corresponding to non-group members and three of the five are higher priority than the received transmission request from the another group member. In such as example, the communications device may determine the priority corresponding to each of the five received requests from non-group members. Then, in sub-step 416 the communications device may calculate the receive quality value as a function of the received power from the transmission request from the another member of the group and from the received power of three requests from non-group member requests of higher priority.

Returning to step 424, in step 424 the communications device determines whether or not the calculated value of sub-step 416 is below a threshold. If the calculated values of step 416 is below the threshold applied in the comparison of step 418, then operation proceeds from step 424 to step 428, where the communications device decides not to transmit a traffic transmission request to said another member of the group; otherwise, operation proceeds from step 424 to step 426. The decision of step 428 not to transmit a traffic transmission request to said another group member is a receiver yielding decision to yield the traffic transmission resource. Returning to step 426, in step 426 the communications device decides to transmit a traffic transmission request to said another member of the group.

Operation proceeds from step 406 via connecting node A 430 to step 432. If the decision of step 406 is to transmit a request response to said another group member from which a transmission request was received, then operation proceeds from step 432 to step 434; otherwise, operation proceeds from step 432 to connecting node B 444.

In step 434, the communications device generates a transmission request response signal. Then, in step 436 the communications device transmits the generated transmission request response signal to said another member of said group. Operation proceeds from step 436 to step 438, in which the communications device receives a group traffic signal from said another member of said group on a traffic transmission resource corresponding to the received transmission request from said another member of the group. Operation proceeds from step 438 to step 440, in which the communications device generates an acknowledgment signal in response to successful recovery by the communications device of group traffic data communicated in the group traffic signal. Then, in step 442 the communications device transmits the generated acknowledgment signal to said another member of said group. Operation proceeds from step 442 to connecting node B 444. In some embodiments, acknowledgment signaling corresponding to group traffic signaling is not employed and step 440 and 442 are not included. In such an embodiment, operation proceeds from step 438 to connecting node B 444.

Operation proceeds from connecting node B 444 to the input of step 404, where the communications device receives a second plurality of transmission requests corresponding to a second data transmission block.

Figure 5:
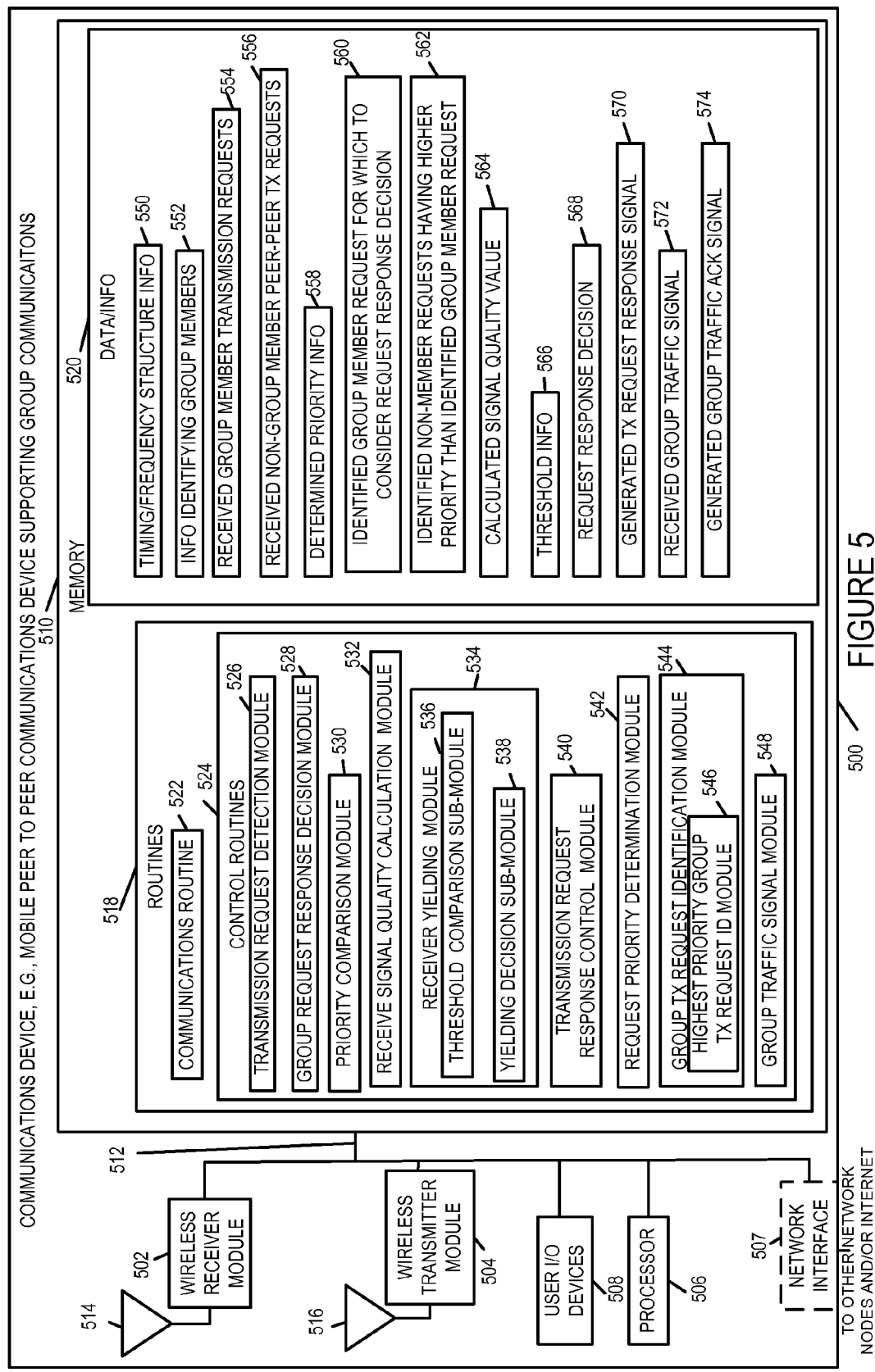
FIG. 5 is a drawing of an exemplary communications device, e.g., a mobile peer to peer communications device supporting group communications in accordance with an exemplary embodiment.

FIG. 5 is a drawing of an exemplary communications device 500, e.g., a mobile peer to peer communications device supporting group communications in accordance with an exemplary embodiment. Exemplary communications device 500 includes a wireless receiver module 502, a wireless transmitter module 504, a processor 506, user I/O devices 508 and a memory 510 coupled together via a bus 512 over which the various elements may interchange data and information. In some embodiments, communications device 500 also includes network interface 507 also coupled to bus 512. Network interface 507 allows the communications device 500 to be coupled to network nodes and/or the Internet via a backhaul network.

Memory 510 includes routines 518 and data/information 520. The processor 506, e.g., a CPU, executes the routines 518 and uses the data/information 520 in memory 510 to control the operation of the communications device 500 and implement methods, e.g., the method of flowchart 400 of FIG. 4.

Wireless receiver module 502, e.g., an OFDM and/or CDMA receiver, is coupled to receive antenna 514 via which the communications device 500 receives signals from other communications devices, e.g., device 300 of FIG. 3. Received signals include, e.g., group establishment signals, traffic transmission requests from group members, traffic transmission requests from non-group members, and group traffic signals, and peer to peer traffic signals. Wireless receiver module 502 may, and sometimes does, receive a first plurality of transmission requests corresponding to connections corresponding to a communications group and at least one transmission request corresponding to a non-group connection, said first plurality of transmission requests and said at least one transmission request corresponding to a non-group connection corresponding to a first data transmission block.

Wireless transmitter module 504, e.g., an OFDM and/or CDMA transmitter, is coupled to transmit antenna 516 via which the communications device 500 transmits signals to other communications devices, e.g., device 300 of FIG. 3. In some embodiments, the same antenna is used for transmitter and receiver. Transmitted signals include, e.g., group establishment signals, traffic transmission request response signals, group traffic acknowledgment signals, and peer to peer traffic acknowledgment signals.

User I/O devices 508 include, e.g., microphone, keyboard, keypad, camera, switches, speaker, display, etc. User I/O devices 508 allow an operator of communications device 500 to input data/information, access output data/information, and control at least some functions of the communications device 500.

Routines 518 include a communications routine 522 and control routines 524. The communications routine 522 implements the various communications protocols used by the communications device 500. Control routines 524 include a transmission request detection module 526, a group request response decision module 528, a priority comparison module 530, a receive signal quality calculation module 532, a receiver yielding module 534, a transmission request response control module 540, a request priority determination module 542, a group transmission request identification module 544 and a group traffic signal module 548. Receiver yielding module 534 includes a threshold comparison sub-module 536 and a yielding decision sub-module 538. Group transmission request identification module 544 includes a highest priority group transmission request identification module 546.

Data/information 520 includes timing/frequency structure information 550, information identifying group members 552, received group member transmission requests 554, received non-group member peer to peer transmission requests 556, determined priority information 558, identified group member request for which to consider request response decision 560, identified non-member transmission requests having higher priority than the identified group member request 562, calculated signal quality value 564, threshold information 566, request response decision 568, generated transmission request response signal 570, received group traffic signal 572, and generated group traffic acknowledgement signal 574.

Transmission request detection module 526 detects transmission request signals received by wireless receiver module 502. Detected transmission requests can, and sometimes do, include a transmission request or requests corresponding to group members and a transmission request or requests corresponding to non-group members. At times, transmission request detection module 526 detects, corresponding to a first data transmission block, a first plurality of transmission request corresponding to a communications group of which device 500 is a member and at least one transmission request corresponding to a non-group connection. The first plurality of transmission requests, in some embodiments, are received from a first transmission request block. In some such embodiments, the at least one transmission request corresponding to a non-group connection is also received from the same first transmission request block. For example, the first transmission request block corresponds to the first data transmission block, and the first transmission request block is used to carry traffic transmission requests requesting to transmit traffic signals in the first data transmission block, e.g., a traffic segment.

Group request response decision module 528 makes a decision whether or not to transmit a transmission request response to another member of a communications group of which device 500 is a member, from which a transmission request was received, as a function of a priority of a connection between the communications device 500 and said another member of the group and a priority corresponding to a non-group connection without taking into consideration transmission requests received from other members of the group. Group request response decision module 528 may, and sometimes does, make its decision as a function of priorities corresponding to multiple non-members connection requests which were received. Group request response decision module 528 may, and sometimes does, make a decision to transmit a transmission request response to another member of the group when each of the received transmission requests from non-group members corresponding to connections have lower priority than the received transmission request from the another member of the group.

Priority comparison module 530 determines if a priority corresponding to a non-group member from which a transmission request was received is higher than a priority corresponding to a transmission request from another member of the group. Priority comparison module 530 may, and sometimes does, perform a plurality of comparisons corresponding to a plurality of non-member received transmission requests for the same transmission request block. Receive signal quality calculation module 532 calculates a receive signal quality value as a function of the received power of a received transmission request from another member of the group and the receive power of a received non-group member transmission request of higher priority. Received signal quality calculation module 532 may, and sometimes does calculate a receive signal quality value as a function of the receive power of a received transmission request from another member of the group and from the received powers from a plurality of non-group member received transmission requests of higher priority.

Receiver yielding module 534 compares a calculated receive signal quality value to a threshold, and when the calculated receive signal quality value is below a threshold, makes a decision not to transmit a transmission request response to the another member of said group from which the group member request was received and for which the calculated receive signal quality value applies. Threshold comparison sub-module 536 performs the comparison between the calculated receive signal quality value and the threshold. Yielding decision sub-module 538 makes the decision whether or not implement receiver yielding based on the threshold comparison determination. The output of the yielding decision sub-module 538 is used an input to the group request response decision module 528.

Transmission request response control module 540 controls the wireless transmitter module 504 to implement the decision of the group request response decision module 528, e.g., transmitting a generated transmission request response signal when the decision is to transmit or controlling the wireless transmitter 504 to refrain from transmitting when the decision is not to transmit. Transmission request response control module 540 controls the wireless transmitter module 504 to transmit a transmission request response to the another member of the group when the group request response decision module 528 makes a decision to transmit a transmission request response to said another member of the group. In this exemplary embodiment, a request response signal transmitted in response to a group transmission request from another member of the communication group is a positive acknowledgment to the transmission request from said another member of the group.

Request priority determination module 542 determines the request priority corresponding to group member transmission requests and non-group member transmission requests. Determined priority information 558 includes output information from request priority determination module 542. In some embodiments, request priority is associated with location of a request in the transmission request block, e.g., in accordance with the timing/frequency structure information 550.

Group transmission request identification module 544 determines the transmission request from among a plurality of transmission requests corresponding to connections corresponding to a communications group corresponding to a data transmission block for which a group request response decision is to be performed. Highest priority group transmission request identification module 546 identifies the highest priority request from among a plurality of transmission requests corresponding to connections corresponding to a communications group corresponding to a data transmission block. In some embodiments, the determined highest priority group transmission request determined by module 546 is the identified request of module 544.

Group traffic signaling module 548 controls the reception of a group traffic signal 572 by wireless receiver module 502, the recovery of group traffic data from received group traffic signal 572, the generation of a group traffic acknowledgment signal 574 and the transmission of the generated group traffic acknowledgment signal 574.

Timing/frequency structure information 550 includes information pertaining to a plurality of traffic slot air link resources, e.g., traffic slot intervals, in a recurring timing structure. In some embodiments, an individual one of the traffic slot air link resources includes information identifying transmission request air link resources, transmission request response air link resources, pilot signaling air link resources, rate signaling air link resources, traffic signaling air link resources, and traffic acknowledgment air link resources. In some embodiments the transmission request air link resources include a transmission request block which includes a plurality of individual transmission units, e.g., OFDM tone-symbols, where an individual transmission unit is designate to carry a transmission request. In some embodiments, the traffic signaling air link resources includes information identifying a data transmission block, e.g., a traffic segment associated with the transmission request block.

Information identifying group members 552 includes information identifying the members of the communications group to which communications device 500 belongs. Received group member transmission requests 554 and received non-group member peer to peer transmission requests 556 represent received transmission requests detected by transmission request detection module 528. Determined priority information 558 includes information output by request priority determination module 542 and which is used as input by priority comparison module 530, receive signal quality calculation module 532, and/or highest priority group transmission request identification module 546. Identified group member request for which to consider request response decision 560 is an output of group transmission request identification module 544. Identified non-member requests having higher priority than the identified group member request 562 is an output of priority comparison module 530. Calculated signal quality value 564, e.g., an SINR value or SNR value, is an output of receive signal quality value calculation module 532 and is used an input by threshold comparison sub-module 536 along with threshold information 566, e.g., a predetermined or dynamically determined value used to determine a minimum level of acceptable expected traffic signal reception quality at device 500 to allow the requested traffic transmission to proceed. Request response decision 568 is an output of group request response decision module 528 and is used as an input by transmission request response control module 540.

In some embodiments, some module or sub-modules shown in the example of FIG. 5 are included as sub-modules in other modules. For example, in some embodiments, request priority determination module 542, receiver yielding module 534, priority comparison module 530 and receive signal quality calculation module 532 are sub-modules of group request response decision module 528.

Figure 6:
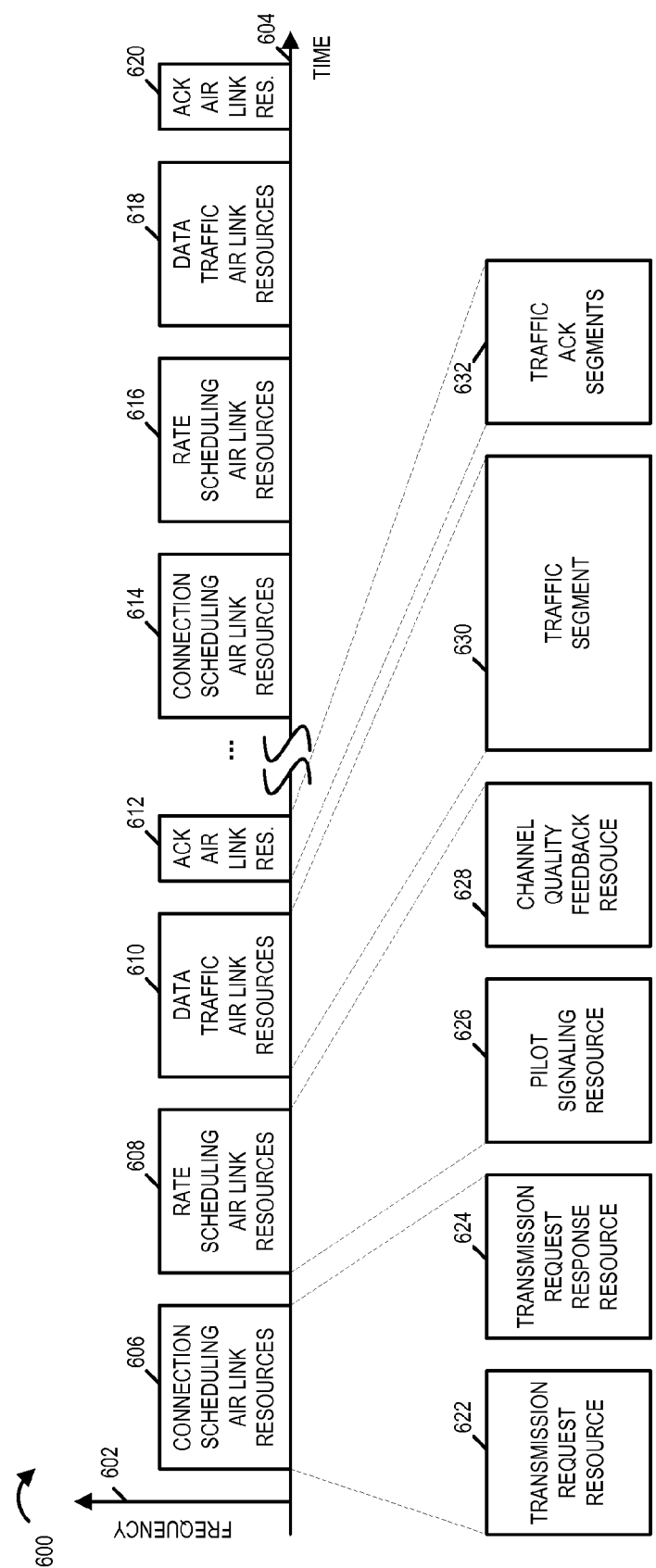
FIG. 6 is a drawing illustrating an exemplary timing structure and exemplary air link resources in an exemplary embodiment.

FIG. 6 is a drawing 600 illustrating an exemplary timing structure and exemplary air link resources in an exemplary embodiment. Vertical axis 602 represents frequency, e.g., OFDM tones, while horizontal axis 604 represents time. The exemplary timing/frequency recurring structure includes a plurality of sets of air link resources associated with traffic. First exemplary set of air link resources associated with traffic includes connection scheduling air link resources 606, rate scheduling air link resources 608, data traffic air link resources 610 and traffic acknowledgment air link resources 612. Exemplary nth set of air link resources associated with traffic includes connection scheduling air link resources 614, rate scheduling air link resources 616, data traffic air link resources 618 and traffic acknowledgment air link resources 620. Connection scheduling air link resources 606 includes traffic transmission request resource 622 and traffic transmission request response resource 624. Rate scheduling air link resources 608 includes pilot signaling resource 626 and channel quality feedback resource 628. Data traffic air link resources 610 includes traffic segment 630. Traffic acknowledgment air link resources 612 include traffic acknowledgment segments 632.

Figure 7:
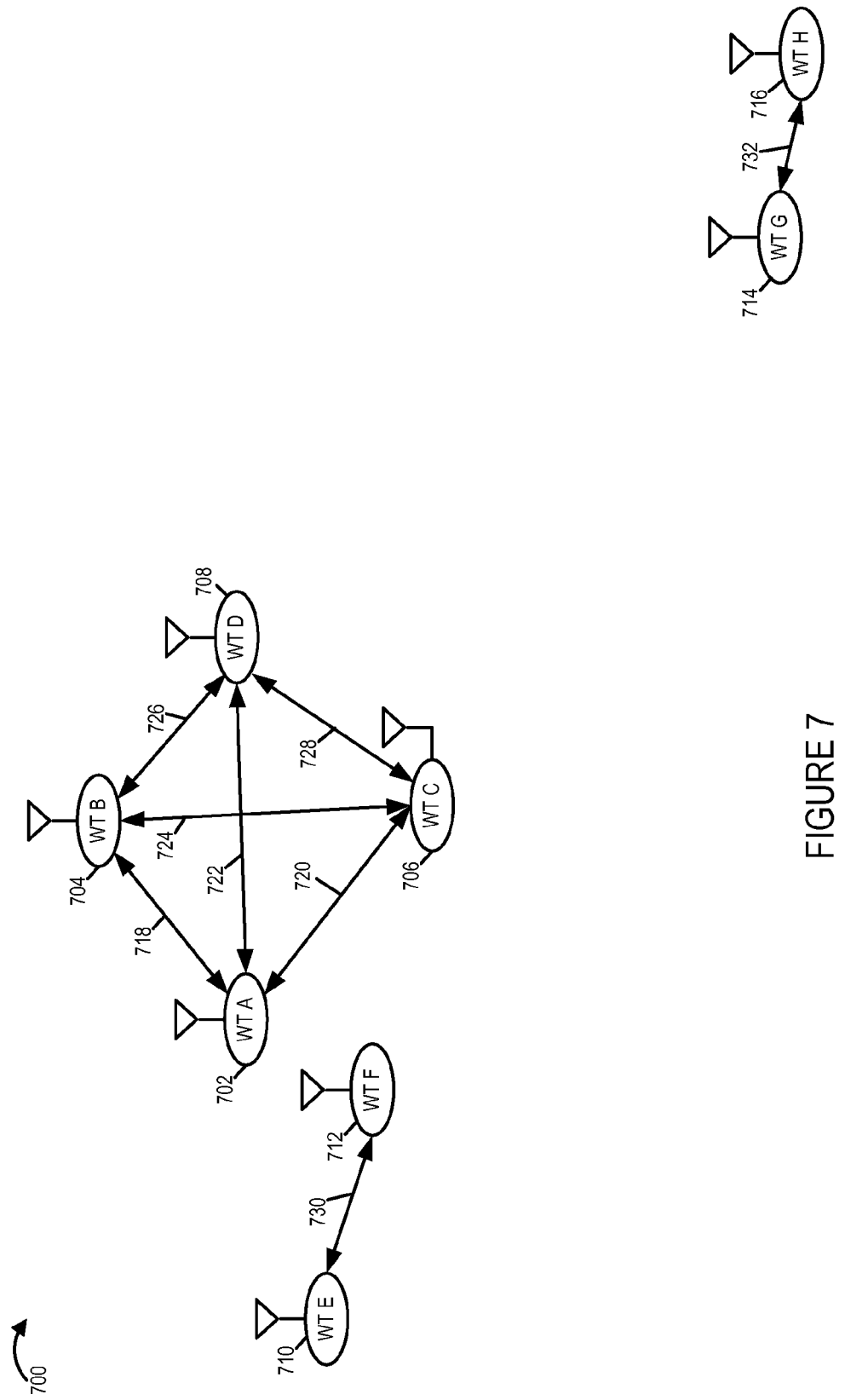
FIG. 7 is a drawing of an exemplary wireless communications network, e.g., an ad hoc peer to peer communications network, supporting peer to peer communications and group traffic signaling.

FIG. 7 is a drawing of an exemplary wireless communications network 700, e.g., an ad hoc peer to peer communications network, supporting peer to peer communications and group traffic signaling. Exemplary wireless communications network 700 includes a plurality of peer to peer wireless communications devices (wireless terminal A 702, wireless terminal B 704, wireless terminal C 706, wireless terminal D 708, wireless terminal E 710, wireless terminal F 712, wireless terminal G 714, wireless terminal H 716). The exemplary wireless network 700 uses a recurring peer to peer timing structure such as that shown in FIG. 6.

In the exemplary illustration of FIG. 7, various wireless terminals in the system have previously established peer to peer connections, e.g., via communications exchanges. In addition some of the wireless terminals have established a group, e.g., via communications exchanges. In this example, WT A 702, WT B 704, WT C 706 and WT D 708 are members of a group. Each wireless terminal of the group has a connection with the other members of the group. WT A 702 has connection (718, 720, 722) with (WT B 704, WT C 706, WT D 708), respectively. In addition WT B 704 has connection (724, 726) with (WT C 706, WT D 708), respectively; WT C 706 has connection 728 with WT D 708. In addition to the group connections, WT E 710 has a peer to peer connection 730 with WT F 712, and WT G 714 has a peer to peer connection with WT H 716.

WT A 702 is currently situated close to WT F 712. However WT G 714 and WT H are situated far away from the other WTs (702, 704, 706, 708, 710, 712).

Figure 8:
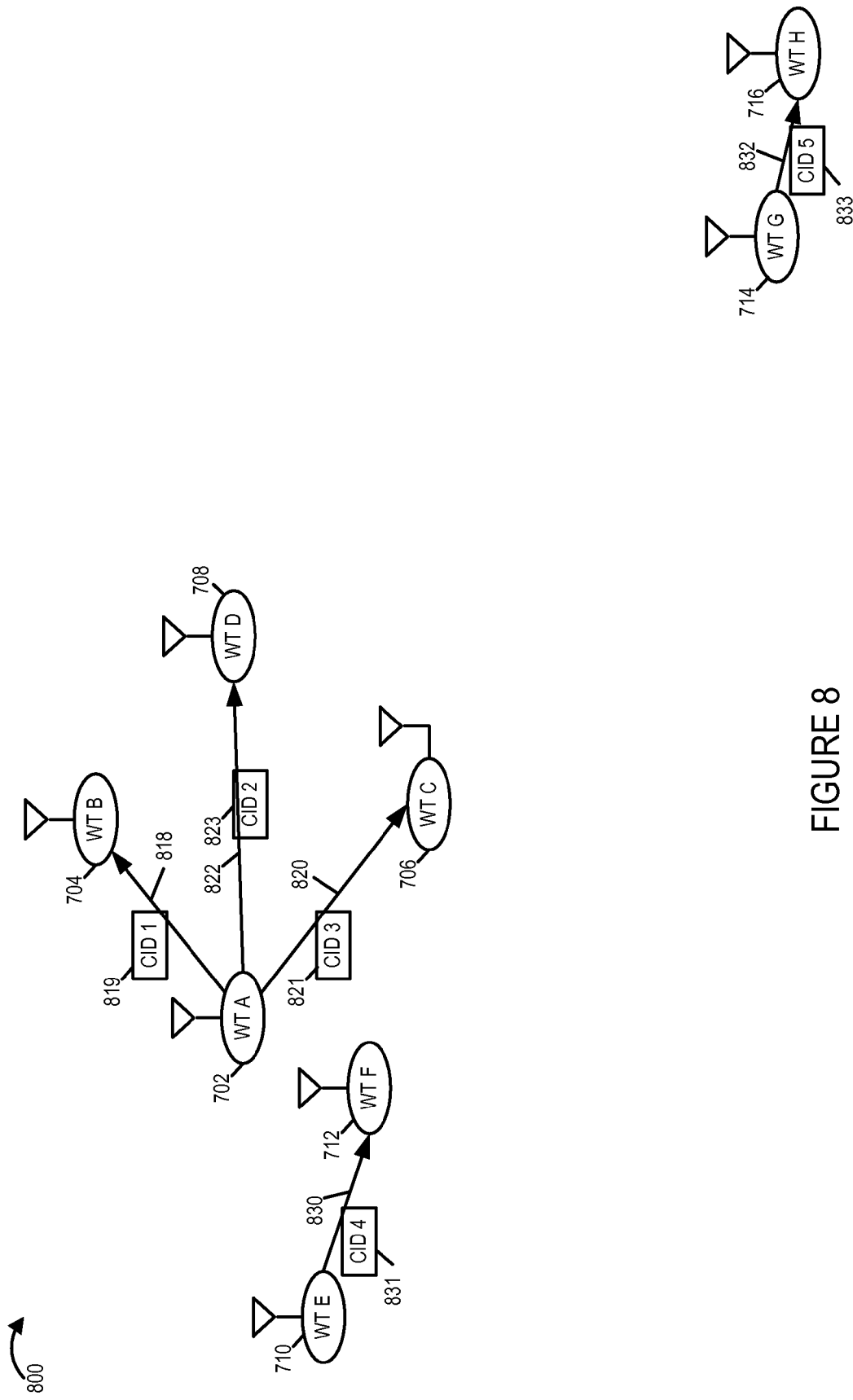
FIG. 8 illustrates the same wireless terminals of FIG. 7 and provides additional information used to illustrate an example of group traffic signaling in accordance with one exemplary embodiment.

Drawing 800 of FIG. 8 illustrates the same wireless terminals of FIG. 7 and provides additional information used to illustrate an example of group traffic signaling in accordance with one exemplary embodiment. Drawing 800 illustrates exemplary uni-direction traffic flow direction connections and corresponding associated connection identifiers. Wireless terminal A 702 has connections (818, 820, 822) directed to (WT B 704, WT C, 706, WT D 708), respectively, associated with connection identifiers (CID 1 819, CID 3 821, CID 2 823), respectively. Wireless terminal E 710 has uni-direction traffic flow connection 830 associated with connection identifier 4 (CID 4 831). Wireless terminal G 714 has uni-direction traffic flow connection 832 associated with connection identifier 5 (CID 5 833).

Figure 9:
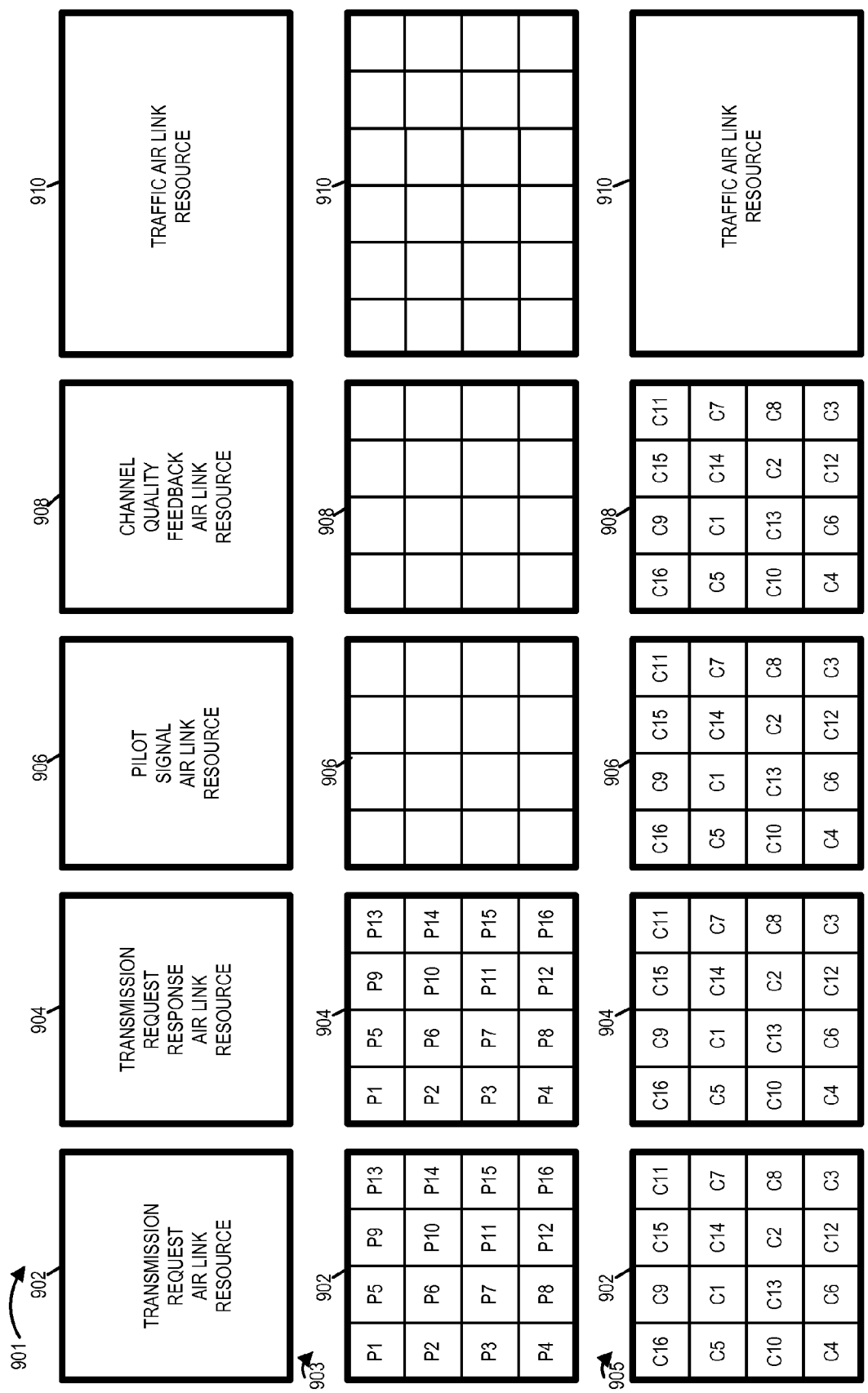
FIG. 9 illustrates an exemplary set of air link resources in a recurring peer to peer timing structure associated with a traffic segment, priority information associated with at least some of those resources and connection identifier information associated with at least some of those resources.
Figure 10:
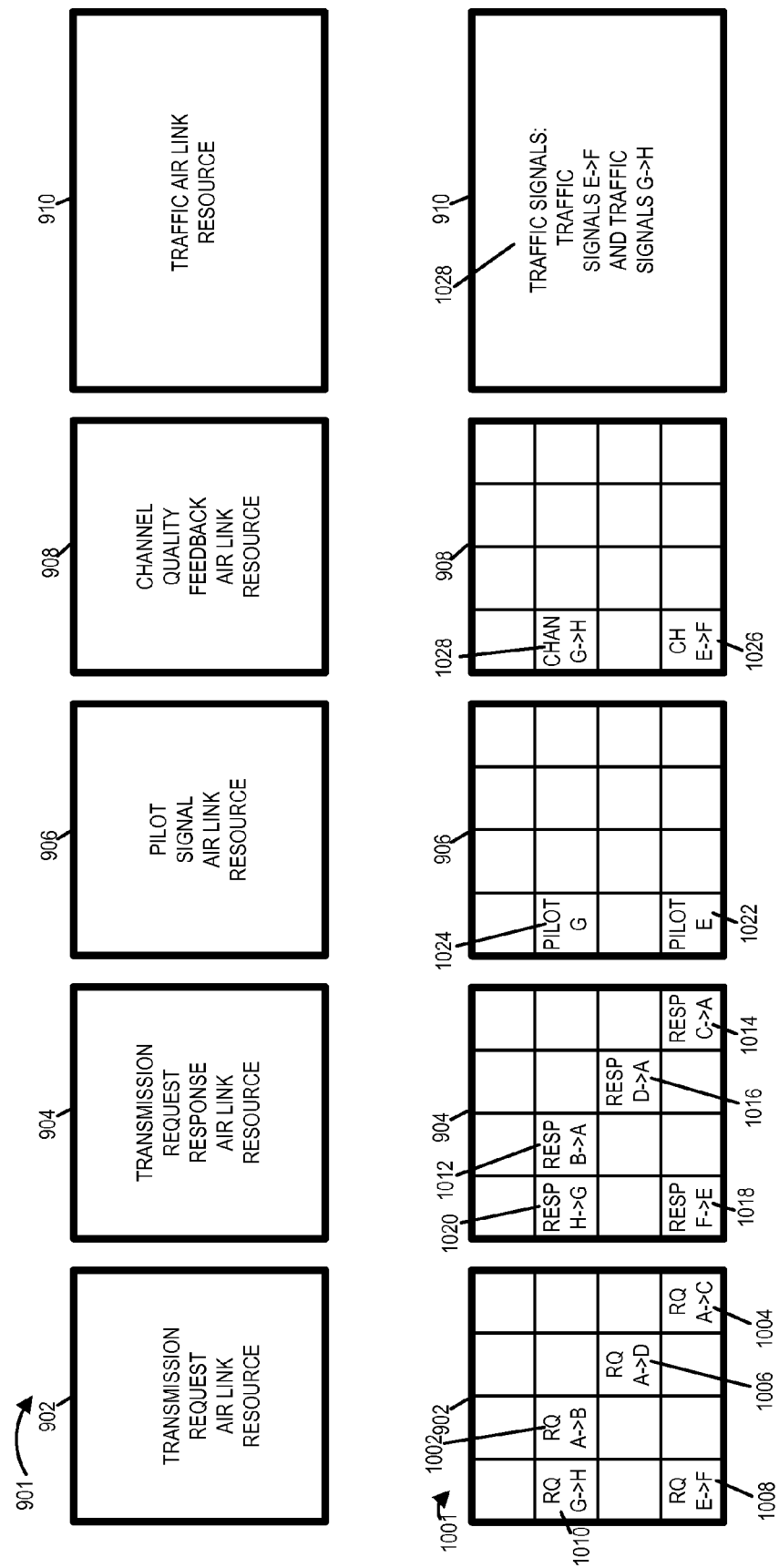
FIG. 10 illustrates exemplary signaling that may be communicated using the resources of FIG. 9 in one exemplary scenario corresponding to FIG. 8.

In the example of FIG. 8, assume that WT A would like to transmit a group traffic signal to WT B 704, WT C 706, and WT D 708. Also assume that WT E would like to transmit a peer to peer traffic signal to WT F 712, and that WT G 714 would like to transmit a peer to peer traffic signal to WT H 716. FIG. 9 illustrates an exemplary set of air link resources in a recurring peer to peer timing structure associated with a traffic segment, priority information associated with at least some of those resources and connection identifier information associated with at least some of those resources. FIG. 10 illustrates exemplary signaling that may be communicated using the resources of FIG. 9 in one exemplary scenario corresponding to FIG. 8.

Drawing 901 of FIG. 9 illustrates a transmission request air link resource 902, a transmission request response air link resource 904, a pilot signaling air link resource 906, a channel quality feedback air link resource 908 and a traffic air link resource 910. Drawing 903 of FIG. 9 illustrates, that the various air link resources (902, 904, 906, 908, 910) include a plurality of transmission units e.g., OFDM tone-symbols. Drawing 903 also illustrates that priorities are associated with the transmission units of the transmission request air link resource 902 and transmission request response air link resource 904. In particular, in this example there are 16 transmission units in the transmission request air link resource 902, each associated with a different priority, P1 through P16, where the lower priority number represents higher priority, e.g., P1 represents the highest priority, P16 is the lowest priority, and P1 is higher in priority than P2, etc. Similarly, there are 16 transmission units in the transmission request response air link resource 904, each associated with a different priority, P1 through P16.

Drawing 905 illustrates that different connection identifiers (C1, C2, . . . , C16) are associated with different transmission units of the transmission request air link resource 902, the transmission request response air link resource 904, the pilot signal air link resource 906 and the channel quality feedback air link resource 908. Drawing 903 and drawing 905, viewed in combination, illustrate the linkage between different connection identifiers and different priorities corresponding to this exemplary traffic slot.

Now consider the combination of FIGS. 8, 9, and 10. The connection associated from WT A 702 to WT B 704 has connection identifier 1 (C1) and has priority level P6. The connection associated from WT A 702 to WT C 706 has connection identifier 3 (C3) and has priority level P16. The connection associated from WT A 702 to WT D 708 has connection identifier 2 (C2) and has priority level P11. The connection associated from WT E 710 to WT F 712 has connection identifier 4 (C4) and has priority level P4. The connection associated from WT G 714 to WT H 716 has connection identifier 5 (C5) and has priority level P2.

Drawing 901 of FIG. 10 illustrates the transmission request air link resource 902, the transmission request response air link resource 904, the pilot signaling air link resource 906, the channel quality feedback and link resource 908 and the traffic air link resource 910. Drawing 1001 of FIG. 10 illustrates exemplary signaling carried by those air link resources.

Traffic transmission request signals are carried by the transmission units of the transmission request air link resource 902. A transmission unit corresponding to connection C1 with priority P6, carries a traffic transmission request signal from WT A 702 to WT B 704, as indicated by block 1002. A transmission unit corresponding to connection C3 with priority P16, carries a traffic transmission request signal from WT A 702 to WT C 706, as indicated by block 1004. A transmission unit corresponding to connection C2 with priority P11, carries a traffic transmission request signal from WT A 702 to WT D 708, as indicated by block 1006. A transmission unit corresponding to connection C4 with priority P4, carries a traffic transmission request signal from WT E 710 to WT F 712, as indicated by block 1008. A transmission unit corresponding to connection C5 with priority P2, carries a traffic transmission request signal from WT G 714 to WT H 716, as indicated by block 1010.

Traffic transmission request response signals, e.g., RX echo signals signifying a positive response to the a received traffic transmission request, are carried by the transmission units of the transmission request response air link resource 904. A transmission unit corresponding to connection C1 with priority P6, carries a traffic transmission request response signal from WT B 704 to WT A 702, as indicated by block 1012. A transmission unit corresponding to connection C3 with priority P16, carries a traffic transmission request response signal from WT C 706 to WT A 702, as indicated by block 1014. A transmission unit corresponding to connection C2 with priority P11, carries a traffic transmission request response signal from WT D 708 to WT A 702, as indicated by block 1016. A transmission unit corresponding to connection C4 with priority P4, carries a traffic transmission request response signal from WT F 712 to WT E 710, as indicated by block 1018. A transmission unit corresponding to connection C5 with priority P2, carries a traffic transmission request response signal from WT H 716 to WT G 714, as indicated by block 1020.

Wireless terminal A 702 has received the request response signals from WT B 704, WT C 706 and WT D 708 to which it had sent request signals. WT A 702 also receives the request response signal from WT F 712, which happens to be located very close to WT A 702. WT A 702 may receive a very weak request response signal from WT H 716 or may not detect the request response signal from WT H 716, which happens to be located very far away from WT A 702. Connection 4 corresponding to the WT E→WT F connection has priority P4 which is a higher priority than that of any of connections 1, 2, or 3, which correspond to WT A 702. WT A 702 measures the signal strength of the request response signal from WT F 712 and makes a transmitter yielding decision as a function of the measurement. In this example, assume that the measurement exceeds a yielding threshold level and WT A 702 decides to yield the traffic transmission resource and refrain from transmitting in this traffic transmission segment.

Continuing with the example, WT E 710, has received the request response signal from WT F 712, and decides to proceed with its traffic transmission. Similarly, WT G 714 has received the request response signal from WT H 712 and decides to proceed with its traffic transmission. WT E 710 generates and transmits a pilot signal using a resource of the pilot signal air link resource 906 as indicated by block 1022. WT G 714 generates and transmits a pilot signal using a resource of the pilot signal air link resource 906 as indicated by block 1024. WT F 712 receives and measures the pilot signal from WT E 710, generates channel quality feedback information, e.g., information characterizing the channel between WT E 710 and WT F 712 such as information indicating a maximum data rate supported for traffic signaling, and transmits the channel quality feedback information to WT E 710 as indicated by block 1026. WT H 716 receives and measures the pilot signal from WT G 714, generates channel quality feedback information, e.g., information characterizing the channel between WT G 714 and WT H 716 such as information indicating a maximum data rate supported for traffic signaling, and transmits the channel quality feedback information to WT G 714 as indicated by block 1028.

WT E 710 receives and processes the channel quality feedback information from WT F 712, determines a data rate for traffic signaling, generates traffic signals and transmits the peer to peer traffic signals to WT F 712 using the traffic air link resource 910, e.g. traffic segment. WT G 714 receives and processes the channel quality feedback information from WT H 716, determines a data rate for traffic signaling, generates traffic signals and transmits the peer to peer traffic signals to WT H 716 using the traffic air link resource 910, e.g. traffic segment.

Figure 11:
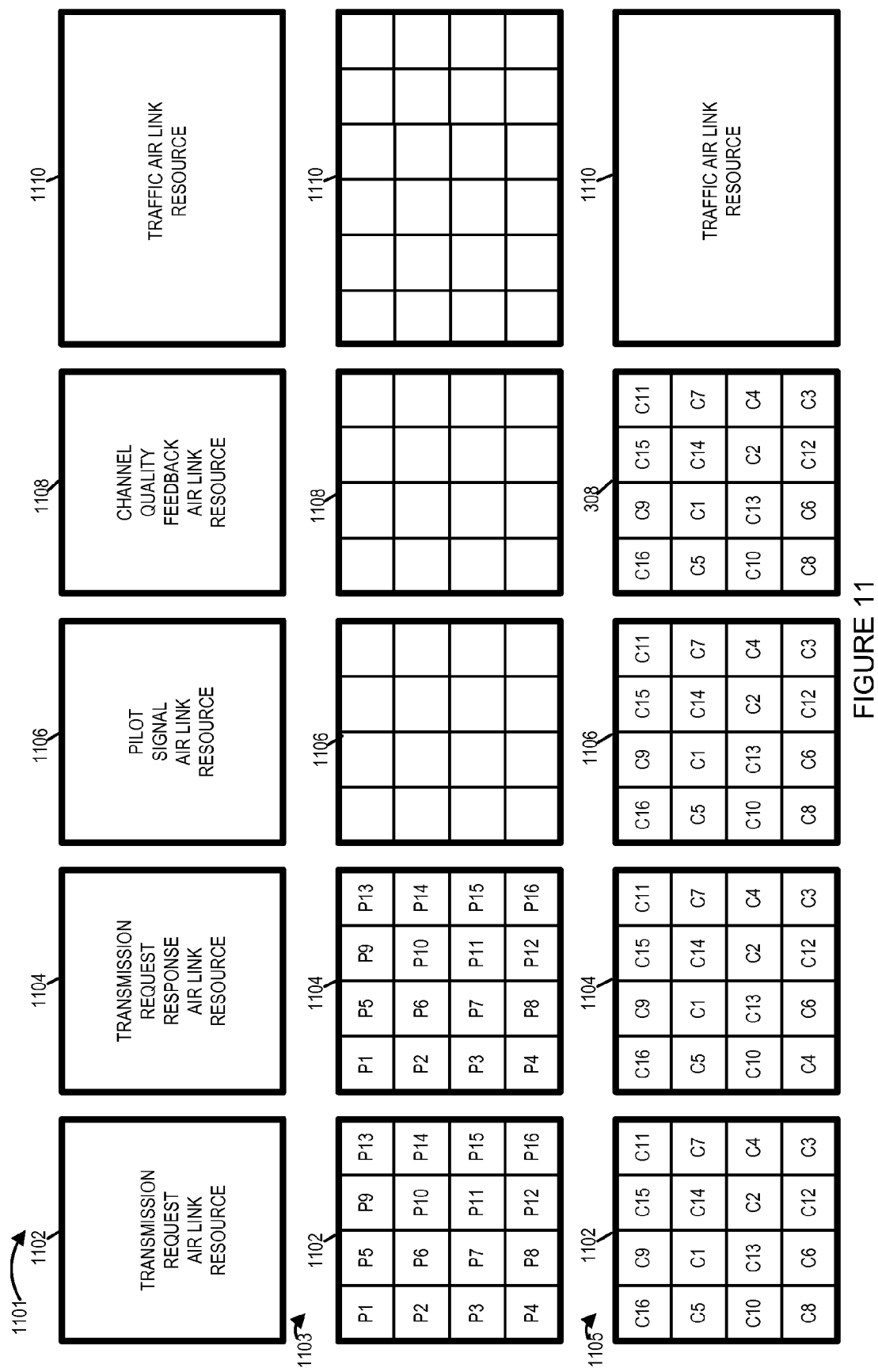
FIG. 11 illustrates an exemplary set of air link resources in a recurring peer to peer timing structure associated with a traffic segment, priority information associated with at least some of those resources and connection identifier information associated with at least some of those resources.
Figure 12:
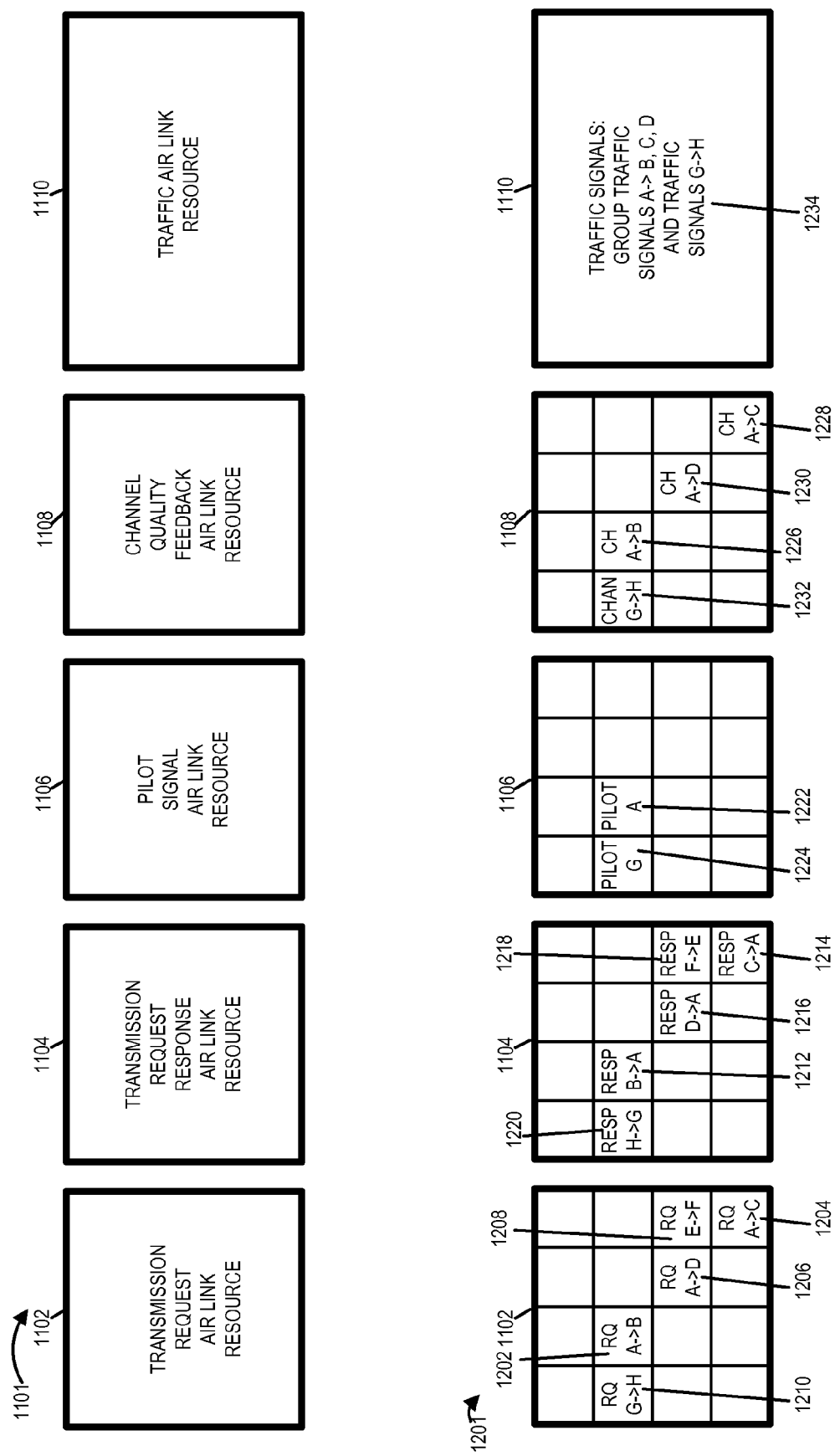
FIG. 12 illustrates exemplary signaling that may be communicated using the resources of FIG. 11 in another exemplary scenario corresponding to FIG. 8.

FIG. 11 illustrates an exemplary set of air link resources in a recurring peer to peer timing structure associated with a traffic segment, priority information associated with at least some of those resources and connection identifier information associated with at least some of those resources. FIG. 12 illustrates exemplary signaling that may be communicated using the resources of FIG. 11 in another exemplary scenario corresponding to FIG. 8.

Drawing 1101 of FIG. 11 illustrates a transmission request air link resource 1102, a transmission request response air link resource 1104, a pilot signaling air link resource 1106, a channel quality feedback air link resource 1108 and a traffic air link resource 1110. Drawing 1103 of FIG. 11 illustrates, that the various air link resources (1102, 1104, 1106, 1108, 1110) include a plurality of transmission units, e.g., OFDM tone-symbols. Drawing 1103 also illustrates that priorities are associated with the transmission units of the transmission request air link resource 1102 and transmission request response air link resource 1104. In particular, in this example there are 16 transmission units in the transmission request air link resource 1102, each associated with a different priority, P1 through P16, where the lower priority number represents higher priority, e.g., P1 represents the highest priority, P16 is the lowest priority, and P1 is higher in priority than P2, etc. Similarly, there are 16 transmission units in the transmission request response air link resource 1104, each associated with a different priority, P1 through P16.

Drawing 1105 illustrates that different connection identifiers (C1, C2, . . . , C16) are associated with different transmission units of the transmission request air link resource 1102, the transmission request response air link resource 1104, the pilot signal air link resource 1106 and the channel quality feedback air link resource 1108. Drawing 1103 and drawing 1105, viewed in combination, illustrate the linkage between different connection identifiers and different priorities corresponding to this exemplary traffic slot.

Now consider the combination of FIGS. 8, 11, and 12. The connection associated from WT A 702 to WT B 704 has connection identifier 1 (C1) and has priority level P6. The connection associated from WT A 702 to WT C 706 has connection identifier 3 (C3) and has priority level P16. The connection associated from WT A 702 to WT D 708 has connection identifier 2 (C2) and has priority level P11. The connection associated from WT E 710 to WT F 712 has connection identifier 4 (C4) and has priority level P15. The connection associated from WT G 714 to WT H 716 has connection identifier 5 (C5) and has priority level P2.

Drawing 1101 of FIG. 12 illustrates the transmission request air link resource 1102, the transmission request response air link resource 1104, the pilot signaling air link resource 1106, the channel quality feedback and link resource 1108 and the traffic air link resource 1110. Drawing 1201 of FIG. 12 illustrates exemplary signaling carried by those air link resources.

Traffic transmission request signals are carried by the transmission units of the transmission request air link resource 1102. A transmission unit corresponding to connection C1 with priority P6, carries a traffic transmission request signal from WT A 702 to WT B 704, as indicated by block 1202. A transmission unit corresponding to connection C3 with priority P16, carries a traffic transmission request signal from WT A 702 to WT C 706, as indicated by block 1204. A transmission unit corresponding to connection C2 with priority P11, carries a traffic transmission request signal from WT A 702 to WT D 708, as indicated by block 1206. A transmission unit corresponding to connection C4 with priority P15, carries a traffic transmission request signal from WT E 710 to WT F 712, as indicated by block 1208. A transmission unit corresponding to connection C5 with priority P2, carries a traffic transmission request signal from WT G 714 to WT H 716, as indicated by block 1210.

Traffic transmission request response signals, e.g., RX echo signals signifying a positive response to a received traffic transmission request, are carried by the transmission units of the transmission request response air link resource 1104. A transmission unit corresponding to connection C1 with priority P6, carries a traffic transmission request response signal from WT B 704 to WT A 702, as indicated by block 1212. A transmission unit corresponding to connection C3 with priority P16, carries a traffic transmission request response signal from WT C 706 to WT A 702, as indicated by block 1214. A transmission unit corresponding to connection C2 with priority P11, carries a traffic transmission request response signal from WT D 708 to WT A 702, as indicated by block 1216. A transmission unit corresponding to connection C4 with priority P15, carries a traffic transmission request response signal from WT F 712 to WT E 710, as indicated by block 1218. A transmission unit corresponding to connection C5 with priority P2, carries a traffic transmission request response signal from WT H 716 to WT G 714, as indicated by block 1220.

Wireless terminal A 702 has received the request response signals from WT B 704, WT C 706 and WT D 708 to which it had sent request signals. WT A 702 also receives the request response signal from WT F 712, which happens to be located very close to WT A 702. WT A 702 may receive a very weak request response signal from WT H 716 or may not detect the request response signal from WT H 716, which happens to be located very far away from WT A 702. Connection 4 corresponding to the WT E→WT F connection has priority P15 which is a lower priority than that of the highest priority connection in the set of the group which correspond to WT A 702, e.g., connection 1 has priority P6. Therefore WT A 702 will not yield to lower priority connection 4. However, connection 5 between WT G 714 and WT H 716 has priority P2 which is a higher priority than that of connection 1 which is P6. Therefore WT A 702 measures the signal strength of the request response signal from WT H 716, if it can detect the signal, and makes a transmitter yielding decision as a function of the measurement. In this example, assume that the measurement is below a yielding threshold level and WT A 702 decides to proceed with the traffic transmission resource and transmit in this traffic transmission segment.

Assume that WT A 702 and WT G 714 have decided to proceed with traffic transmission. WT A 710 generates and transmits a pilot signal using a resource of the pilot signal air link resource 1208 as indicated by block 1222. Note that WT A 702, in this exemplary embodiment, only transmits one pilot signal which is intended to be utilized by the members of its group. In this example, the pilot signal is transmitted using the pilot signal air link resource portion associated with the highest priority connection of the group. WT G 714 generates and transmits a pilot signal using a resource of the pilot signal air link resource 908 as indicated by block 1224. WT B 704 receives and measures the pilot signal from WT A 702, generates channel quality feedback information, e.g., information characterizing the channel between WT A 702 and WT B 704 such as information indicating a maximum data rate supported for traffic signaling, and transmits the channel quality feedback information to WT A 702 as indicated by block 1226. WT C 706 receives and measures the pilot signal from WT A 702, generates channel quality feedback information, e.g., information characterizing the channel between WT A 702 and WT C 706 such as information indicating a maximum data rate supported for traffic signaling, and transmits the channel quality feedback information to WT A 702 as indicated by block 1228. WT D 708 receives and measures the pilot signal from WT A 702, generates channel quality feedback information, e.g., information characterizing the channel between WT A 702 and WT D 708 such as information indicating a maximum data rate supported for traffic signaling, and transmits the channel quality feedback information to WT A 702 as indicated by block 1230. WT H 716 receives and measures the pilot signal from WT G 714, generates channel quality feedback information, e.g., information characterizing the channel between WT G 714 and WT H 716 such as information indicating a maximum data rate supported for traffic signaling, and transmits the channel quality feedback information to WT G 714 as indicated by block 1232.

WT A 702 receives and processes the channel quality feedback information from WT B 704, WT C 706 and WT D 708, determines a data rate for traffic signaling, e.g., the lowest of three reported supported rates, generates group traffic signals conveying traffic data in accordance with the determined rate, and transmits the group traffic signals directed to WT B 704, WT C 706 and WT D 708 using the traffic air link resource 1110, e.g. traffic segment. WT G 714 receives and processes the channel quality feedback information from WT H 716, determines a data rate for traffic signaling, generates traffic signals and transmits the peer to peer traffic signals to WT H 716 using the traffic air link resource 1110, e.g. traffic segment.

Figure 13:
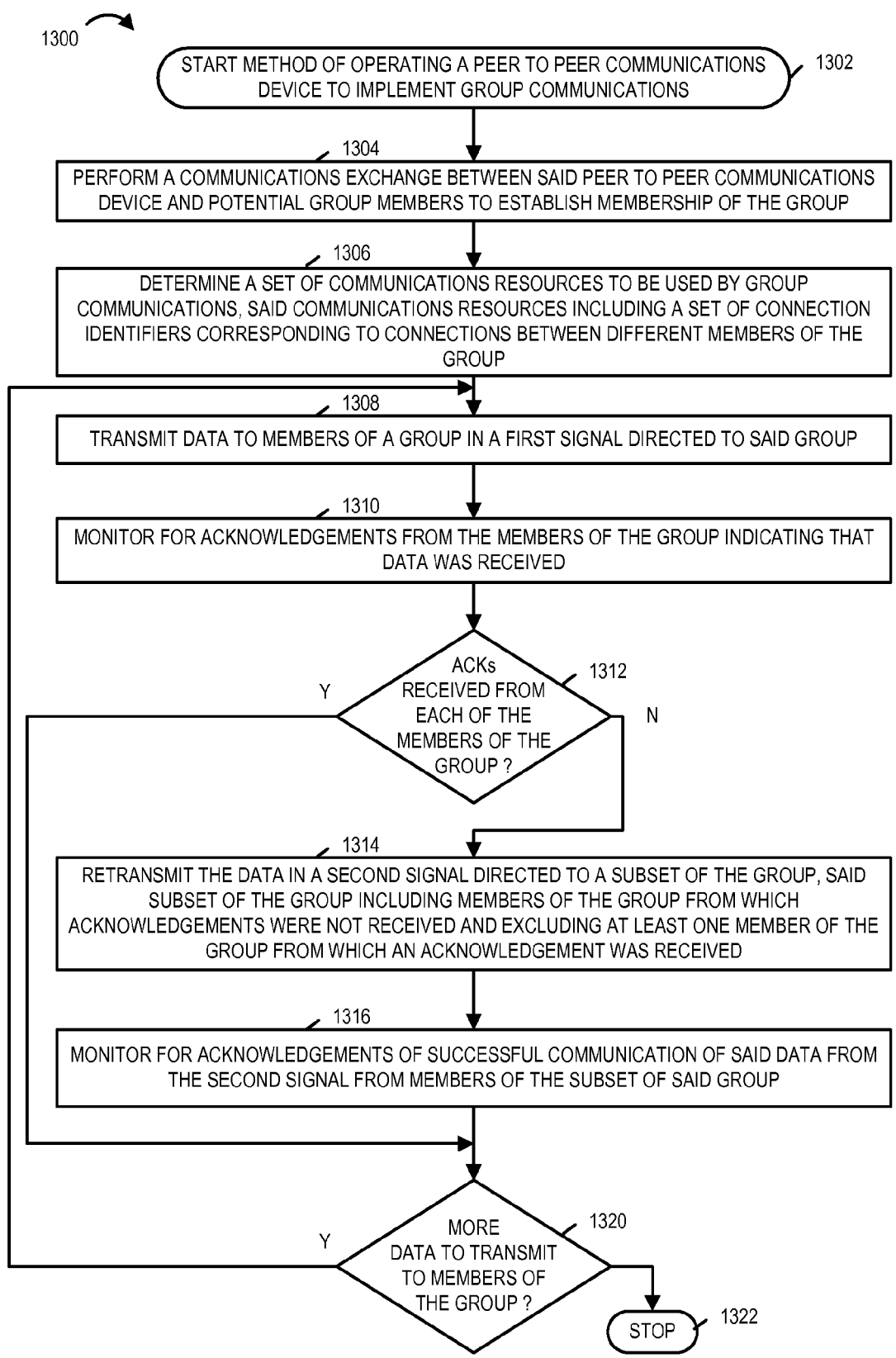
FIG. 13 is a flowchart of an exemplary method of operating a peer to peer communications device to implement group communications.

FIG. 13 is a flowchart 1300 of an exemplary method of operating a peer to peer communications device to implement group communications. Operation starts in step 1302, where the peer to peer communications device is powered on and initialized and proceeds to step 1304. In step 1304 the peer to peer communications device performs a communications exchange with potential group members to establish membership in the group. The group is, e.g., a group of peer to peer communications devices. Operation proceeds from step 1304 to step 1306. In step 1306 the peer to peer communications device determines a set of communications resources to be used by group communications including a set of connection identifiers corresponding to connections between different members of the group. Operation proceeds from step 1306 to step 1308.

In step 1308 the peer to peer communications device transmits data to members of the group in a first signal directed to said group. Transmitting data to members of the group in a first signal includes transmitting the first signal using a communications resource corresponding to the communications connections. The data transmission resource is common for multiple connections of the group, e.g., a traffic segment carries a group cast traffic signal intended for reception by group members. In some embodiments, the first signal is communicated using a set of OFDM tone-symbols in a data traffic interval. In various embodiments, the transmitting of data to members of the group is performed at a data rate determined by information corresponding to each of the members of the group.

Then, in step 1310 the peer to peer communications device monitors for acknowledgements from the members of the group indicating the data was received. In some embodiments, the monitoring for acknowledgments includes monitoring a plurality of individual communications resources, each of the plurality of individual communications resources being dedicated to one of the group members for the purposes of sending acknowledgements. Operation proceeds from step 1310 to step 1312.

In step 1312 the peer to peer communications device determines whether or not acknowledgments were received from each of the member of group indicating successful communication of the data in the first signal. If acknowledgments were received from each of the members of the group then operation proceeds to step 1320; otherwise, operation proceeds from step 1312 to step 1314.

In step 1314, the peer to peer communications device re-transmits the data in a second signal directed to a subset of the group, said subset including members of the group from which acknowledgments were not received and excluding at least one member of the group from which an acknowledgment was received. Re-transmitting data to members of the subset group in the second signal includes transmitting the second signal using a communications resource corresponding to communications connections of the subset. In some embodiments, the retransmitting of data is performed at a data rate determined by information corresponding to members of the subset of the group. In some such embodiments the information corresponding to the members of the subset is link quality feedback information.

Then, in step 1316, the peer to peer communications device monitors for acknowledgments of successful communication of said data from the second signal from members of the subset of the group. In some embodiments, monitoring for acknowledgements of successful communication of said data from the second signal does not involve monitoring for acknowledgments from members of said group which are not members of the subset.

Operation proceeds from step 1316 to step 1320. In step 1320 the peer to peer communications device determines whether or not it has more data to transmit to members of the group. If it does not have more data to transmit, then operation proceeds to step 1322. However; if the peer to peer communications device does have additional data to communicate, then operation proceeds from step 1320 to the input of step 1308.

Figure 14:
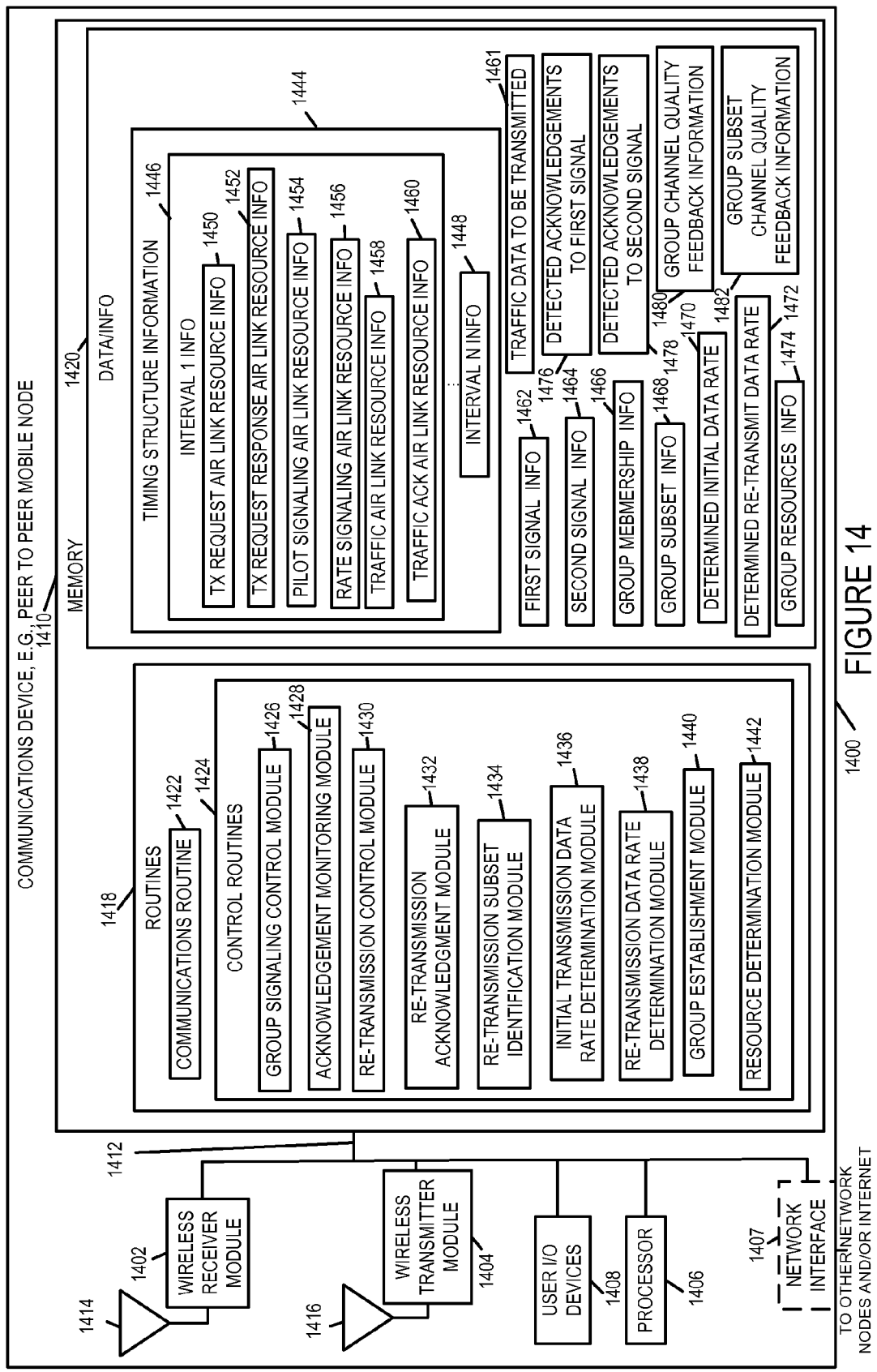
FIG. 14 is a drawing of an exemplary communications device, e.g., a peer to peer mobile node, supporting group communications in accordance with an exemplary embodiment.

FIG. 14 is a drawing of an exemplary communications device 1400, e.g., a peer to peer mobile node, supporting group communications in accordance with an exemplary embodiment. Communications device 1400 includes a wireless receiver module 1402, a wireless transmitter module 1404, user I/O devices 1408, a processor 1406, and memory 1410 coupled together via a bus 1412 over which the various elements may interchange data and information. In some embodiments, the communication device 1400 also includes a network interface 1407 which couples the communications device 1400, e.g., via a backhaul network, to network nodes and/or the Internet.

Memory 1410 includes routines 1418 and data/information 1420. The processor 1406, e.g., a CPU, executes the routines 1418 and uses the data/information 1420 in memory 1410 to control the operation of the communications device 1400 and implement methods, e.g., the method of flowchart 1300 of FIG. 13.

Wireless receiver module 1402, e.g., an OFDM and/or CDMA receiver, is coupled to receive antenna 1414 via which the communications device 1400 receives signals from other communications devices. Received signals include, e.g., group membership establishment signals, channel quality feedback signals, acknowledgment signals in response to an initial group traffic data signal, and acknowledgments in response to a retransmitted traffic data signal.

Wireless transmitter module 1404, e.g., an OFDM and/or CDMA transmitter, is coupled to transmit antenna 1416 via which the communications device 1400 transmits signals to other communications devices, e.g., to other peer to peer devices which are members of a group to which it belongs and/or to other communications device which are potential members of a group. Transmitted signals include, e.g., group membership establishment signals, an initial group traffic signal directed to members of a group to which device 1400 belongs, and a re-transmission traffic signal directed to a subset of members of the group to which it belongs. In some embodiments, the same antenna is used for transmitter and receiver.

User I/O devices 1408 include, e.g., a microphone, a speaker, a keyboard, a keypad, a camera, switches, a display, etc. User I/O devices 1408 allow an operator of communications device 1400 to input data/information, access output data/information, and control at least some functions of the communications device 1400.

Routines 1418 include a communications routine 1422 and control routines 1424. The communications routine 1422 implements the various communications protocols used by the communications device 1400. Control routines 1424 include a group signaling control module 1426, an acknowledgment monitoring module 1428, a re-transmission control module 1430, a re-transmission acknowledgement module 1432, a re-transmission sub-set identification module 1434, an initial transmission data rate determination module 1436, a re-transmission data rate determination module 1438, a group establishment module 1440 and a resource determination module 1442.

Data/information 1420 includes timing structure information 1444, traffic data to be transmitted 1461, first signal information 1462, second signal information 1464, group membership information 1466, group subset information 1468, determined initial data rate 1470, determined re-transmit data rate 1472, group resources information 1474, detected acknowledgments to the first signal 1476, detected acknowledgements to the second signal 1478, group channel quality feedback information 1480, and group subset channel quality feedback information 1482.

Timing structure information 1444 includes information corresponding to a plurality of intervals (interval 1 information 1446, . . . , interval N information 1448) in a recurring peer to peer timing structure. Interval 1 information 1446 includes transmission request air link resource information 1450, transmission request response air link resource information 1452, pilot signaling air link resource information 1454, rate signaling air link resource information 1456, traffic air link resource information 1458, and traffic acknowledgment air link resource information 1460. Transmission request air link resource information 1450 includes information identifying a first traffic transmission request block including a plurality of individual transmission units associated with different connection identifiers and associated with different priority levels in the block. Transmission request response air link resource information 1452 includes information identifying a first traffic transmission request response block including a plurality of individual transmission units associated with different connection identifiers and associated with different priority levels in the block. Pilot signaling air link resource information 1454 includes information identifying resources to be used to carry pilot signals including a plurality of individual resources associated with different connection identifiers. Rate signaling air link resource information 1456 includes information identifying individual resources associated with connection identifiers to be used to carry channel feedback information in response to a received pilot signal. Traffic air link resource information 1458 includes information identifying a data transmission block, e.g. a traffic segment, to be used to carry traffic signals. The traffic air link resource identified by information 1458 can be, and sometimes is, used to carry an initial group traffic signal, e.g., a first signal, directed to each of the other members of a group to which communications device 1400 belongs. The traffic air link resource identified by information 1458 can be, and sometimes is, used to carry re-transmitted traffic data, e.g., a second signal, directed to a subset of members of the group to which communications device 1400 belongs. Traffic acknowledgment air link resource information 1460 identifies segments to be used to carry traffic acknowledgments from group members to which a traffic signal in the corresponding air link resource of information 1458 was directed. In some embodiments, dedicated acknowledgment segments are associated with connection identifiers and/or device identifiers, e.g., in accordance with stored timing and/or frequency structure information. In some other embodiments, a traffic acknowledgement segment is a shared resource, and the communications device sending the acknowledgment includes information used to identify the source of the acknowledgment. In some embodiments, the information used to identify the source of the acknowledgment enables a probabilistic identification of the source, e.g., a portion of an identifier is conveyed in the acknowledgment signal.

Group signaling control module 1426 controls the wireless transmitter module 1404 to transmit data to members of a group in a first signal directed to said group. For example, the data to be transmitted is traffic data to be transmitted 1461 which is carried by the first signal corresponding to first signal information 1462, and the first signal is directed to communications devices identified by group membership information 1466.

Acknowledgment monitoring module 1428 monitors for acknowledgments from members of a group indicating that data was received. For example, acknowledgment monitoring module 1428 monitors for traffic acknowledgment signals from communications devices identified by group membership information 1466 after having transmitted a first signal, which is an initial group data traffic signal intended for members of the group to which device 1400 belongs. Thus, although the first signal is transmitted as a signal directed to and intended to be recovered by a plurality of communications device, the acknowledgment monitoring module 1428 is attempting to recover individual acknowledgements from each of the group members to which the first signal was directed. This approach is in contrast to typical multi-cast implementations where the device transmitting the multi-cast signal does not monitor for or expect to recovery acknowledgment responses. Detected acknowledgments to first signal 1476 is an output of acknowledgment monitoring module 1428.

In some embodiments, the acknowledgement monitoring module 1428 monitors for acknowledgments from a plurality of individual communications resources, each of the plurality of individual communications resources being dedicated to one or the group members for the purposes of sending acknowledgments. In other embodiments, the communication resources used for transmitting acknowledgements are shared resources, and a device sending a traffic acknowledgment sends an acknowledgment signal using one of the shared resources, and the acknowledgment signal includes some device identification information. In some such embodiments, the device identification included provides information to make a probabilistic identification, but does not provide enough information to perform a certain identification, e.g., a truncated device identifier is communicated in the acknowledgment signal.

Re-transmission control module 1430 controls the wireless transmitter module 1404 to re-transmit data in a second signal directed to a subset of a group, the subset of the group including members of the group from which acknowledgments were not received and excluding at least one member of the group from which an acknowledgment was received. For example, consider that the first signal which conveyed traffic data 1461 was positively acknowledged by some of the members of the group identified by information 1466. Group subset information 1468 identifies group members which did not communicate a positive acknowledgment of the first signal. Therefore the re-transmission control module 1430 controls the second signal identified by information 1464, which also conveys traffic data 1461 to be transmitted, where the second signal is directed to members of the subset.

In some embodiments, the first signal is communicated using a set of OFDM tone symbols in a first data traffic interval, and the second signal is communicated using a set of OFDM tone-symbols in a second data traffic interval.

Re-transmission acknowledgment module 1432 monitors for acknowledgments of successful communication of data from a second signal from members of a subset of a group. For example, re-transmission acknowledgment module monitors for acknowledgments to the second signal from the members identified by group subset information 1468. Detected acknowledgments to the second signal 1478 is an output of re-transmission acknowledgment module 1432.

Re-transmission subset identification module 1434 identifies members of a subset of a group, the identified members being members from which the communications device 1400 has not received a positive acknowledgment in response to a first signal, e.g., a group data signal. Detected acknowledgments to first signal 1476 and group membership information 1466 are inputs to re-transmission subset identification module 1434, while group sub-set information 1468 is an output of identification module 1434. In some embodiments, re-transmission acknowledgment module 1432 limits its monitoring to members from the subset.

Initial transmission data rate determination module 1436 determines the data rate to be used to transmit data to members of a group as a function of information corresponding to each of the members of the group. The information corresponding to each of the members of the group is, e.g., link quality feedback information corresponding to a plurality of links between the communications device 1400 and each of the other members of the group. Group channel quality feedback information 1480 comprising feedback reports, e.g., information communicating a maximum traffic data rate supported on a link, from each of the other members of the group is used an input to initial transmission data rate determination module 1436, while determined initial data rate 1470 is an output of module 1436. In some embodiments, the initial transmission data rate determination module 1436 determines the data rate to use for the first signal, e.g., an initial group data transmission signal, which supports the link with the lowest quality from among the group.

Re-transmission data rate determination module 1438 determines the data rate to be used to for data to be re-transmitted to members of an identified subset of the group as a function of information corresponding to members of the subset of the group. The information corresponding to members of the subset of the group is, e.g., link quality feedback information corresponding to a plurality of links between the communications device 1400 and each of the members of the subset of group. Group subset channel quality information 1482 comprising feedback reports, e.g., information communicating a maximum traffic data rate supported on a link, from each of the members of the subset of the group is used an input to re-transmission data rate determination module 1438, while determined re-transmit data rate 1472 is an output of module 1438. In some embodiments, the re-transmission data rate determination module 1438 determines the data rate to use for the second signal, e.g., a re-transmission signal communicating at least some traffic data previously transmitted but not acknowledged by members of the subset, which supports the link with the lowest quality from among members of subset of the group.

In some embodiments, link quality information is updated between the first signal, e.g., group data signal, and second signal, e.g., re-transmission data signal. For example, prior to the first signal transmission, the communications device 1400 transmitted a first pilot signal and received a first set of feedback reports, and prior to transmission of the second signal transmission, the communications device 1400 transmitted a second pilot signal and received a second set of feedback reports.

In some embodiments, different determined data rates are associated with different transmission power levels. In some embodiments, different determined data rates are associated with different coding levels, rates, and/or schemes.

Group establishment module 1440 participates in communications exchanges with potential group members to establish membership in a group. Group membership information 1466 includes information generated by group establishment, e.g., a list of group members admitted to the group.

Resource determination module 1442 determines a set of communications resources to be used by group communications. In some embodiments, the determined set of communications resources includes a set of connection identifiers corresponding to connections between different members of a group of which communications device 1400 is a member. Group resources information 1474 is an output of resources establishment module 1442 and includes resource information associated with the group, e.g., connection identifiers, transmission request segments, transmission request response segments, pilot signaling segments, channel quality feedback segments, traffic segments, and traffic acknowledgment segments. For example corresponding to a particular interval in the timing structure and a particular connection identifier which corresponds to a connection between device 1400 and another group member, there is a dedicated transmission request segment in information 1450, a dedicated transmission request response segment in information 1452, a dedicated pilot signaling segment in information 1454, a dedicated channel quality feedback segment in information 1456, and a dedicated traffic acknowledgment segment in information 1460, which correspond to a traffic segment of information 1458.

Figure 15:
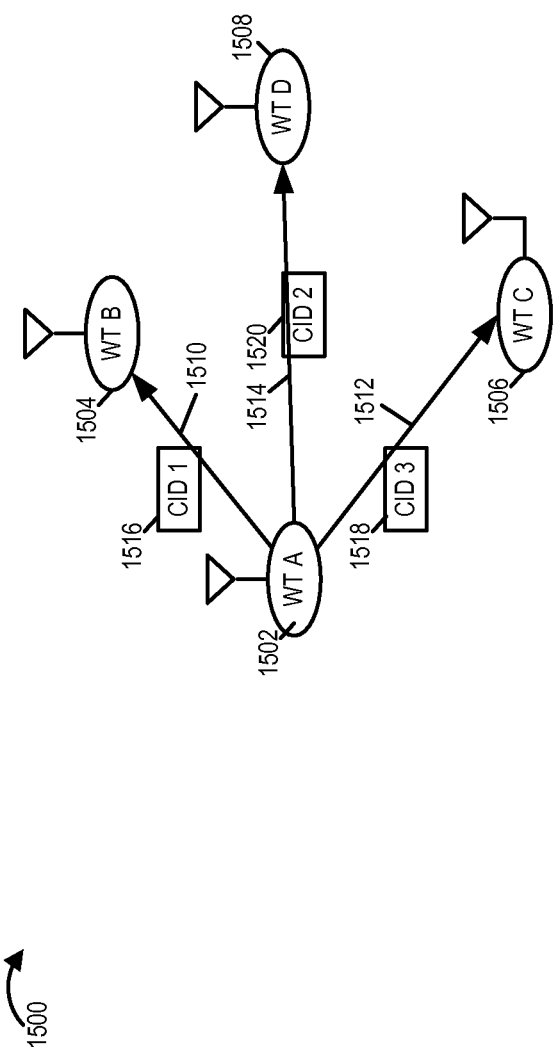
FIG. 15 is a drawing of exemplary communications devices in a communications network which have established a group.

FIG. 15 is a drawing 1500 of exemplary communications devices in a communications network which have established a group. The exemplary communications devices (wireless terminal A 1502, wireless terminal B 1504, wireless terminal C 1506, WT D 1508) are, e.g., mobile peer to peer communications devices supporting group communications. The wireless terminals (1502, 1504, 1506, 1508) are, e.g., wireless terminals such as exemplary wireless terminal 1400 of FIG. 14 and/or wireless terminals implemented to perform the method of flowchart 1300 of FIG. 13. Connections have been established for the purpose of transmitting traffic data signals. The connections include: connection 1510 between WT A 1502 and WT B 1504 which is associated with connection identifier 1 1516, connection 1512 between wireless terminal A 1502 and WT C 1506 which is associated with connection identifier 3 1518, and connection 1514 between wireless terminal A 1502 and WT D 1508 which is associated with connection identifier 2 1520. In this example, assume that wireless terminal A 1502 has traffic data that it would like to transmit as a group data signal to each of other members of the group (WT B 1504, WT C 1506, WT D 1508).

Figure 16:
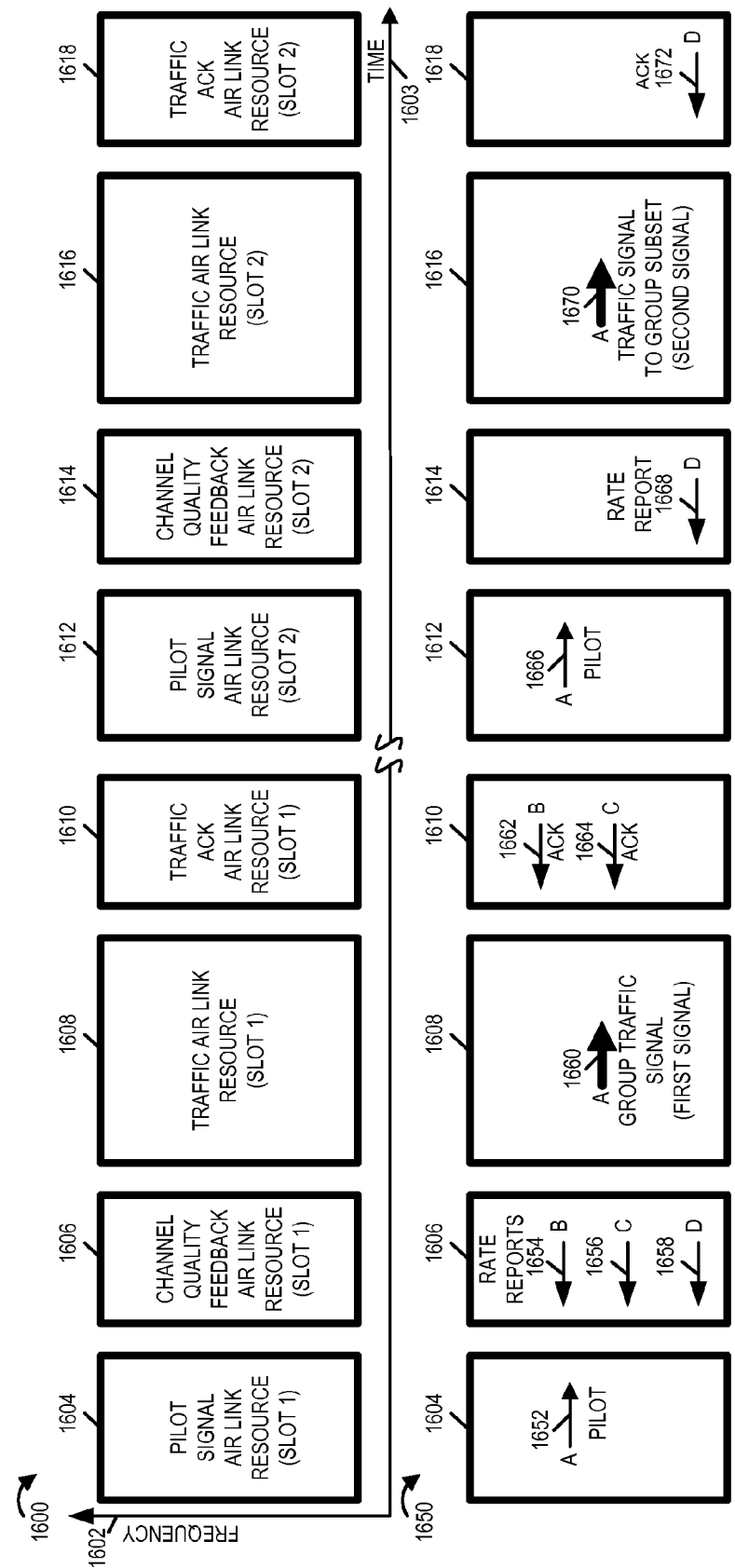
FIG. 16 illustrates exemplary air link resources in an exemplary recurring timing structure and exemplary signaling carried by those air link resources.

FIG. 16 includes a drawing 1600 illustrating exemplary air link resources in an exemplary recurring timing structure and a drawing 1650 which illustrating exemplary signaling carried those air link resources. Drawing 1600 includes a vertical axis 1602 representing frequency and a horizontal axis 1603 representing time. The exemplary air link resources include: pilot signal air link resource for slot 1 1604, channel quality feedback air link resource for slot 1 1606, traffic air link resource for slot 1 1608, traffic acknowledgment air link resources for slot 1 1610, pilot signal air link resource for slot 2 1612, channel quality feedback air link resource for slot 2 1614, traffic air link resource for slot 2 1616, and traffic acknowledgment air link resources for slot 2 1618. Other air link resources are included in the timing structure such as traffic transmission request air link resources and traffic transmission request response air link resources. In some embodiments, transmission units within at least some of air link resources are dedicated to be used for a particular connection associated with a particular connection identifier.

Assume that wireless terminal A 1502 desires to transmit the same traffic data to the other members of the previously established group including WT A 1502, WT B 1504, WT C 1506 and WT D 1508. Assume that WT A 1502 has transmitted transmission request signals to WT B 1504, WT C 1506 and WT D 1508. Further assume that WT B 1504, WT C 1506 and WT D 1508 have transmitted positive transmission request response signals to WT A 1502, and that WT A 1502 has decided to proceed with the group data transmission in traffic slot 1.

Wireless terminal A generates and transmits a pilot signal 1652 in air link in a segment of pilot signal air link resource 1604. The pilot signal 1652 is intended to be received and measured by WT B 1504, WT C 1506 and WT D 1508. Wireless terminals (WT B 1504, WT C 1506, WT D 1508) receive and measure the pilot signal, and then they generate channel quality feedback reports which are conveyed back to WT A 1502 via signals (1654, 1656, 1658), respectively, using segments of channel quality feedback air link resource 1606. WT A 1502 receives the rate reports from WT B 1504, WT C 1506 and WT C 1508. For example, the rate report from WT B indicates that the link between WT A and WT B supports data rate level 3, while the rate report from WT C indicates that the link between WT A and WT C supports data rate level 1, while the rate report from WT D indicates that the link between WT A and WT D supports data rate level 2, where data rate level 1 is a lower data rate than data rate level 2 and where data rate level 2 is a lower data rate than data rate level 3.

Wireless terminal A 1502 determines to transmit the group data signal at a data rate supported by each of the links, so wireless terminal A 1502 decides to generate and transmit group traffic data signal 1660 which communicates the traffic data at data rate level 1. The group data traffic signal 1660 is transmitted using a transmission segment of traffic air link resource 1608.

Now assume that WT B 1504 and WT C 1506 successfully receive signal 1660 and successfully recover the data being communicated. WT B 1504 generates and transmits a traffic acknowledgment signal 1662 to WT A 1502 using a segment of traffic acknowledgment air link resources 1610. WT C 1506 generates and transmits a traffic acknowledgment signal 1664 to WT A 1502 using a segment of traffic acknowledgment air link resources 1610.

However, assume that wireless terminal D 1608 is unsuccessful in the reception of signal 1660 and/or unsuccessful in the recovery of the data being communicated in signal 1660, e.g., due to an obstruction in the communications path during the time of transmission of group traffic signal 1660, due to a repositioning of the receive antenna direction of WT D 1508, and/or due to local interference surging during the time of the transmission of group traffic signal 1660. Therefore WT D 1508 does not transmit an acknowledgment signal in traffic acknowledgment air link resource 1610.

WT A 1502 monitors for traffic acknowledgments from each of the other members of its group to which it directed group traffic signal 1660. Since it does not receive a positive acknowledgment from WT D 1508, WT A decides to retransmit the traffic data. WT A 1502 sends pilot signal 1666 in pilot signal air link resource 1612. Wireless terminal D 1508 responds with a rate report signal 1668 in channel quality feedback air link resource 1614. WT A 1504 determines the data rate to use for the traffic retransmission signal as a function of the received rate report signal 1668 information. WT A 1504 generates and transmits traffic signal 1670 to a group subset using traffic air link resource 1616, the group subset including WT D 1508 but not including group members WT B 1604 and WT C 1606. In this slot, WT D 1508 successfully receives and recovers the traffic data being communicated. WT D 1508 generates and transmits acknowledgment signal 1672 to WT A 1618 using traffic acknowledgment air link resource 1618. WT A 1502 monitors for and detects the acknowledgment signal from WT D 1508 confirming successful communication of the traffic data to WT D 1508. Now the traffic data has been successfully communicated to each of the members of the group to which it was directed.

Figure 17A:
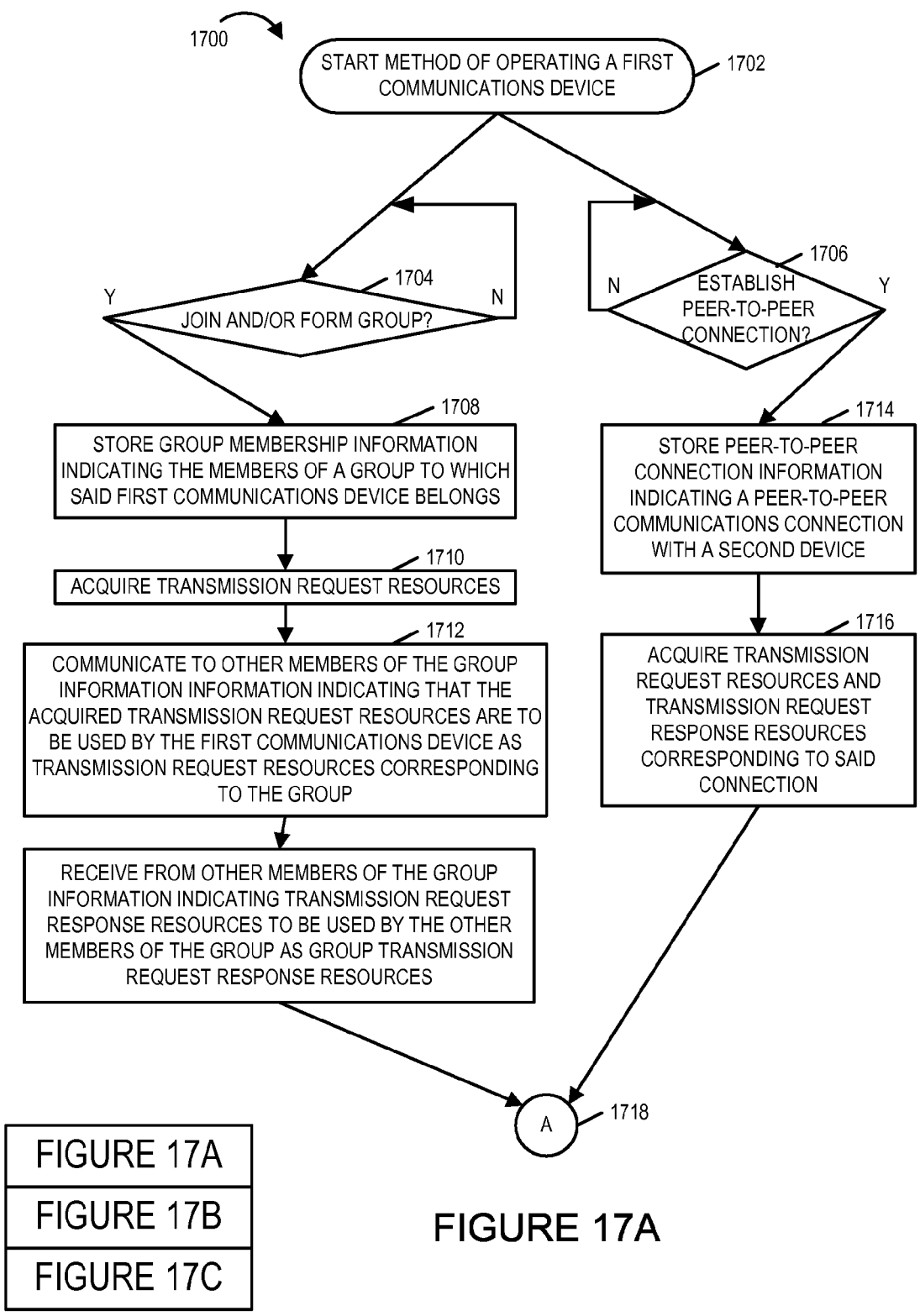
FIG. 17, comprising the combination of FIG. 17A, FIG. 17B and FIG. 17C, is a flowchart of an exemplary method of operating a communications device in accordance with an exemplary embodiment.
Figure 17B:
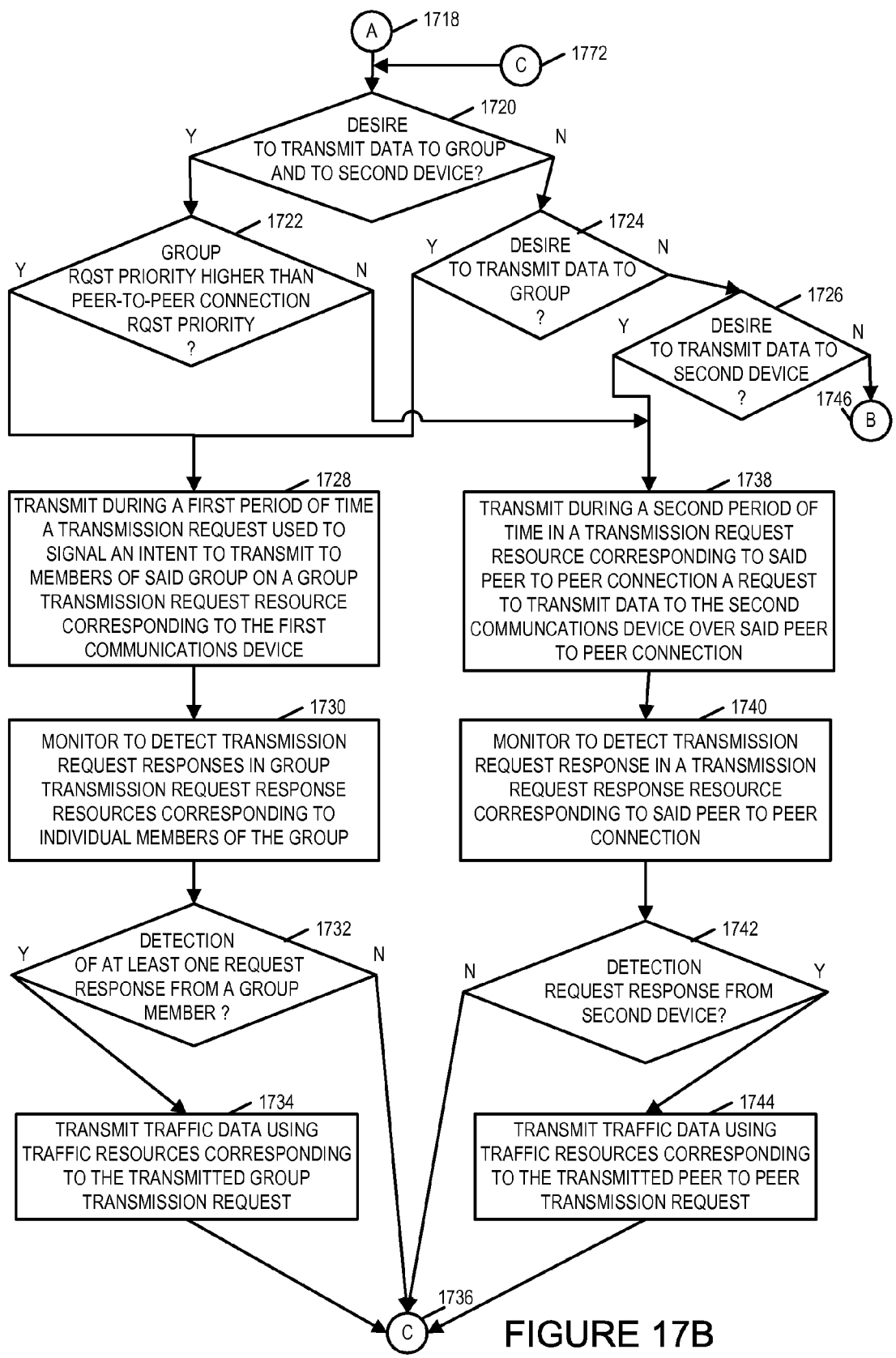
Figure 17C:
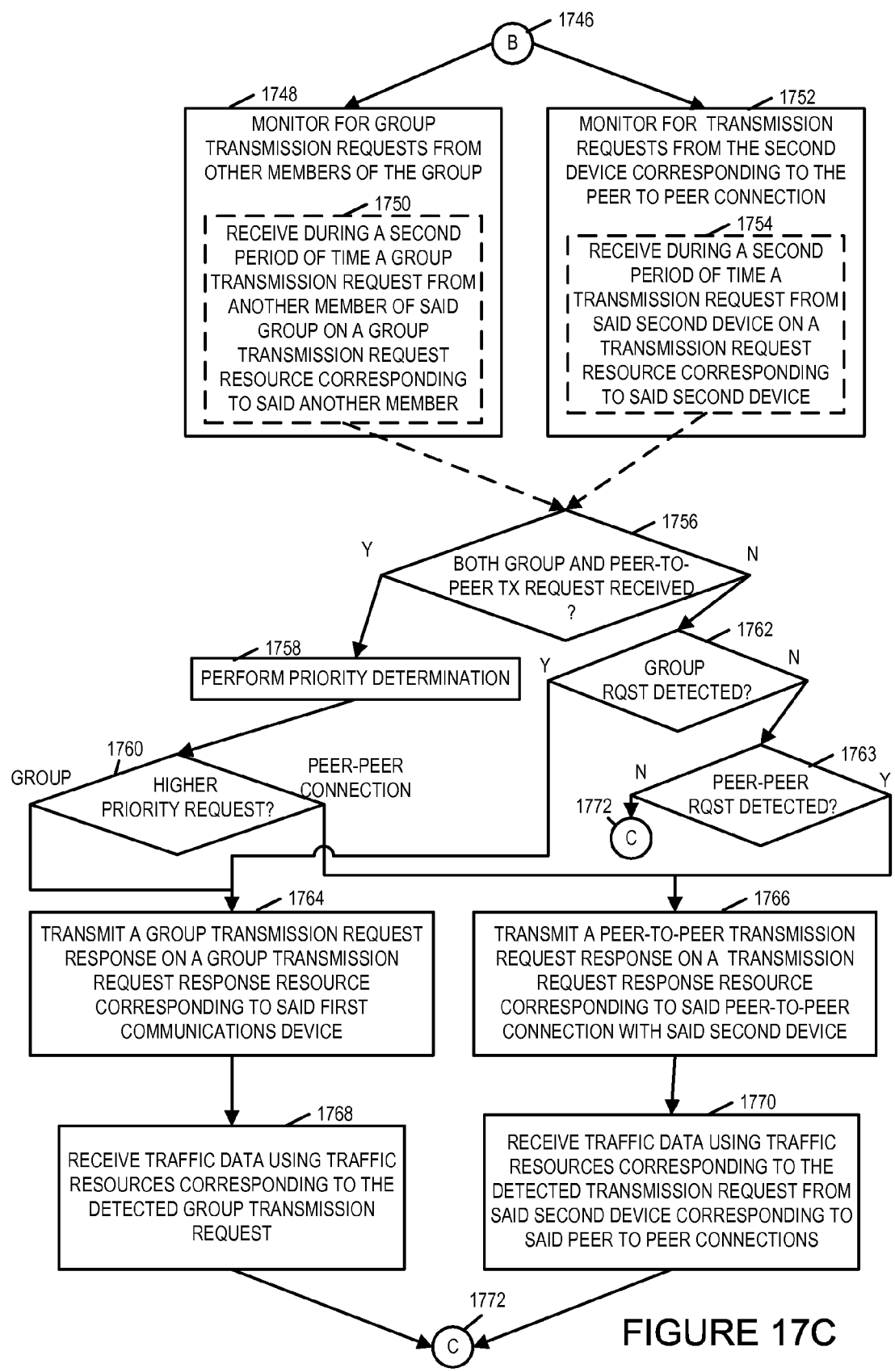

FIG. 17, comprising the combination of FIG. 17A, FIG. 17B and FIG. 17C, is a flowchart 1700 of an exemplary method of operating a first communications device in accordance with an exemplary embodiment. Operation of the exemplary method starts in step 1702, where the first communications device is powered on and initialized and proceeds to step 1704 and step 1706. In step 1704, which is performed on an ongoing basis, the first communications device determines whether or not it wants to join and/or form a group. If it does want to join and/or form a group, then operation proceeds from step 1704 to step 1708; otherwise, operation proceeds from step 1704, back to the input of step 1704.

In step 1708, the first communications device stores group membership information indicating the members of a group to which the first communications device belongs. Operation proceeds from step 1708 to step 1710, in which the first communications device acquires transmission request resources. In some embodiments, the acquired transmission request resources include a single transmission request resource for each of a plurality of transmission request time periods, e.g., a single OFDM tone-symbol for each of a plurality of transmission request time periods. Then, in step 1712 the first communications device communicates to other members of the group information indicating that the acquired transmission request resources are to by used by the first communications device as transmission request resources corresponding to the group. Operation proceeds from step 1712 to step 1713. In step 1713, the first communications device receives from other members of the group information indicating transmission request response resources to be used by other members of the group as group transmission request response resources. Operation proceeds from step 1713 to connecting node A 1718.

Returning to step 1706, in step 1706 which is performed on an ongoing basis, the first communications device determines whether or not the first communications device wants to establish a peer to peer connection with a second communications device. If the first communications device wants to establish a peer to peer connection with a second communications device, then operation proceeds from step 1706 to step 1714; otherwise, operation proceeds from the output step 1706 to the input of step 1706.

In step 1714, the first communications device stores peer to peer connection information indicating a peer to peer communications connection with a second device. In some embodiments, the second communications device may be, and sometimes is, a member of the group, and the first communications device is a member of the group and maintains a peer to peer connection with the second device at the same time. Then in step 1716 the first communications device acquires transmission request resources and transmission request response resources correspond to the connection. Operation proceeds from step 1716 to connecting node A 1718.

From connecting node A 1718, operation proceeds to step 1720. In step 1720, the first communications device determines if it desires to transmit data to the group and to the second device. If it does have data to be transmitted to the group and data to be transmitted to the second communications device, then operation proceeds from step 1720 to step 1722; otherwise operation proceeds from step 1720 to step 1724.

In step 1722 the first communications device determines whether or not the group request priority is higher than the peer to peer connection request priority. If the group request priority is higher, then operation proceeds from step 1722 to step 1728; otherwise, operation proceeds from step 1722 to step 1738.

Returning to step 1724, in step 1724 the first communications device decides whether it desires to transmit data to the group to which it belongs. If it does, then operation proceeds from step 1724 to step 1728; otherwise, operation proceeds from step 1724 to step 1726. In step 1726 the first communications device decides if it desires to transmit data to the second communications device over the established peer to peer connection. If the first device desires to transmit data to the second device, then operation proceeds from step 1726 to step 1738; otherwise, operation proceeds from step 1726 to connecting node B 1746.

Returning to step 1728, in step 1728 the first communications device transmits during a first period of time a transmission request used to signal an intent to transmit to members of said group on a group transmission request resource corresponding to the first communications device. In some embodiments, the group transmission request resource corresponding to the first communications device is part of a set of transmission request resources also including connection based transmission request resources. Then, in step 1730 the first communications device monitors to detect transmission request responses in group transmission request response resources corresponding to individual members of the group. Operation proceeds from step 1730 to step 1732.

In step 1732 the first communications device determines whether or not it has detected at least one request response from a group member. If the first communications device has detected at least one request response from a group member, then operation proceeds from step 1732 to step 1734; otherwise, operation proceeds from step 1732 to connecting node C 1736. In step 1734 the first communications device transmits traffic data using traffic resources corresponding to the transmitted group transmission request. Operation proceeds from step 1734 to connecting node C 1736.

Returning to step 1738, in step 1738 the first communications device transmits during a second period of time in a transmission request resource corresponding to the peer to peer connection a request to transmit data to the second communication device over the peer to peer connection. Operation proceeds from step 1738 to step 1740.

In step 1740 the first communications device monitors to detect a transmission request response in a transmission request response resource corresponding to the peer to peer connection. Operation proceeds from step 1740 to step 1742. In step 1742, the first communications device determines whether or not it has detected a request response from the second device. If the first communications device has detected a request response from the second device, then operation proceeds from step 1742 to step 1744; otherwise, operation proceeds from step 1742 to connecting node C 1736. In step 1744 the first communications device transmits traffic data using traffic transmission resources corresponding to the transmitted peer to peer transmission request. Operation proceeds from step 1744 to connecting node C 1736.

Returning to connecting node B 1746, operation proceeds from connecting node B 1746 to step 1748 and step 1752. In step 1748 the first communications device monitors for group transmission request from other members of the group. Step 1748 may, and sometimes does, includes sub-step 1750, in which the first communications device receives during a second period of time a group transmission request from another member of said group on a group transmission request resource corresponding to said another member.

Returning to step 1752, in step 1752 the first communications device monitors for a transmission request from the second device corresponding to the peer to peer connection. Step 1752 may, and sometimes does, include sub-step 1754. In sub-step 1754 the second communications device receives during a second period of time a transmission request from the second device on a transmission request resource corresponding to the second device. Operation proceeds from step 1748 and/or step 1752 to step 1756.

In step 1756 the first communications device determines if both a group transmission request from a member of the group to which the first communications device belongs was received and a peer to peer transmission request from the second communications device with which the first communications device has a peer to peer connection was received. If both were received, then operation proceeds from step 1756 to step 1758; otherwise, operation proceeds from step 1756 to step 1762.

Returning to step 1758, in step 1758 the first communication device performs a priority determination. Then in step 1760, the first communications device proceeds depending upon the priority determination. If the group request has higher priority, then operation proceeds from step 1760 to step 1764; however, if the request corresponding to the peer to peer connection with the second device has higher priority, then operation proceeds from step 1760 to step 1766.

Returning to step 1762, in step 1762, the first communications device determines if a group request was detected. If a group request was detected, operation proceeds from step 1762 to step 1764; otherwise, operation proceeds from step 1762 to step 1763. In step 1763, the first communications device determines if a transmission request was received from the second communications device corresponding to the peer to peer connection. If a request was received, then operation proceeds from step 1763 to step 1766; otherwise, operation proceeds from step 1763 to connecting node C 1772.

Returning to step 1764, in step 1764 the first communications device transmits a group transmission request response on a group transmission request response resource corresponding to the first communications device. Then in step 1768, the first communications device receives traffic data using traffic resources corresponding to the detected group transmission request. Operation proceeds from step 1768 to connecting node C 1772.

Returning to step 1766, in step 1766 the first communications device transmits a peer to peer transmission request response on a transmission request response resource corresponding to the peer to peer connection with the second device. Then, in step 1770 the first communications device receives traffic data using traffic transmission resources corresponding to the detected transmission request response from the second device corresponding to the peer to peer connection. Operation proceeds from step 1770 to connecting node C 1772.

From connecting node C 1772, operation proceeds to the input of step 1720, e.g., for consideration as to whether or not the first communications device desires to transmit in a subsequent slot.

Figure 18:
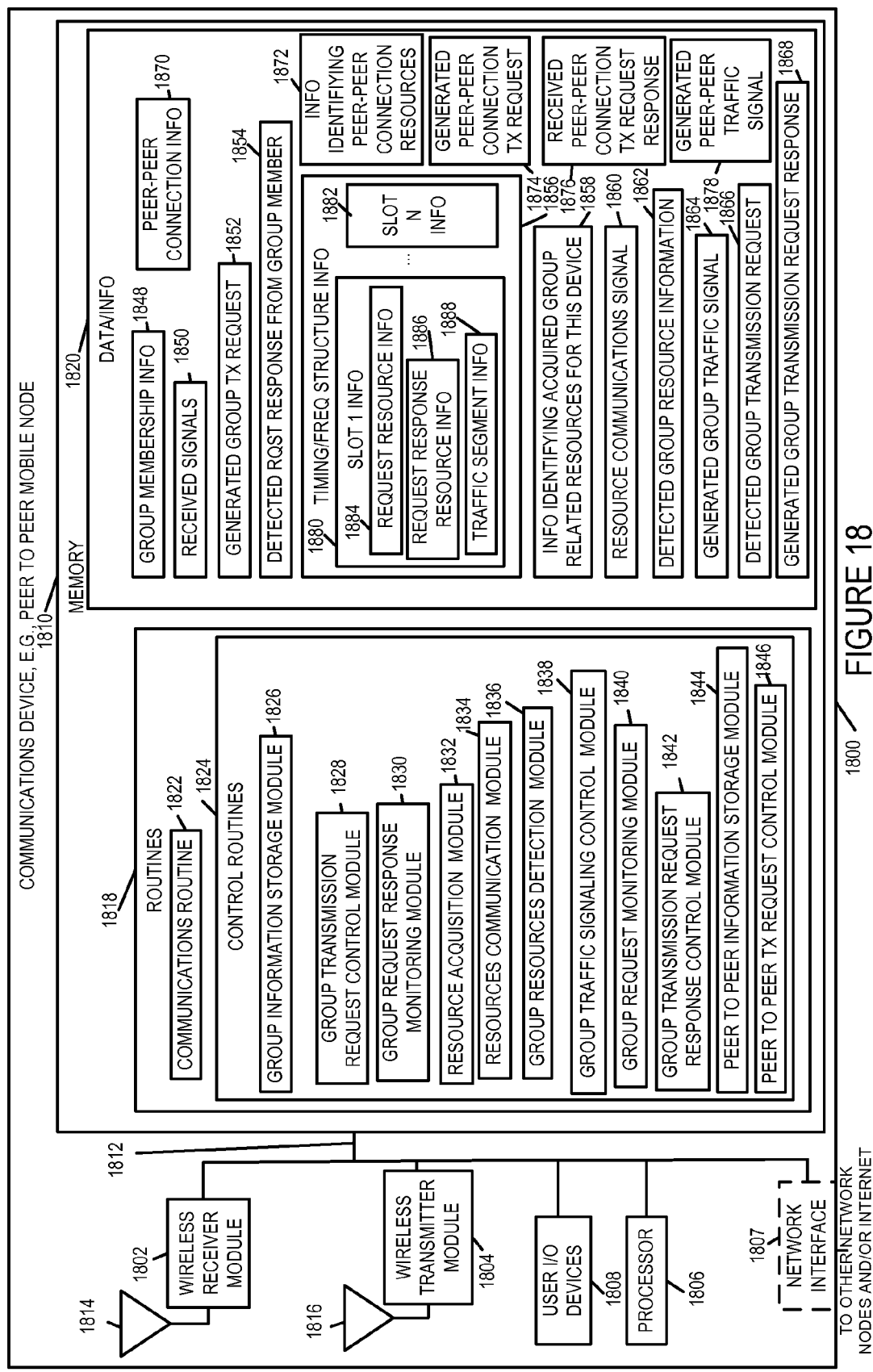
FIG. 18 is a drawing of an exemplary communications device, e.g., a peer to peer mobile node, supporting group communications in accordance with an exemplary embodiment.

FIG. 18 is a drawing of an exemplary communications device 1800, e.g., a peer to peer mobile node, supporting group communications and supporting peer to peer communications. In accordance with a feature of this exemplary embodiment different approaches are used for group communications and for peer to peer connection communications, e.g., regarding resource allocation and usage for traffic transmission request/response signaling for group communications as opposed to peer to peer connection transmission request/response signaling. For group communications, a resource, e.g., a traffic transmission request unit, is associated with a device of the group, while for peer to peer communications, a resource, e.g., a traffic transmission request unit, is associated with a connection identifier associated with the two devices of the peer to peer connection. In some embodiments, a particular resource, e.g., a traffic transmission request unit in a timing/frequency structure may during some times be associated with a group member device, while at other times the resource may be associated with a peer to peer connection. Thus in such as embodiment, the balance between resource allocation to groups and to peer connections may be dynamically varied to accommodate current needs. In other embodiments, some resources may be dedicated for group usage while other resources may be dedicated for peer to peer connection usage.

Communications device 1800 includes a wireless receiver module 1802, a wireless transmitter module 1804, user I/O devices 1808, a processor 1806, and a memory 1810 coupled together via a bus 1812 over which the various elements may interchange data and information. In some embodiments, communications device 1800 includes a network interface 1807 which is also coupled to the bus 1812. The network interface 1807, where implemented, allows communications device 1800 to couple to network nodes and/or the Internet, e.g., via a wired backhaul network.

Memory 1810 includes routines 1818 and data/information 1820. The processor 1806, e.g., a CPU, executes the routines 1818 and uses the data/information 1820 in memory 1810 to control the operation of the communications device 1800 and implement methods, e.g., the method of flowchart 1700 of FIG. 17.

Wireless receiver module 1802, e.g., an OFDM and/or CDMA receiver, is coupled to receive antenna 1814, via which the communications device 1800 receives signals, e.g., signals 1850, from other communications devices. Received signals include, e.g., signals communicating: group membership information, group resource allocation information, a group member traffic transmission request, a group member traffic transmission request response, traffic data from a group member, peer to peer connection information, peer to peer connection resource information, a peer to peer connection traffic transmission request, a peer to peer connection traffic transmission request response, and peer to peer traffic data.

Wireless transmitter module 1804, e.g., an OFDM and/or CDMA transmitter, is coupled to transmit antenna 1816, via which the communications device 1800 transmits signals to other communications devices. Transmitted signals include, e.g., e.g., signals communicating: group membership information, group resource allocation information, a group traffic transmission request, a group traffic transmission request response, group traffic data, peer to peer connection information, peer to peer connection resource information, a peer to peer connection traffic transmission request, a peer to peer connection traffic transmission request response, and peer to peer traffic data. In some embodiments, the same antenna is used for both the receiver and the transmitter.

User I/O devices 1808 include, e.g., a microphone, a keyboard, a keypad, switches, a camera, a speaker, a display, etc. User I/O devices 1808 allow an operator of communications device 1800 to input data/information, access output data/information, and control at least some function of the communications device 1800.

Routines 1818 include a communications routine 1822 and control routines 1824. The communications routine 1822 implements the various communications protocols used by the communications device 1800. The control routines 1824 include a group information storage module 1826, a group transmission request control module 1828, a group request response monitoring module 1830, a resource acquisition module 1832, a resources communication module 1834, a group resources detection module 1836, a group traffic signaling control module 1838, a group request monitoring module 1840, a group transmission request response control module 1842, a peer to peer information storage module 1844, and a peer to peer transmission request control module 1846.

Data/information 1820 includes group membership information 1848, received signal 1850, a generated group transmission request 1852, a detected request response from a group member 1854, timing/frequency structure information 1874, information identifying acquired group related resources for the device 1858, a resource communications signal 1860, detected group resource information 1862, a generated group traffic signal 1864, a detected group transmission request 1866, a generated group transmission request response 1868, peer to peer connection information 1870, information identifying peer to peer connection resources 1872, a generated peer to peer connection transmission request 1874, a received peer to peer connection transmission request response 1876 and a generated peer to peer traffic signal 1878. Timing/frequency structure information 1874 includes information corresponding to a plurality of traffic slots in a recurring timing structure (slot 1 information 1880, . . . , slot N information 1882). Slot 1 information 1880 includes request resource information 1884, request response resource information 1886 and traffic segment information 1888.

Group information storage module 1826 stores group membership information indicating the members of a group to which the first communications device belongs. Group membership information 1848 is an output of module 1826.

Group transmission request control module 1828 controls the wireless transmitter module 1804 to transmit during a first period of time a transmission request used to signal an intent to transmit to members of its group on a group transmission request resource corresponding to communications device 1800. In some embodiments, the group transmission request resource corresponding to communications device 1800 is part of a set of transmission request resources, the set of transmission request resources also including connection based transmission request resources.

Group request response monitoring module 1830 monitors received signals to detect transmission request responses in group transmission request response resources corresponding to individual members of the group. Received signals 1850 is an input to module 1830, while detected group transmission request 1866 is an output of module 1830.

Resource acquisition module 1832 acquires transmission request resources available to be used subsequently, e.g., group transmission request resources associated with device 1800 and a group to which device 1800 belongs. Information identifying acquired group related resources for this device 1858 includes information which is an output of resource acquisition module 1832, e.g., information identifying a transmission unit in each of a plurality of slots to be used by device 1800 to transmit a group traffic transmission request. In some embodiments, the acquired transmission request resources include a single transmission request resource, e.g., a single OFDM tone-symbol, for each of a plurality of request time periods. For example, the acquired transmission request resources correspond to one transmission unit for each of a plurality of traffic transmission slots, e.g., one transmission unit identified in request resource information 1884 for slot 1, . . . , one transmission unit identified in the request resource information for slot N.

Resources communication module 1836 communicates to other members of the group to which device 1800 belongs group information indicating that the acquired transmission request resources are to be used by device 1800 as transmission request resources corresponding to the group. Resource communication signal 1860 is a generated signal from module 1836 which communicates group resource information pertaining to device 1800.

Group resources detection module 1836 detects from received signals from other members of the group to which device 1800 belongs, information indicating transmission request response resources to be used by other members of the group as group transmission request response resources. The detection of module 1836 occurs prior to monitoring for transmission request responses in group transmission request response resources corresponding to individual members of the group. Thus information obtained by group resources detection module 1836, e.g., detected group resources information 1862, which may be part of group set-up or group establishment signaling, allows device 1800 to know where to look within the request response resources for request response signals from its group members, e.g., which transmission units within request response resource information 1886 are currently associated with its group members.

Group request response resources are, in some embodiments, also allocated to individual members of a group and such information is also exchanged between group members. Resource acquisition module 1832, in some embodiments, acquires transmission request response resources to be used subsequently, e.g., by device 1800 when transmitting a request response signal in response to a received group member transmission request. Resources communications module 1836, in some embodiments, communicates information identifying the acquired group transmission request response resources associated with communications device 1800 to the other members of its group. Group resources detection module 1836, in some embodiments, detects from received signals from other members of the group to which device 1800 belongs, information indicating transmission request resources to be used by other members of the group as group transmission request resources. In some embodiments, a particular group transmission request resource is linked, e.g., by a predetermined timing/frequency structure implementation, to another particular group transmission request response resource. In such an embodiment, when a communications device acquires a particular group transmission request resource it also acquires a corresponding group transmission request response resource.

Group traffic signaling control module 1838 controls the wireless transmitter module 1804 to transmit traffic data, e.g., generated group traffic signal 1864, using traffic resources corresponding to a previously transmitted group transmission request, e.g., transmitted generated group transmission request 1852, following detection by the group request response monitoring module 1830 of at least one response, e.g., of detected request response from group member 1854 signifying a positive response to the request to transmit group traffic data.

Group request monitoring module 1840 is for detecting a group transmission request from received signals from another member of the group to which device 1800 belongs on a group transmission request resource corresponding to the another member. In one exemplary embodiment, if the communications device 1800 intends to transmit a group traffic transmission request for the slot, the device does not monitor for group transmission requests in the same slot. For example, in a first slot corresponding to a first period of time, group transmission request control module 1838 is active, while in another slot corresponding to a second period of time group request monitoring module 1840 is active. Detected group transmission request 1866 represents an exemplary output of module 1840.

Group transmission request response control module 1842 control the wireless transmitter module 1804 to transmit a group transmission request response on a group transmission request response corresponding to device 1800. Generated group transmission request response 1868 is an exemplary response signal transmitted under the control of module 1842, e.g., as a result of a decision by request response control module 1842 to acquiesce to the received group transmission request.

Peer to peer information storage module 1844 stores peer to peer connection information indicating a peer to peer connection with a second device. Peer to peer connection information 1870, which is an output of module 1844, includes, e.g., information identifying an acquired connection identifier used to identify a peer to peer connection between device 1800 and the second device and/or used to identify air link resources associated with that connection, e.g., a transmission unit for carrying a traffic transmission request and a transmission unit for carrying a traffic transmission request response for each of a plurality of slots in the timing/frequency structure. Information identifying peer to peer connection resources 1872 identifying particular resources, e.g., transmission units, within the timing frequency structure 1874 currently associated with the connection is also an output of module 1844.

Peer to peer transmission request control module 1846 controls the wireless transmitter module 1804 to transmit in a transmission request resource corresponding to a peer to peer connection a request to transmit data to a second device over the peer to peer connection. Generated peer to peer connection transmission request 1874 is an exemplary peer to peer traffic transmission request transmitted under the control of module 1846 using a resource identified by information 1872 corresponding to a connection identified by information 1870.

In some embodiments, a second device with which the communication device 1800 has a peer to peer connection can be, and sometime is a member of a group to which device 1800 belongs, and thus device 1800 can be a member of the group and maintain the peer to peer connection with second device at the same time. In some such embodiments, communications device 1800 can, and sometimes does, maintaining both the group membership resources associated with the second device and peer to peer connection resources associated with second device.

Figure 19:
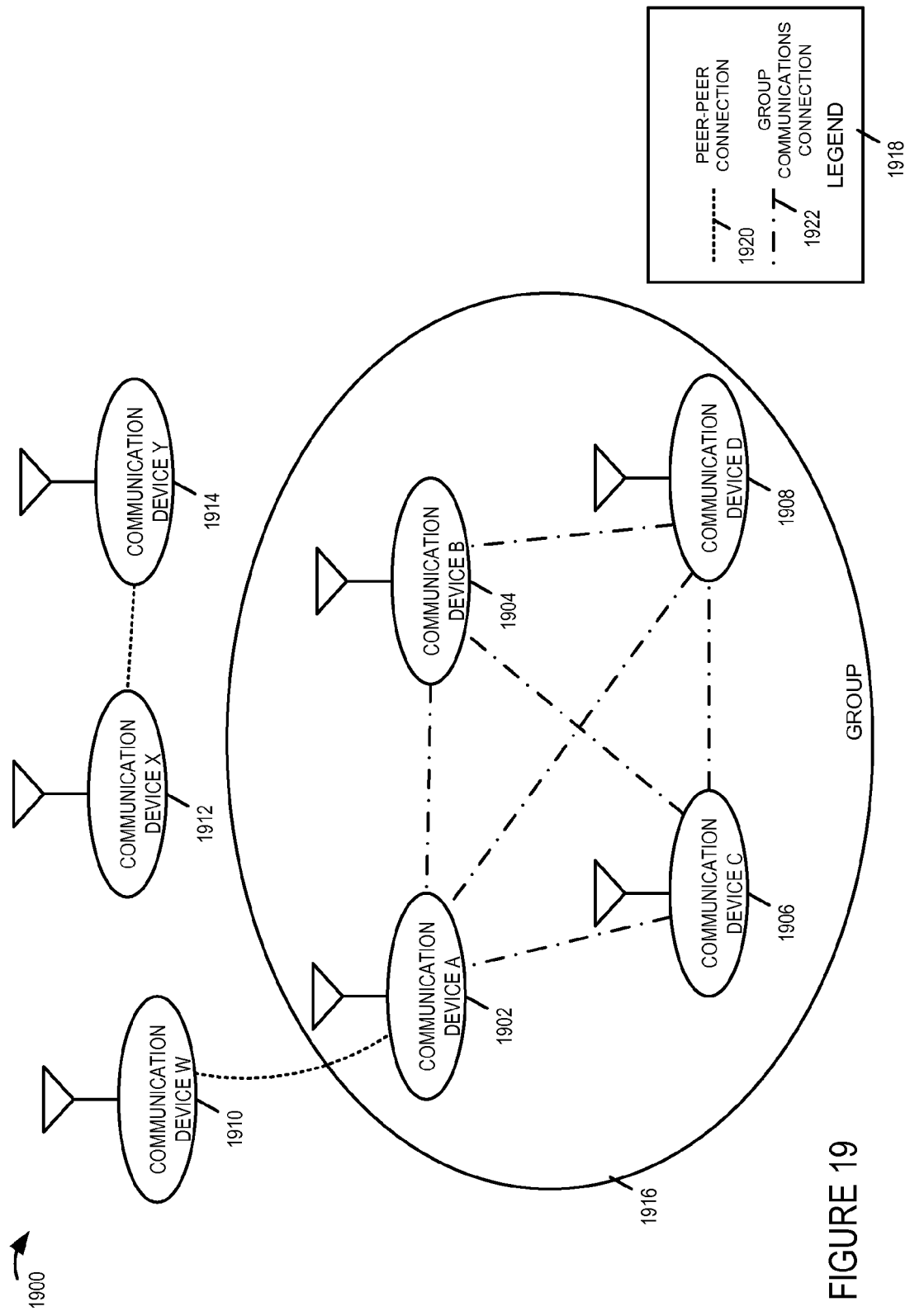
FIG. 19 is a drawing of an exemplary wireless communications network supporting group communications and peer to peer communications.

FIG. 19 is a drawing of an exemplary wireless communications network 1900 supporting group communications and peer to peer communications. Exemplary communications network 1900 includes a plurality of wireless communications devices (communications device A 1902, communications device B 1904, communications device C 1906, communications device D 1908, communications device W 1910, communications device X 1912, communications device Y 1914). The wireless communications devices of FIG. 19 may be, e.g., devices in accordance with device 300 of FIG. 3 and/or implementing a method of flowchart 200 of FIG. 2. FIG. 19 also indicates that communications device A 1902, communications device B 1904, communications device C 1906 and communications device D 1908 have formed group 1916 which supports group communications, e.g., group communications including group cast traffic signaling. FIG. 19 also includes legend 1918. Legend 1918 indicates that dashed lines 1920 indicate established peer to peer connections, while dash-dot lines 1922 indicate group communications connections. In this example, there are six group communications connections shown between the various members (1902, 1904, 1906, 1908) of the group 1916. In addition, there is a peer to peer connection between communications device A 1902 and communications device W 1910, and there is a peer to peer connection between communications device X 1912 and communications device Y 1914.

Figure 20:
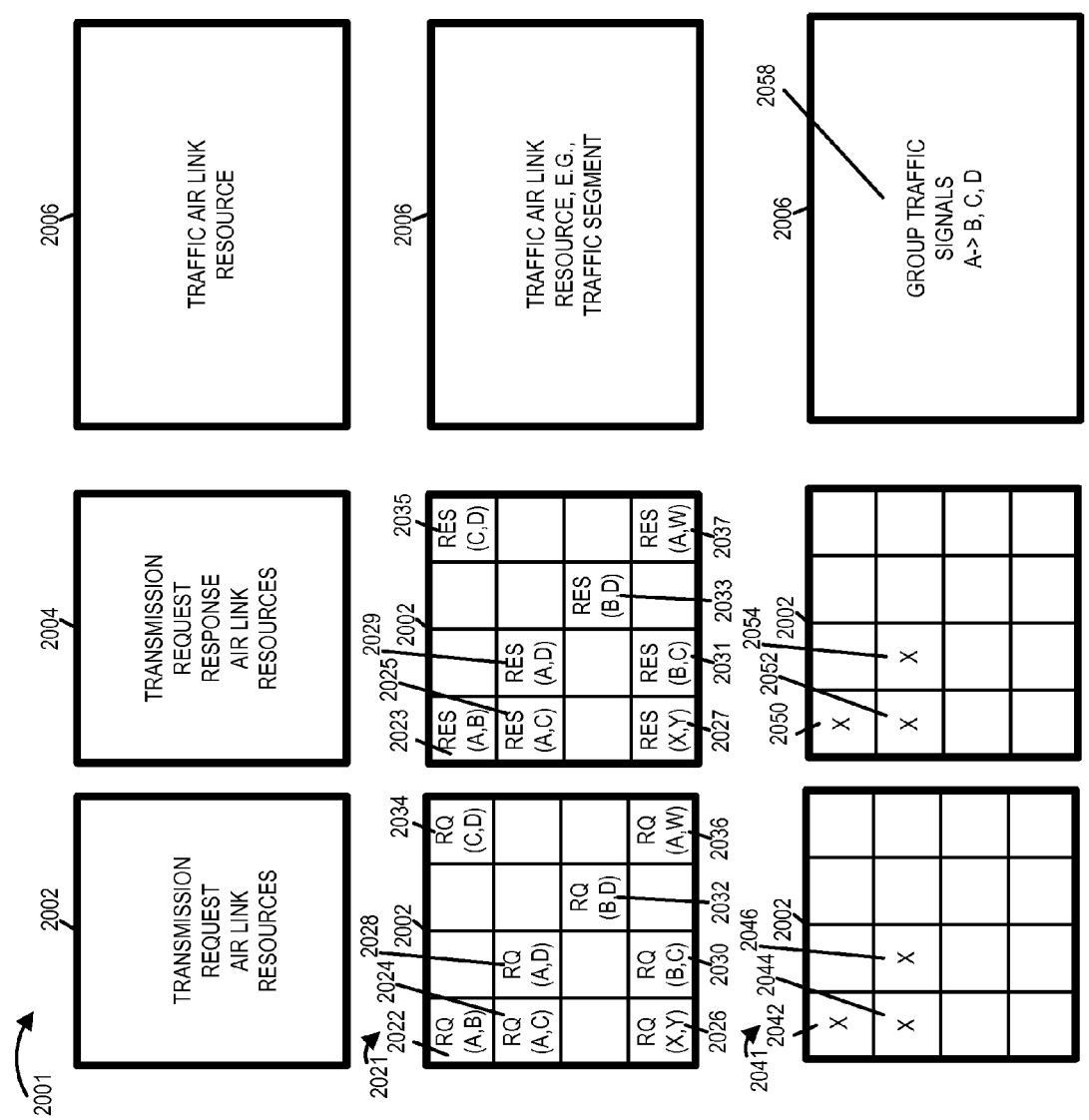
FIG. 20 illustrates exemplary resources allocation and exemplary signaling corresponding to the example of FIG. 19, for one traffic slot in a recurring timing/frequency structure in accordance with one exemplary embodiment.

FIG. 20 illustrates exemplary resources allocation and exemplary signaling corresponding to the example of FIG. 19, for one traffic slot in a recurring timing/frequency structure in accordance with one exemplary embodiment. Drawing 2001 of FIG. 20 illustrates a block of exemplary transmission request air link resources 2002, a block of exemplary transmission request response air link resources 2004 and an exemplary traffic air link resource 2006, e.g., a traffic segment.

Drawing 2021 of FIG. 20 illustrates exemplary individual transmission units corresponding to the different connections. Transmission request air link resources 2002 include: (i) transmission unit 2022 allocated to carry a traffic transmission request from communications device A 1902 to communications device B 1904 indicating that communications device A would like to transmit a traffic signal in traffic air link resource 2006 intended for communications device B 1904; (ii) transmission unit 2024 allocated to carry a traffic transmission request from communications device A 1902 to communications device C 1906 indicating that communications device A would like to transmit a traffic signal in traffic air link resource 2006 intended for communications device C 1906; (iii) transmission unit 2026 allocated to carry a traffic transmission request from communications device X 1912 to communications device Y 1914 indicating that communications device X 1912 would like to transmit a traffic signal in traffic air link resource 2006 intended for communications device Y 1944; (iv) transmission unit 2028 allocated to carry a traffic transmission request from communications device A 1902 to communications device D 1908 indicating that communications device A 1902 would like to transmit a traffic signal in traffic air link resource 2006 intended for communications device D 1908; (v) transmission unit 2030 allocated to carry a traffic transmission request from communications device B 1904 to communications device C 1906 indicating that communications device B 1904 would like to transmit a traffic signal in traffic air link resource 2006 intended for communications device C 1906; (vi) transmission unit 2032 allocated to carry a traffic transmission request from communications device B 1904 to communications device D 1908 indicating that communications device B 1904 would like to transmit a traffic signal in traffic air link resource 2006 intended for communications device D 1908; (vii) transmission unit 2034 allocated to carry a traffic transmission request from communications device C 1906 to communications device D 1908 indicating that communications device C 1906 would like to transmit a traffic signal in traffic air link resource 2006 intended for communications device D 1908; and (viii) transmission unit 2036 allocated to carry a traffic transmission request from communications device A 1902 to communications device W 1910 indicating that communications device A 1902 would like to transmit a traffic signal in traffic air link resource 2006 intended for communications device W 1910.

Drawing 2021 also indicates that transmission request response air link resources 2004 which include: (i) transmission unit 2023 allocated to carry a traffic transmission request response from communications device B 1904 to communications device A 1902 indicating that communications device B approves of the request to transmit a traffic signal in traffic air link resource 2006 intended for communications device B 1904; (ii) transmission unit 2025 allocated to carry a traffic transmission request response from communications device C 1906 to communications device A 1902 indicating that communications device C 1906 approves of the request to transmit a traffic signal in traffic air link resource 2006 intended for communications device C 1906; (iii) transmission unit 2027 allocated to carry a traffic transmission request response from communications device Y 1914 to communications device X 1912 indicating that communications device Y 1914 approves of the request to transmit a traffic signal in traffic air link resource 2006 intended for communications device Y 1914; (iv) transmission unit 2029 allocated to carry a traffic transmission request response from communications device D 1908 to communications device A 1902 indicating that communications device D 1908 approves of the request to transmit a traffic signal in traffic air link resource 2006 intended for communications device D 1908; (v) transmission unit 2031 allocated to carry a traffic transmission request response from communications device C 1906 to communications device B 1904 indicating that communications device C 1906 approves of the request to transmit a traffic signal in traffic air link resource 2006 intended for communications device C 1906; (vi) transmission unit 2033 allocated to carry a traffic transmission request response from communications device D 1908 to communications device B 1904 indicating that communications device D 1908 approves of the request to transmit a traffic signal in traffic air link resource 2006 intended for communications device D 1908; (vii) transmission unit 2035 allocated to carry a traffic transmission request response from communications device D 1908 to communications device C 1906 indicating that communications device D 1908 approves of the request to transmit a traffic signal in traffic air link resource 2006 intended for communications device D 1908; and (viii) transmission unit 2037 allocated to carry a traffic transmission request from communications device W 1910 to communications device A 1902 indicating that communications device W 1910 approves of the request to transmit a traffic signal in traffic air link resource 2006 intended for communications device W 1910.

Drawing 2041 of FIG. 20 illustrates exemplary signaling for one scenario. In this example, communications device A 1902 desires to transmit a group traffic signal to the other members of its group (1904, 1906, 1908) using the traffic air link resource 2006. Communications device A 1902 generates and transmits traffic transmission request signals (2042, 2044, 2046) using transmission request transmission units (2022, 2024, 2028), respectively, of transmission request air link resources 2002. Communications devices (communications device B 1904, communications device C 1906, communications device D 1908) receive the traffic transmission request signals (2042, 2044, 2046), respectively. The devices which are members of the group are aware of the other members of the group and use such information in yielding consideration. For example, the device may detect a request directed to another member of the group and need not yield based on that request since both requests correspond to a group cast traffic transmission. The communications devices (communications device B 1904, communications device C 1906, communications device D 1908) generate and transmit traffic transmission request response signals (2050, 2052, 2054) using transmission request response transmission units (2023, 2025, 2029), respectively, of transmission request response resource 2004.

Communications device A 1904 detects the transmission request response signals (2050, 2052, 2054), signifying positive responses, generates group traffic signals 2058, and transmits the group traffic signals 2058 intended for communications devices (communications device A 1904, communications device B 1906, communications device C 1908) using traffic segment 2006.

Note that the resource allocation approach for group communications utilized in the example of FIG. 20, e.g., a connection identifier based approach, has an advantage that it can be readily implemented and/or used in a system supporting peer to peer connections using connection identifiers. However, for large group sizes, this approach tends to use a large amount of transmission request and transmission request response resources. Another advantage to this connection based approach is that such an approach can accommodate transmissions intended for subsets of a group.

Figure 21:
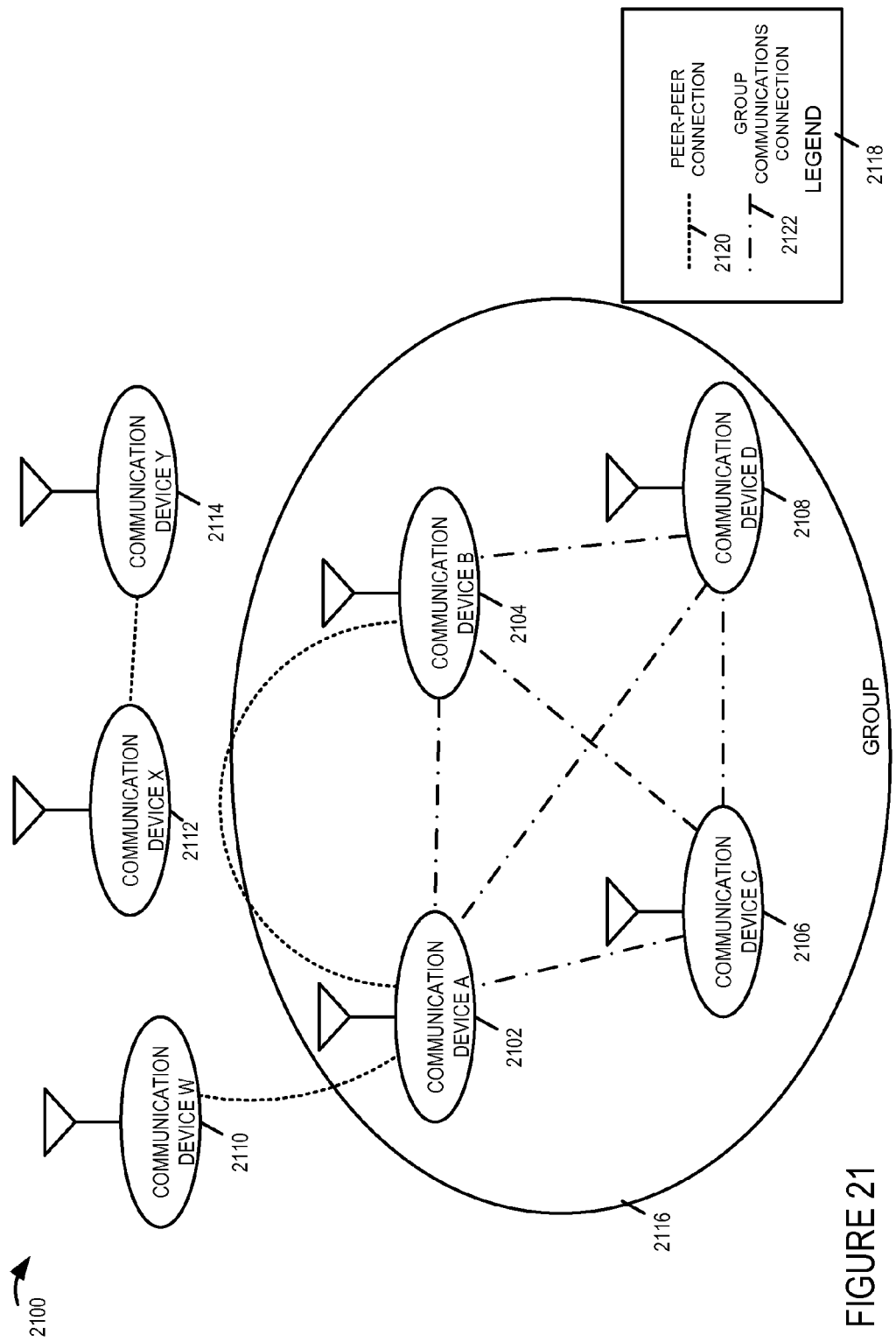
FIG. 21 is a drawing of an exemplary wireless communications network supporting group communications and peer to peer communications.

FIG. 21 is a drawing of an exemplary wireless communications network 2100 supporting group communications and peer to peer communications. Exemplary communications network 2100 includes a plurality of wireless communications devices (communications device A 2102, communications device B 2104, communications device C 2106, communications device D 2108, communications device W 2110, communications device X 2112, communications device Y 2114). The exemplary communications devices of FIG. 21 are, e.g., communications devices in accordance with device 1800 of FIG. 18 and/or implementing a method in accordance with flowchart 1700 of FIG. 17. FIG. 21 also indicates that communications device A 2102, communications device B 2104, communications device C 2106 and communications device D 2108 have formed group 2116 which supports group communications, e.g., group communications including group cast traffic signaling. FIG. 21 also includes legend 2118. Legend 2118 indicates that dashed lines 2120 indicate established peer to peer connections, while dash-dot lines 2122 indicate group communications connections. In this example, there are six group communications connections shown between the various members (2102, 2104, 2106, 2108) of the group 2116. There is also a peer to peer connection between communications device A 2102 and communications device B 2104. In addition, there is a peer to peer connection between communications device A 2102 and communications device W 2110, and there is a peer to peer connection between communications device X 2112 and communications device Y 2114.

Figure 22:
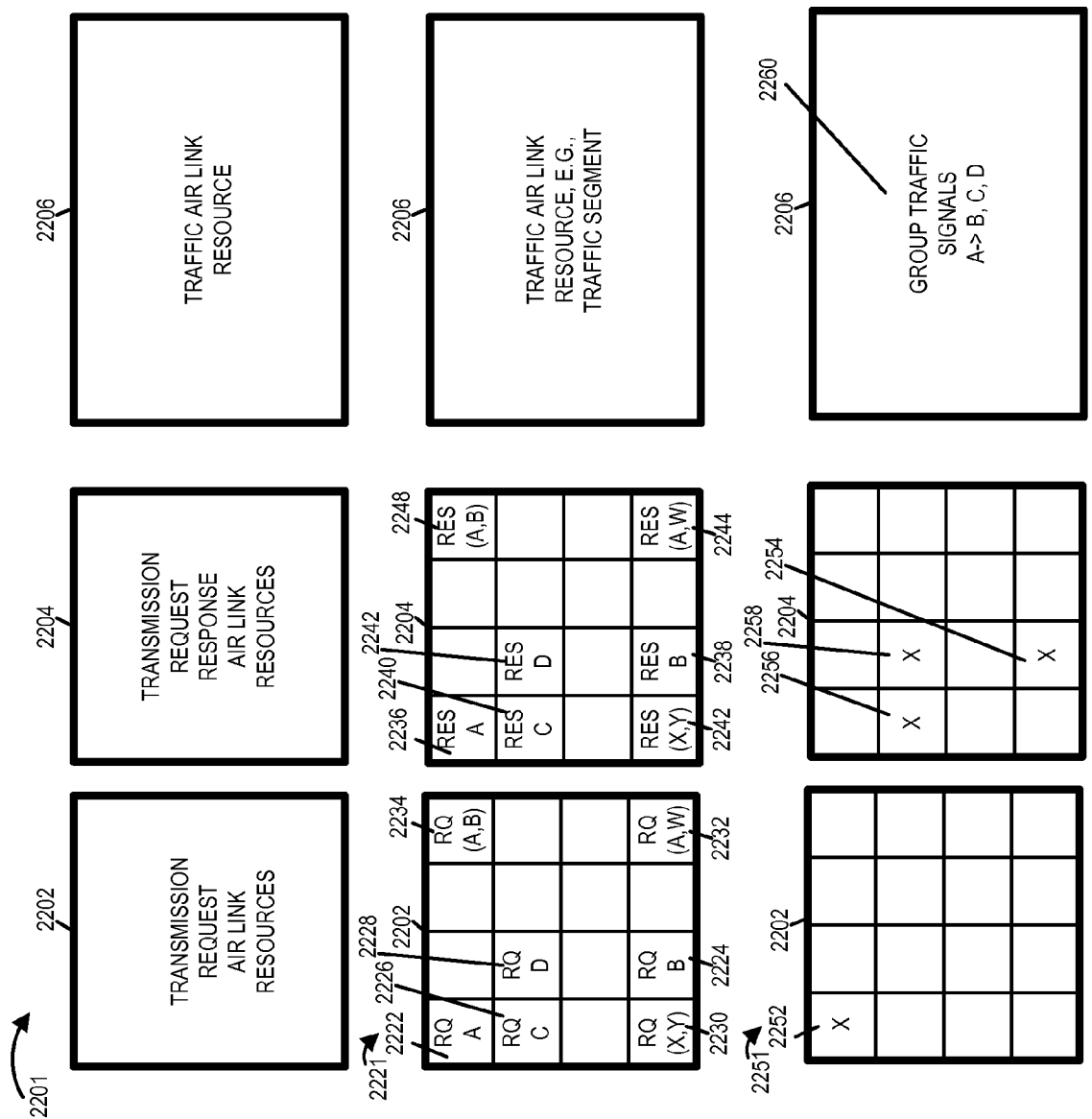
FIG. 22 illustrates exemplary resource allocation and exemplary signaling corresponding to the example of FIG. 21, for one traffic slot in a recurring timing/frequency structure in accordance with one exemplary embodiment.

FIG. 22 illustrates exemplary resource allocation and exemplary signaling corresponding to the example of FIG. 21, for one traffic slot in a recurring timing/frequency structure in accordance with one exemplary embodiment. Drawing 2201 of FIG. 22 illustrates a block of exemplary transmission request air link resources 2202, a block of exemplary transmission request response air link resources 2204 and an exemplary traffic air link resource 2206, e.g., a traffic segment.

Drawing 2221 of FIG. 22 illustrates exemplary individual transmission units used to carry traffic transmission requests or traffic transmission request responses. Transmission request air link resources 2202 include: (i) transmission unit 2222 allocated to carry a group traffic transmission request from communications device A 2102 to the other members of its group indicating that communications device A would like to transmit a group traffic signal in traffic air link resource 2206 intended for its group members; (ii) transmission unit 2224 allocated to carry a group traffic transmission request from communications device B 2104 to the other members of its group indicating that communications device B 2104 would like to transmit a group traffic signal in traffic air link resource 2206 intended for its group; (iii) transmission unit 2226 allocated to carry a group traffic transmission request from communications device C 2106 to the other members of its group indicating that communications device C 2106 would like to transmit a group traffic signal in traffic air link resource 2206 intended for its group; (iv) transmission unit 2228 allocated to carry a traffic transmission request from communications device D 2108 to the other members of its group indicating that communications device D 2108 would like to transmit a group traffic signal in traffic air link resource 2206 intended for its group; (v) transmission unit 2230 allocated to carry a traffic transmission request from communications device X 2112 to communications device Y 2114 indicating that communications device X 2112 would like to transmit a traffic signal in traffic air link resource 2206 intended for communications device Y 2114 over its peer to peer connection; (vi) transmission unit 2232 allocated to carry a traffic transmission request from communications device A 2102 to communications device W 2110 indicating that communications device A 2102 would like to transmit a traffic signal in traffic air link resource 2206 intended for communications device W 2110 over its peer to peer connection with communications device W 2110; and (vii) transmission unit 2234 allocated to carry a traffic transmission request from communications device A 2102 to communications device B 2104 indicating that communications device A 2102 would like to transmit a traffic signal in traffic air link resource 2206 intended for communications device B 2104 over its peer to peer connection with communications device B 2104.

Drawing 2221 also indicates that transmission request response air link resources 2204 include: (i) transmission unit 2236 allocated to carry a traffic transmission request response from communications device A 2102 to a group member which previously transmitted a group traffic transmission request indicating that communications device A 2104 approves of the request to transmit a group traffic signal in traffic air link resource 2206 intended for the group; (ii) transmission unit 2238 allocated to carry a traffic transmission request response from communications device B 2104 to a group member which previously transmitted a group traffic transmission request indicating that communications device B 2104 approves of the request to transmit a group traffic signal in traffic air link resource 2206 intended for the group; (iii) transmission unit 2240 allocated to carry a traffic transmission request response from communications device C 2106 to a group member which previously transmitted a group traffic transmission request indicating that communications device C 2106 approves of the request to transmit a group traffic signal in traffic air link resource 2206 intended for the group; (iv) transmission unit 2242 allocated to carry a traffic transmission request response from communications device D 2108 to a group member which previously transmitted a group traffic transmission request indicating that communications device D 2108 approves of the request to transmit a group traffic signal in traffic air link resource 2206 intended for the group; (v) transmission unit 2244 allocated to carry a traffic transmission request response from communications device Y 2114 to communications device X 2112 indicating that communications device Y 2114 approves of the request to transmit a peer to peer traffic signal in traffic air link resource 2206 intended for communications device Y 2114 over a peer to peer communications link with device X 2112; (vi) transmission unit 2244 allocated to carry a traffic transmission request response from communications device W 2110 to communications device A 2102 indicating that communications device W 2110 approves of the request to transmit a peer to peer traffic signal in traffic air link resource 2206 intended for communications device A 2102 over a peer to peer communications link with device A 2102; (vii) transmission unit 2248 allocated to carry a traffic transmission request response from communications device B 2104 to communications device A 2102 indicating that communications device B 2104 approves of the request to transmit a peer to peer traffic signal in traffic air link resource 2206 intended for communications device A 2102 over a peer to peer connection with communications device A 2102

Drawing 2251 of FIG. 22 illustrates exemplary signaling for one scenario. In this example, communications device A 2102 desires to transmit a group traffic signal to the other members of its group (2104, 2106, 2108) using the traffic air link resource 2206. Communications device A transmits generates and transmits traffic transmission request signals 2252 using transmission request transmission unit 2222 of transmission request air link resources 2202. Communications devices (communications device B 2204, communications device C 2206, communications device D 2208) receive the traffic transmission request signal 2252. The communications devices (communications device B 2104, communications device C 2106, communications device D 2108) generate and transmit traffic transmission request response signals (2254, 2256, 2258) using transmission request response transmission units (2238, 2240, 2242), respectively, of transmission request response resource 2204.

Communications device A 2102 detects the transmission request response signals (2254, 2256, 2258), signifying positive responses, generates group traffic signals 2260, and transmits the group traffic signals 2260 intended for communications devices (communications device B 2104, communications device C 2106, communications device D 2108) using traffic segment 2206.

Note that the resource allocation approach for group communications utilized in the example of FIG. 22, e.g., a device based approach, is advantageous where there a large number of devices in the group. For example, in one embodiment with 10 members of a group using the connection based approach of FIG. 20, one would use 45 individual transmission request air link transmission units and 45 individual transmission request response air link transmission units to accommodate possible combinations of the group. In addition, if one also wants to take into account link direction, one would use twice that number of transmission units, or another approach could be utilized such as alternating between link directions for different slots. However, if instead for an embodiment with 10 members in the group, the device based approach is used, one can support the group communications with 10 individual transmission request transmission units and 10 transmission request response transmission units. In general, if we have a group of N members, where N is a positive number greater than or equal to 2, and if the connection identifier approach is used we would use $N(N-1)$ uni-directional connection identifier associated transmission request units, e.g., OFDM tone-symbols, to accommodate the possible group request signaling. However, under the same scenario if the device identifier approach is used we would use N device identifier associated transmission request units, e.g., OFDM tone-symbols to accommodate the possible group request signaling. In some embodiments, we may count each connection ID as bi-directional. In other words, an exemplary device pair (A,B) of the group uses one connection ID. In that case, we would use $N*(N-1)/2$ bi-directional connection IDs. But the device based approach uses N IDs, each associated with one device. When $N>2$, $N*(N-1)/2$ is greater than or equal to N.

An additional advantage of the device based resource allocation approach for group communications is reduced signaling. In the connection identifier based resource allocation approach of FIG. 20 WT A 1902 transmits 3 traffic transmission request signals, while in the device based resource allocation approach of FIG. 22, WT A 2102 transmitted one request signal.

The techniques of various embodiments may be implemented using software, hardware and/or a combination of software and hardware. Various embodiments are directed to apparatus, e.g., mobile nodes such as mobile access terminals, base stations including one or more attachment points, and/or communications systems. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods, for example, transmitting a first plurality of transmission requests corresponding to multiple connections corresponding to a communications group, transmitting data to peer to peer communications devices in a communications group, receiving a first plurality of transmission requests corresponding to connections corresponding to a communications group and at least one transmission request corresponding to a non-group connection, making a decision whether or not to transmit a transmission request response to a group member from which a request was received, etc. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as wireless terminals are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating a first peer-to-peer communications device to implement group communications, comprising:

transmitting a first plurality of transmission requests corresponding to multiple connections, said first plurality of transmission requests corresponding to a first data transmission block comprising a traffic segment configured to carry traffic signals including group-cast traffic signals for a communications group, individual ones of said multiple connections being between said first peer to peer communications device and other peer-to-peer communications devices in the communications group; and transmitting data to said other peer-to-peer communications devices in said first data transmission block based in part on signals received from at least one of the other peer-to-peer communications devices in the communications group.

2. The method of claim 1, wherein said first plurality of transmission requests is transmitted in a first transmission request block.

3. The method of claim 1, further comprising:

prior to transmitting data, making a decision whether or not to transmit in said first data transmission block based on signals received from non-group member peer-to-peer devices, said decision being a decision to transmit.

4. The method of claim 3, further comprising:

transmitting a second plurality of transmission requests corresponding to said multiple connections, said second plurality of transmission requests corresponding to a second data transmission block; and making a decision whether or not to transmit data in said second data transmission block based on signals received from non-group member peer-to-peer devices.

5. The method of claim 4, wherein making a decision whether or not to transmit data in said second transmission block includes:

determining whether or not to transmit in said second data transmission block, as a function of the received power level of a transmission request response corresponding to a non-group member connection which has a higher priority than the highest priority connection of said multiple connections.

6. The method of claim 5, wherein when said determination determines not to transmit in said second data transmission block, refraining from transmitting in said second data transmission block.

7. The method of claim 2, further comprising:
transmitting subsequent to transmission of said first plurality of transmission requests, a pilot signal; and
receiving, prior to transmitting data in said first data transmission block, a plurality of channel quality feedback signals from different members of said group.

8. The method of claim 7, further comprising:
determining a data transmission rate to be used for transmission of data in said first data transmission block from said plurality of channel quality feedback signals.

9. The method of claim 8, wherein determining a data transmission rate includes selecting a data transmission rate which can be supported by a connection having the worst channel conditions indicated by said received channel quality feedback signals.

10. The method of claim 1, further comprising:
transmitting a second plurality of transmission requests corresponding to said multiple connections, said second plurality of transmission requests corresponding to a second data transmission block; and
making a decision whether or not to transmit data in said second transmission block based on the number of responses received from group members.

11. A peer-to-peer communications device supporting group communications, the first communications device comprising:
a wireless transmitter;
a transmission request control module configured to control said wireless transmitter to transmit a plurality of transmission requests corresponding to multiple connections, said plurality of transmission requests corresponding to a data transmission block comprising a traffic segment configured to carry traffic signals including group-cast traffic signals for a communications group, individual ones of said multiple connections being between said peer to peer communications device and other peer-to-peer communications devices in the communications group; and
a data transmission control module configured to control said wireless transmitter to transmit data to said other peer-to-peer communications devices in said data transmission block based in part on signals received from at least one of the other peer-to-peer communications devices in the communications group.

12. The peer-to-peer communications device of claim 11, wherein said plurality of transmission requests is transmitted in a transmission request block.

13. The peer-to-peer communications device of claim 11, a receiver for receiving signals; and
a transmission decision module configured to make a decision whether or not to transmit in said data transmission block based on signals received from non-group member peer-to-peer devices.

14. The peer-to-peer communications device of claim 13, wherein said transmission decision module determines whether or not to transmit in said data transmission block, as a function of the received power level of transmission request responses corresponding to non-group member connections which are received and have a higher priority than a highest priority connection of said multiple connections.

15. The peer-to-peer communications device of claim 14, wherein said data transmission control module is configured to be responsive to said transmission decision module and controls said transmitter to refrain from transmitting in said data transmission block when said transmission decision module makes a decision not to transmit in said data transmission block.

16. The peer-to-peer communications device of claim 12, further comprising:
a pilot signal transmission control module for controlling said transmitter to transmit, subsequent to transmission of said plurality of transmission requests, a pilot signal; and
a receiver configured to receive, prior to transmission by said transmitter of data in said data transmission block, a plurality of channel quality feedback signals from different members of said group.

17. The peer-to-peer communications device of claim 16, further comprising:
a transmission rate determination module configured to determine a data transmission rate, to be used for transmission of data in said data transmission block, based on said plurality of channel quality feedback signals.

18. A peer-to-peer communications device supporting group communications, the first communications device comprising:
means for transmitting signals;
means for controlling said means for transmitting signals to transmit a plurality of transmission requests corresponding to multiple connections, said plurality of transmission requests corresponding to a data transmission block comprising a traffic segment configured to carry traffic signals including group-cast traffic signals for a communications group, individual ones of said multiple connections being between said first peer to peer communications device and other peer-to-peer communications devices in the communications group; and
means for controlling said means for transmitting signals to transmit data to said other peer-to-peer communications devices in said data transmission block based in part on signals received from at least one of the other peer-to-peer communications devices in the communications group.

19. The peer-to-peer communications device of claim 18, wherein said plurality of transmission requests is transmitted in a transmission request block.

20. The peer-to-peer communications device of claim 18, further comprising:
means for receiving signals; and
means for making a decision whether or not to transmit in said data transmission block based on signals received from non-group member peer-to-peer devices.

21. A computer program product for use in a first peer-to-peer communications device to implement group communications, the computer program product comprising:
non-transitory computer readable medium comprising:
code for causing a computer to transmit a first plurality of transmission requests corresponding to multiple connections, said first plurality of transmission requests corresponding to a first data transmission block comprising a traffic segment configured to carry traffic signals including group-cast traffic signals for a communications group, individual ones of said multiple connections being between said first peer to peer communications device and other peer-to-peer communications devices in the communications group; and code for causing a computer to transmit data to said other peer-to-peer communications devices in said first data transmission block based in part on signals received from at least one of the other peer-to-peer communications devices in the communications group.

\* \* \* \* \*